United States Patent
Bichu et al.

(10) Patent No.: US 11,568,516 B2
(45) Date of Patent: Jan. 31, 2023

(54) DEPTH-BASED IMAGE STITCHING FOR HANDLING PARALLAX

(71) Applicant: Nikon Corporation, Tokyo (JP)

(72) Inventors: Tanmay Nitin Bichu, Redwood City, CA (US); Ikuya Saito, Kawasaki (JP); Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 82 days.

(21) Appl. No.: 17/013,770

(22) Filed: Sep. 7, 2020

(65) Prior Publication Data

US 2021/0082086 A1 Mar. 18, 2021

Related U.S. Application Data

(60) Provisional application No. 62/899,610, filed on Sep. 12, 2019.

(51) Int. Cl.
*G06T 3/40* (2006.01)
*G06T 5/00* (2006.01)
(Continued)

(52) U.S. Cl.
CPC ............ *G06T 3/4038* (2013.01); *G06T 5/002* (2013.01); *G06T 5/50* (2013.01); *G06T 7/55* (2017.01);
(Continued)

(58) Field of Classification Search
CPC ......... G06T 3/4038; G06T 5/002; G06T 5/50; G06T 7/55; G06T 2207/20024;
(Continued)

(56) References Cited

U.S. PATENT DOCUMENTS

2011/0158509 A1\* 6/2011 Li ........................... G06T 7/593
382/154
2012/0162379 A1\* 6/2012 Dahi .................... H04N 13/268
348/47
(Continued)

OTHER PUBLICATIONS

Zhe Zhu et al., "A Comparative Study of Algorithms for Realtime Panoramic Video Blending," http://cg.cs.tsinghua.edu.cn/blending/, Dec. 24, 2016, pp. 1-9.
(Continued)

*Primary Examiner* — Jose L Couso
(74) *Attorney, Agent, or Firm* — InventIQ Legal LLP; Anna Ison; Daniel J. Kennedy

(57) ABSTRACT

A solution to the problem of image and video stitching is disclosed that compensates for the effects of lens distortion, camera misalignment, and parallax in combining multiple images. The disclosed image stitching technique includes depth or disparity estimation, alignment, and blending processes configured to be computationally efficient and produce quality results by limiting the presence of noticeable seams and artifacts in the final stitched image. An inter-frame approach applies image stitching to video frames to maintain temporal continuity between successive frames across a stitched video output having a 360-degree viewing perspective. A temporal adjustment is configured to improve temporal continuity between a subsequent frame and a previous frame in a sequence of video frames.

19 Claims, 25 Drawing Sheets

(51) Int. Cl.
*G06T 5/50* (2006.01)
*G06T 7/55* (2017.01)

(52) U.S. Cl.
CPC .............. *G06T 2207/20024* (2013.01); *G06T 2207/20221* (2013.01); *G06T 2207/20228* (2013.01)

(58) Field of Classification Search
CPC . G06T 2207/20221; G06T 2207/20228; G06T 7/33; G06T 2207/10012; G06T 2207/10028; G06T 5/006; G06T 7/30; G06T 7/593; G06T 11/60; G06T 2207/10021; G06T 2200/32; H04N 2013/0081; H04N 5/2624; H04N 5/23238; H04N 13/282; H04N 13/128; H04N 13/271; H04N 7/181; G06K 9/6288; G06K 9/6289; G06V 10/80; G06V 10/803; G06V 30/1918
See application file for complete search history.

(56) References Cited

U.S. PATENT DOCUMENTS

| | | | | |
|---|---|---|---|---|
| 2017/0004622 | A1* | 1/2017 | Adsumilli | G06T 11/60 |
| 2017/0006219 | A1* | 1/2017 | Adsumilli | G06K 9/46 |
| 2017/0006220 | A1* | 1/2017 | Adsumilli | G06T 3/4038 |
| 2017/0150118 | A1* | 5/2017 | Pacheco | H04N 13/239 |
| 2017/0195560 | A1* | 7/2017 | Veldandi | H04N 5/23238 |
| 2018/0205889 | A1* | 7/2018 | Abbas | H04N 7/181 |
| 2018/0205941 | A1* | 7/2018 | Kopf | H04N 13/282 |
| 2018/0330471 | A1* | 11/2018 | Qin | G06T 5/50 |
| 2018/0343431 | A1* | 11/2018 | Veldandi | H04N 13/207 |
| 2019/0012818 | A1 | 1/2019 | Fine et al. | |
| 2021/0321047 | A1* | 10/2021 | Abbas | H04N 5/265 |

OTHER PUBLICATIONS

Peter J. Burt et al., "A Multiresolution Spline With Application to Image Mosaics," RCA David Sarnoff Research Center, ACM Transactions on Graphics, vol. 2. No. 4, Oct. 1983, pp. 217-236.

Davide Scaramuzza et al., "A Flexible Technique for Accurate Omnidirectional Camera Calibration and Structure from Motion," IEEE Computer Society, Proceedings of the Fourth IEEE International Conference on Computer Vision Systems (ICVS 2006), pp. 1-8.

Matthew Brown et al., "Automatic Panoramic Image Stitching using Invariant Features," http://matthewalunbrown.com/papers/ijcv2007.pdf, 2007, pp. 1-16.

Olga Sorkine-Hornung et al., "Least-Squares Rigid Motion Using SVD," Department of Computer Science, ETH Zurich, Jan. 16, 2017, pp. 1-5.

Fan Zhang et al., "Parallax-tolerant Image Stitching," Department of Computer Science, Portland State University, http://web.cecs.pdx.edu/~fliu/papers/cvpr2014-stitching.pdf, 2014, pp. 4321-4328.

Zhengyou Zhang, "A Flexible New Technique for Camera Calibration," Technical Report MSR-TR-98-71, Microsoft Research, Microsoft Corporation, Redmond, WA, Dec. 2, 1998, pp. 1-21.

* cited by examiner

DEPTH-BASED IMAGE STITCHING FOR HANDLING PARALLAX

CROSS REFERENCE TO OTHER APPLICATIONS

This application claims priority to U.S. Provisional Patent Application No. 62/899,610 entitled DEPTH-BASED IMAGE STITCHING FOR HANDLING PARALLAX filed Sep. 12, 2019, which is incorporated herein by reference for all purposes.

BACKGROUND OF THE INVENTION

Image stitching is a process that combines multiple photographic images with overlapping fields of view to produce a single panoramic or 360 degree stitched view composed of pieces or segments that are stitched together from the multiple images. Current approaches to image stitching often rely on having an exact overlap region between the images being stitched together and on having matching exposures for each of the multiple images being combined in order to produce a seamless stitched result. In certain applications such as virtual reality or VR photography, image stitching is used to generate a complete scene as a single image viewed by rotating about a single central position that enables interactive viewing over a 360-degree circle or spherical view from a particular perspective.

In some cases, a single stitched image can be created by stitching together fisheye images having a wide field of view (e.g., greater than 180 degrees) using an omnidirectional camera. As an example, to obtain overlapping views of a panorama with a minimal number of separate images, a fisheye lens can be used to provide wide angles of view including angles greater than 180 degrees, such as 220 and 250 degrees. In some applications, 360-degree cameras with two lenses are employed to accommodate a full 360-degree angle with the two lenses facing in appropriate directions. For instance, two or more photographic images and videos with an angle of over 180 degrees, e.g. 220 degrees, can be taken to capture the entirety of a scene which can be converted into a 360-degree object by stitching the two or more images together.

Stitching images together to limit the presence of undesired artifacts in a seamless manner poses certain challenges due at least in part on physical limitations arising from variations and imperfections due to the physical setup and environment in which the images are taken. Attempting to stitch multiple images to form a single stitched image can result in undesirable visible seams or noticeable artifacts in the final stitched image due to inadequate handling of lens distortion, camera misalignment, parallax, scene motion, and exposure differences between the images being stitched together.

To address the impact of lens distortion and to provide enough detectable features for proper alignment of the images being combined, current approaches rely on a set of images to be stitched together to ideally include a reasonable amount of overlap, for example, preferably at least 15-30%. If possible, it is also desirable to have consistent exposure between frames in a set of images to minimize the visibility of any seams in the final result.

But as is often the case in actual real-world situations, the captured scene includes rapid movement or dynamic motion resulting in artifacts due in part to time differences between image segments or changes in intensity across the captured scene. Because contrast and intensity often changes across a set of frames, blind stitching through feature-based alignment methods can cause imperfections in the stitched panoramic image. Other undesired artifacts such as ghosting can also result from mishandling the presence of parallax, lens distortion, motion in the scene, and misalignment. In particular, stitching images not taken from exactly the same location (e.g., on a pivot about an entrance pupil of a camera) can lead to parallax errors in the stitched image.

Accordingly, it would be advantageous to provide a solution to the problem of image stitching that addresses issues of lens distortion, camera misalignment, parallax, scene motion, and exposure differences from combining multiple images. It would also be beneficial if such a solution could compensate for undesired artifacts due to the physical setup of cameras. In particular, such a solution should be robust to sources of variation between images being stitched in a manner that is computationally efficient and produces quality results by limiting the presence of noticeable seams and artifacts in the final stitched image that can be used to produce a panoramic view of a complete scene as a single image that enables interactive viewing over a 360-degree circle or spherical view.

BRIEF DESCRIPTION OF THE DRAWINGS

Various embodiments of the invention are disclosed in the following detailed description and the accompanying drawings.

DETAILED DESCRIPTION

Figure 1:
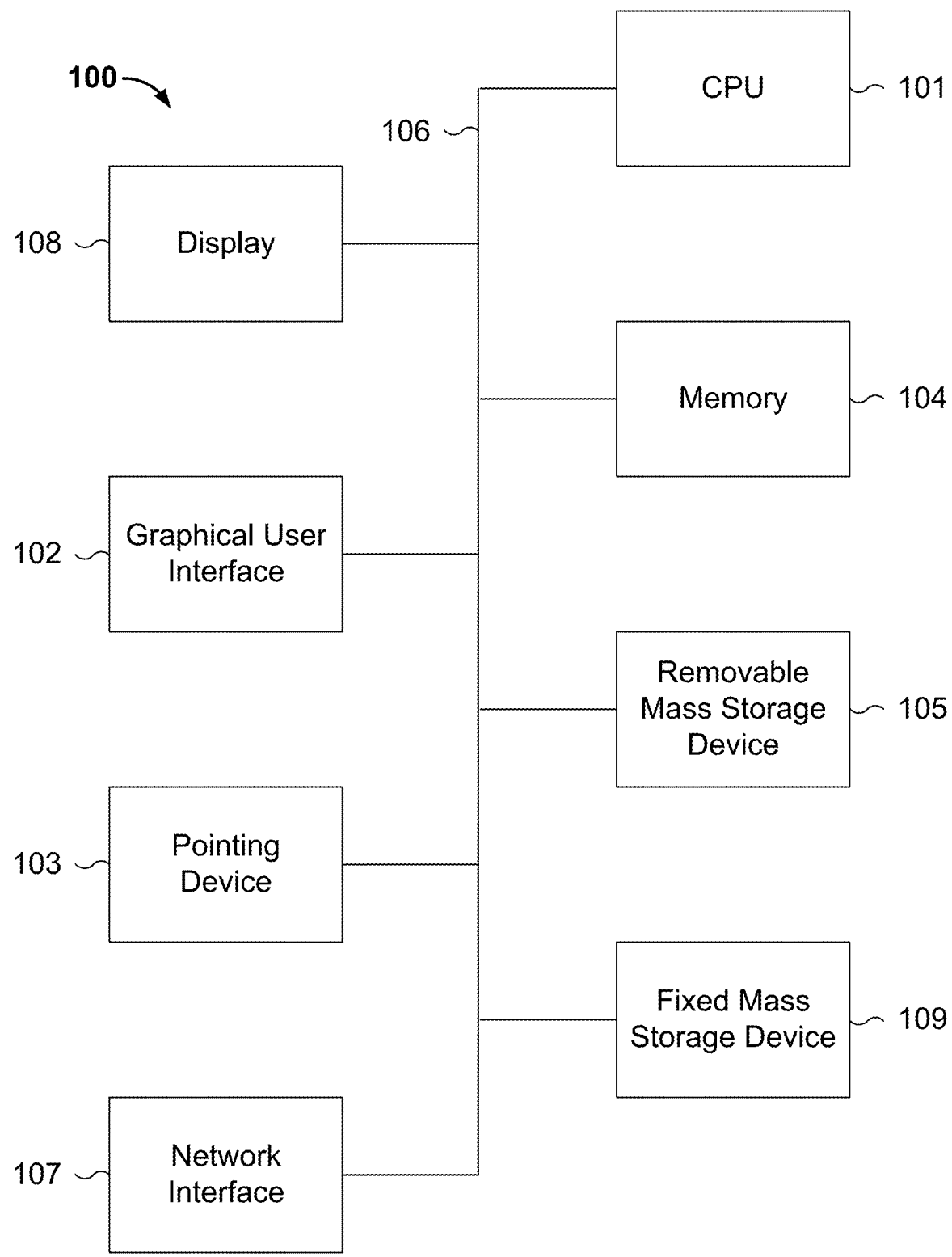
FIG. 1 is a block diagram of a computer system used in some embodiments to perform image stitching.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Most image stitching methods estimate a single alignment between two images to be stitched and perform stitching. However, this single alignment model holds true only in cases where the two images are acquired with a single entrance pupil or single center of perspective. Only then is the misalignment between all objects in each of the images captured by a single 3D rotation. But this is not the case with most imaging systems used to capture images to be stitched. In particular, many imaging systems use different cameras to synchronously capture the images and thus, the images to be stitched are never acquired with the same entrance pupil or center of perspective.

Even in the case where a single camera is used to capture multiple images to be stitched, the camera or lens must be rotated about its entrance pupil which is difficult for various reasons. First, estimating the exact location or position of the entrance pupil is challenging because it lies somewhere inside the lens. Second, a special mechanical assembly is required to achieve this rotation. Because most camera systems configured to acquire images to be stitched do not meet the basic criteria of having a single entrance pupil or single center of perspective, the misalignment between all objects in the images is not accurately captured by a simple 3D rotation. Although prior methods might be sufficient in cases where all objects in the images are either very far away from the cameras or are all at a single depth or distance from the camera, because this is an invalid assumption in most cases, prior methods are inadequate.

In some cases, a parallax problem exists due to imaging systems having cameras that do not share a single common entrance pupil or a single center of perspective. In particular, the objects in the captured images are misaligned by different amounts depending on their depth or distance from the cameras. Because this misalignment depends on the composition of the images, the objects present in the images, and their depth or distance from the cameras, it cannot be estimated by a single uniform misalignment and is also not fixed for a given camera setup since it is dependent on the image contents.

Some methods attempt to deal with this parallax problem by breaking the image into small regions and estimating the misalignment for each region separately. However, this strategy will still be inadequate in cases where a smaller image region contains objects of different depths (and thus different misalignments).

Accordingly, as described herein, the problem of misaligned objects in stitching images caused by parallax is addressed by the disclosed technique that includes an image stitching system and method. In some embodiments, an image stitching system comprises: a processor; and a memory coupled with the processor, wherein the memory is configured to provide the processor with instructions that when executed cause the processor to: estimate a depth of objects in a stitching region of two images; align the two images based at least in part on aligning the objects in the stitching region using the estimated depth of the objects; and stitch the aligned images to form a stitched image.

In some cases, the objects comprise corresponding pixels in two images to be stitched. Estimating the depth comprises determining a disparity map for each pixel associated with an object to be aligned. In these cases, aligning the two images is based at least in part on the disparity map.

In some examples, the memory is further configured to provide the processor with instructions that when executed cause the processor to pre-process each of the two images. In some cases, pre-processing each of the two images includes calibrating and/or rectifying each of the two images. Estimating the depth comprises determining a disparity map for each pixel in a stitching region based on the calibrated and/or rectified images.

As an example, pre-processing can include rectifying a first image to form a first rectified image and rectify a second image to form a second rectified image. Additionally or in the alternative, pre-processing can include calibrating a first image to form a first calibrated image and calibrating a second image to form a second calibrated image and rectifying comprises performing a rectification process on an overlap region of the first calibrated image and the second calibrated image. In some cases, estimating the depth comprises determining a first disparity map and a second disparity map based at least in part on the first rectified image and the second rectified image. In these cases, aligning the two images includes aligning a first rectified image and a second rectified image based at least in part on the first disparity map and the second disparity map.

As an example, in some embodiments, the memory is configured to provide the processor with instructions which when executed cause the processor to: rectify a first image to form a first rectified image and rectify a second image to form a second rectified image; determine a first disparity map and a second disparity map based at least in part on the first rectified image and the second rectified image; align the first rectified image and the second rectified image based at least in part on the first disparity map and the second disparity map; and stitch the aligned images to form a stitched image.

In some embodiments, an image stitching method comprises: rectifying a first image to form a first rectified image and rectifying a second image to form a second rectified image; determining a first disparity map and a second disparity map based at least in part on the first rectified image and the second rectified image; aligning the first rectified image and the second rectified image based at least in part on the first disparity map and the second disparity map; and stitching the aligned images to form a stitched image.

In some embodiments, images and parameters that are obtained, received, used, estimated, determined or generated by the image stitching method are stored in a database. These parameters include, for example, rectified images, disparity maps, and parameters determined or used in the alignment and stitching processes. The originally received images can also be stored in the database.

In addition, embodiments of the disclosed technique further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the disclosed technique, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

For instance, in some embodiments, a computer program product for image stitching is disclosed, the computer program product being embodied in a tangible computer readable storage medium and comprising computer instructions for: rectifying a first image to form a first rectified image and rectifying a second image to form a second rectified image; determining a first disparity map and a second disparity map based at least in part on the first rectified image and the second rectified image; aligning the first rectified image and the second rectified image based at least in part on the first disparity map and the second disparity map; and stitching the aligned images to form a stitched image.

In some embodiments, as will be described in more detail below, the first image and the second image are calibrated using a 3D calibration process configured to remove or compensate for the effects of lens distortion and camera misalignment. Once the first and second images have been calibrated to remove differences between the images due to lens distortion and camera misalignment, rectification is performed on the images to provide a computationally efficient method for compensating for misalignment due to parallax. In particular, the problem of determining the disparity between matched pairs of points due to parallax in two images of a scene is reduced from a two-dimensional to a one-dimensional search space. In this manner, the rectification process as disclosed herein provides an approach to compensating for misalignment between images due to parallax in computationally efficient manner.

In some embodiments, the first image is captured by a first camera or lens and the second image is captured by a second camera or lens and rectifying the first image to form a first rectified image and rectifying the second image to form a second rectified image comprises performing a rectification process on an overlap region of the first image and the second image based at least in part on the overlap of a first field of view associated with the first camera or lens and a second field of view associated with the second camera or lens.

In some embodiments, the first image is captured by a first fisheye lens and the second image is captured by a second fisheye lens. The 3D calibration process comprises projecting the first image onto a first sphere to obtain a first spherical image and projecting the second image onto a second sphere to obtain a second spherical image. Additionally, rectifying the first image to form a first rectified image and rectifying the second image to form a second rectified image comprises performing a rectification process on an overlap region of the first spherical image and the second spherical image based at least in part on the overlap of a first field of view associated with the first camera or lens and a second field of view associated with the second camera or lens.

In some embodiments, once the images are rectified, every point in the first rectified image (e.g., a left rectified image associated with a left camera/lens) is matched to a point in the same row of the second rectified image (e.g., a right rectified image associated with a right camera/lens) resulting in a set of matched pairs of points. The distance in between the horizontal positions of each pair of two points (e.g., matched pairs of points) is the disparity. In this case, a disparity value is determined for each point in the first rectified image to generate a first disparity map (e.g., a left-to-right disparity map). This disparity is inversely proportional to the depth of the point. The disparity between matching points in the first and second rectified images provides a measure for the adjustment that needs to be made in order for each point in the first rectified image to align with the second rectified image to lessen the appearance of visible artifacts and seams in the stitched image.

In some cases, a disparity estimation or disparity map generation process is also performed on the second rectified image. Specifically, every point in the second rectified image (e.g., a right rectified image associated with a right camera/lens) is matched to a point in the same row of the first rectified image (e.g., a left rectified image associated with a left camera/lens) to generate a second disparity map (e.g., a right-to-left disparity map). The second disparity map provides a measure for an adjustment for each point in the second rectified image to be shifted to align with a corresponding point in the first rectified image. An alignment process based at least in part on disparity maps can lessen the appearance of visible artifacts and seams in the stitched image.

In some embodiments, the first disparity map is filtered to obtain a first filtered disparity map and the second disparity map is filtered to obtain a second filtered disparity map. In this case, raw disparity maps (e.g., the first disparity map and the second disparity map) are initially determined based at least in part on the rectified images and the raw disparity maps are filtered to remove undesired artifacts due to invalid, missing, or incorrect disparity values. In some cases, as will be described in more detail below, a weighted least squares (WLS) based approach is used to filter the initial raw disparity maps and the resulting filtered disparity maps are used to align the two images for stitching. In some cases, to increase computational speed, a Guided Filter is used to filter the initial raw disparity maps and the resulting filtered disparity maps are used to align the two images for stitching. In some cases, the raw and filtered disparity maps are stored in a database and can be retrieved for future use.

In some embodiments, the first rectified image and the second rectified image are aligned based at least in part on the first filtered disparity map and the second filtered disparity map. In some cases, the alignment process comprises using the filtered disparity maps obtained by filtering the raw disparity maps with a WLS filter or a Guided Filter to correct or compensate at least one of the two rectified images for parallax. For example, all objects at a location (e.g., points at a pixel location) in an overlap region are moved from the first rectified image (e.g., the left rectified image) by a disparity at the location such that the objects in the first rectified image perfectly align with the objects in the second rectified image to obtain a first disparity corrected image (e.g., a left disparity corrected image). Once the two disparity corrected images are aligned (e.g., the first disparity corrected image and the second disparity corrected image) the disparity corrected images are stitched together (e.g., using a blending process). In some cases, the disparity corrected images are stored in a database and can be retrieved for future use.

In some cases, the alignment process involves sub-pixel movement (e.g., points are moved from a location at a pixel by a disparity that does not correspond to an integer number of pixels). In these cases, an interpolation (e.g., nearest neighbor interpolation or bilinear interpolation) is performed to align the images based on the disparity maps.

In some cases, multiband blending is used to stitch the first disparity corrected image and the second disparity corrected rectified image in rectified form. In other cases, a simple linear blending such as feather blending is used. This compensates for the parallax effect and creates a parallax-free stitched rectified image. In some cases, the parallax free stitched rectified image is converted to an equirectangular image for viewing.

In some embodiments, the first image is captured by a first camera or lens and the second image is captured by a second camera or lens. Rectification is performed on the first and second images in an overlap region defined by the first camera or lens and the second camera or lens. A first disparity map and a second disparity map are determined based at least in part on a first rectified image and a second rectified image in the overlap region. A first disparity map and a second disparity map are filtered (e.g., using a WLS filter or a Guided Filter). Additionally, in some cases, a disparity adjusted first image and a disparity adjusted right image are obtained by adjusting each of the filtered disparity maps before applying them to align the first rectified image and the second rectified image. In particular, the alignment process comprises using the adjusted filtered disparity maps (e.g., a first adjusted disparity map and a second adjusted disparity map) to adjust each of the two rectified images (e.g., the first rectified image and the second rectified image) for parallax before stitching the images together to form a stitched image.

In some cases, as will be described in more detail below, adjusting each of the filtered disparity maps comprises performing a linear weighting process to weight the filtered disparity maps. In some cases, adjusting the first filtered disparity map and the second filtered disparity map comprises performing a linear weighting process to smoothen a transition between an overlap and a non-overlap region. As an example, a linear weighting process is configured to adjust the first filtered disparity map and the second filtered disparity map such that, when applied to align the first rectified image and the second rectified image, a middle section of the first rectified image and a middle section of the second rectified image are substantially aligned for image blending and a transition between the overlap region and a non-overlap region is smoothened. In other cases, adjusting the first filtered disparity map and the second filtered disparity map comprises adjusting the disparity values at a top section or a bottom section of the filtered disparity maps to lessen differences between top and bottom disparity values.

In some embodiments, a blending process is performed to stitch the substantially aligned middle sections of the first rectified image and the second rectified image. The blending process can comprise linear blending or multiband blending. The blending process is performed to lessen or remove the appearance of undesired artifacts or visible seams from the stitched image.

In some examples, the stitched image obtained by the alignment and blending processes is converted to a final stitched image that enables viewing of a panoramic scene. For example, the final stitched image is used to provide interactive viewing over a 360-degree circular or spherical view from a particular perspective. In some cases, the final stitched image enables 360-degree viewing of a scene by rotating a viewer about a single central position.

In some cases, the stitched image is a rectified image and the final stitched image is an equirectangular image. A rectified-to-equirectangular conversion is performed to obtain the final stitched image for 360-degree viewing. In cases where the rectified-to-equirectangular conversion is performed on a rectified image of an overlap area, the final stitched image is obtained using image data from non-overlap regions of the original images (e.g., the first image and the second image) together with the rectified-to-equirectangular converted stitched image of the overlap region.

In some embodiments, the processes of rectification, disparity map generation, disparity map filtering, alignment including disparity correction, stitching, blending and rectified-to-equirectangular conversion described herein are performed only on an overlap region of the first image and the second image. In these cases, the non-overlap region data is directly obtained and used in the final stitched image for viewing from the first and second images (e.g., left and right fisheye images). As described in more detail below, this approach reduces a significant amount of redundant calculation.

In some embodiments, the disclosed image stitching technique is used for video stitching. An inter-frame approach is taken to apply the disclosed image stitching technique to generate a stitched video having a 360-degree viewing perspective.

In some embodiments, a video stitching system comprises a processor; and a memory coupled with the processor, wherein the memory is configured to provide the processor with instructions that when executed cause the processor to: generate a difference map based on comparing a subsequent frame to a previous frame in each of two frame sequences to be stitched; estimate a depth of objects in a stitching region associated with two subsequent frames obtained from a different one of the two frame sequences to be stitched; temporally adjust the depth estimate associated with objects in each of the two subsequent frames based at least in part on a previous depth estimate associated with objects in each of two previous frames; align the two subsequent frames based at least in part on aligning the objects in the stitching region using the temporally adjusted depth estimate; and stitch the aligned subsequent frames to form a stitched frame.

In some embodiments, estimating the depth of objects in a stitching region associated with two subsequent frames comprises determining a subsequent disparity map for each pixel associated with an object to be aligned in the subsequent frames; the previous depth estimate associated with objects in each of two previous frames comprises a previous disparity map for each pixel associated with an object to be aligned in the previous frames; temporally adjusting the depth estimate associated with objects in each of the two subsequent frames comprises temporally adjusting the subsequent disparity map based at least in part on the previous disparity map; and aligning the two subsequent frames is based at least in part on the temporally adjusted subsequent disparity map.

In some cases, the objects to be aligned in the stitching region comprise corresponding pixels in the two frames to be stitched and estimating the depth comprises determining a disparity map for each pixel associated with an object to be aligned. In these cases, aligning the two frames is based at least in part on the disparity map.

In some examples, the memory is further configured to provide the processor with instructions that when executed cause the processor to pre-process each of the two subsequent frames. In some cases, pre-processing each of the two subsequent frames includes calibrating and/or rectifying each of the two subsequent frames and estimating the depth comprises determining a disparity map for each pixel in a stitching region based on the calibrated and/or rectified subsequent frames.

In some embodiments, a video stitching system comprises a processor and a memory coupled with the processor. The memory is configured to provide the processor with instructions that when executed cause the processor to: rectify a subsequent first frame in a first frame sequence to form a subsequent first rectified frame and rectify a subsequent second frame in a second frame sequence to form a subsequent second rectified frame; determine a subsequent first disparity map and a subsequent second disparity map based at least in part on the subsequent first rectified frame and the subsequent second rectified frame; generate a first difference map by comparing the subsequent first rectified frame to a previous first rectified frame and generate a second difference map by comparing the subsequent second rectified frame to a previous second rectified frame; temporally adjust the subsequent first disparity map based at least in part on the first difference map and a previous first disparity map and temporally adjust the subsequent second disparity map based at least in part on the second difference map and a previous second disparity map; align the subsequent first rectified frame and the subsequent second rectified frame based at least in part on the subsequent first temporally adjusted disparity map and the subsequent second temporally adjusted disparity map; and stitch the aligned subsequent first and second rectified frames to form a subsequent stitched rectified frame.

In some embodiments, a video stitching method comprises: rectifying a subsequent first frame in a first frame sequence to form a subsequent first rectified frame and rectifying a subsequent second frame in a second frame sequence to form a subsequent second rectified frame; determining a subsequent first disparity map and a subsequent second disparity map based at least in part on the subsequent first rectified frame and the subsequent second rectified frame; generating a first difference map by comparing the subsequent first rectified frame to a previous first rectified frame and generating a second difference map by comparing the subsequent second rectified frame to a previous second rectified frame; temporally adjusting the subsequent first disparity map based at least in part on the first difference map and a previous first disparity map and temporally adjusting the subsequent second disparity map based at least in part on the second difference map and a previous second disparity map; aligning the subsequent first rectified frame and the subsequent second rectified frame based at least in part on the subsequent first temporally adjusted disparity map and the subsequent second temporally adjusted disparity map; and stitching the aligned subsequent first and second rectified frames to form a subsequent stitched rectified frame.

In some embodiments, a computer program product for video stitching is disclosed, the computer program product being embodied in a tangible computer readable storage medium and comprising computer instructions for: rectifying a subsequent first frame in a first frame sequence to form a subsequent first rectified frame and rectifying a subsequent second frame in a second frame sequence to form a subsequent second rectified frame; determining a subsequent first disparity map and a subsequent second disparity map based at least in part on the subsequent first rectified frame and the subsequent second rectified frame; generating a first difference map by comparing the subsequent first rectified frame to a previous first rectified frame and generating a second difference map by comparing the subsequent second rectified frame to a previous second rectified frame; temporally adjusting the subsequent first disparity map based at least in part on the first difference map and a previous first disparity map and temporally adjusting the subsequent second disparity map based at least in part on the second difference map and a previous second disparity map; aligning the subsequent first rectified frame and the subsequent second rectified frame based at least in part on the subsequent first temporally adjusted disparity map and the subsequent second temporally adjusted disparity map; and stitching the aligned subsequent first and second rectified frames to form a subsequent stitched rectified frame.

In some embodiments, the subsequent first frame follows a previous first frame in the first frame sequence and the subsequent second frame follows a previous second frame in the second frame sequence. In some cases, the first frame sequence is captured or obtained by a first video camera or lens and the second frame sequence is captured or obtained by a second video camera or lens.

In some cases, the memory is further configured to provide the processor with instructions that when executed cause the processor to calibrate the subsequent first frame and calibrate the subsequent second frame.

In the case of stitching successive frames in a video, temporal continuity between successive frames (e.g., a previous frame and a subsequent frame in a frame sequence) is improved by temporally adjusting disparity values in the subsequent disparity maps (e.g., determined based on the subsequent first frame and subsequent second frame) based on disparity values obtained from previous disparity maps (e.g., determined based on the previous first frame and previous second frame) and difference maps (e.g., a first difference map and a second difference map). In some instances, the temporal adjustment comprises a weighted sum of disparity values in the subsequent and previous disparity maps, wherein the weighting process is based at least in part on difference maps determined by comparing a subsequent frame and a previous frame in a frame sequence.

In some cases, the comparison includes determining a grayscale difference between the subsequent frame and the previous frame. For example, in some cases, comparing the subsequent first rectified frame to a previous first rectified frame and comparing the subsequent second rectified frame to a previous second rectified frame is based on a grayscale difference.

In some examples, the disparity values in the disparity maps used to align the subsequent first and second frames to each other for video stitching are adjusted using a weighted sum of previous disparity values from previous disparity maps and subsequent disparity values from subsequent disparity maps. In particular, in some cases, temporally adjusting the subsequent first disparity map is based at least in part on the first difference map and a weighted sum of disparity values from the previous first disparity map and disparity values from the subsequent first disparity map and temporally adjusting the subsequent second disparity map is based at least in part on the second difference map and a weighted sum of disparity values from the previous second disparity map and disparity values from the subsequent second disparity map. In some cases, the weight given to disparity values in the previous first disparity map is determined based at least in part on a difference value obtained from the first difference map and the weight given to disparity values in the previous second disparity map is determined based at least in part on a difference value obtained from the second difference map.

FIG. 1 is a block diagram of a computer system 100 used in some embodiments to perform image stitching. In particular, FIG. 1 illustrates one embodiment of a general purpose computer system. Other computer system architectures and configurations can be used for carrying out the processing of the disclosed technique. Computer system 100, made up of various subsystems described below, includes at least one microprocessor subsystem (also referred to as a central processing unit, or CPU) 101. That is, CPU 101 can be implemented by a single-chip processor or by multiple processors. In some embodiments, CPU 101 is a general purpose digital processor which controls the operation of the computer system 100. Using instructions retrieved from memory 104, the CPU 101 controls the reception and manipulation of input data, and the output and display of data on output devices.

CPU 101 is coupled bi-directionally with memory 104 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 101. Also as is well known in the art, primary storage typically includes basic operating instructions, program code, data, and objects used by the CPU 101 to perform its functions. Primary storage devices 104 may include any suitable computer-readable storage media, described below, depending on whether, for example, data access needs to be bi-directional or uni-directional. CPU 101 can also directly and very rapidly retrieve and store frequently needed data in a cache memory (not shown).

A removable mass storage device 105 provides additional data storage capacity for the computer system 100, and is coupled either bi-directionally (read/write) or uni-directionally (read only) to CPU 101. Storage device 105 may also include computer-readable media such as magnetic tape, flash memory, signals embodied on a carrier wave, PC-CARDS, portable mass storage devices, holographic storage devices, and other storage devices. A fixed mass storage 109 can also provide additional data storage capacity. The most common example of mass storage 109 is a hard disk drive. Mass storages 105, 109 generally store additional programming instructions, data, and the like that typically are not in active use by the CPU 101. It will be appreciated that the information retained within mass storages 105, 109 may be incorporated, if needed, in standard fashion as part of primary storage 104 (e.g., RAM) as virtual memory.

In addition to providing CPU 101 access to storage subsystems, bus 106 can be used to provide access to other subsystems and devices as well. In the described embodiment, these can include a display 108, a network interface 107, a graphical user interface 102, and a pointing device 103, as well as an auxiliary input/output device interface, a sound card, speakers, and other subsystems as needed. The pointing device 103 may be a mouse, stylus, track ball, or tablet, and is useful for interacting with graphical user interface 102.

In some embodiments, a first image and a second image are received or obtained by the computer system 100 and CPU 101 is configured to rectify a first image to form a first rectified image and rectify a second image to form a second rectified image.

In some cases, the first image and the second image are calibrated using a 3D calibration process configured to remove or compensate for the effects of lens distortion and camera misalignment. As an example, in some embodiments, calibrating the first image comprises applying a first correction to the first image to form a first corrected image and calibrating the second image comprises applying a second correction to the second image to form a second corrected image. In these cases, CPU 101 is configured to rectify the first corrected image to form a first rectified image and rectify the second corrected image to form a second rectified image. In some instances, the first correction and the second correction are based at least in part on a 3D calibration process configured to correct for lens distortion and camera misalignment.

In some embodiments, the first image is captured by a first camera or lens and the second image is captured by a second camera or lens. In some examples, the rectification process is performed on an overlap region of the first image and the second image. In some cases, the overlap region is based at least in part on the overlap of a first field of view associated with the first camera or lens and a second field of view associated with the second camera or lens. In some instances, calibrating comprises determining a first distortion model associated with the first camera, a second distortion model associated with the second camera, and a misalignment parameter associated with a misalignment between the first camera and the second camera. In some cases, the first camera and the second camera are the same camera, while in other cases, the first camera and the second camera are different or distinct cameras.

In some embodiments, based at least in part on the first rectified image and the second rectified image, CPU 101 is configured to determine a first disparity map and a second disparity map and to align the first rectified image and the second rectified image based at least in part on the first disparity map and the second disparity map. In these embodiments, CPU 101 is also configured to stitch the aligned images to form a stitched image. The stitched image can be displayed on display 108.

In some cases, aligning the first rectified image and the second rectified image comprises applying a first alignment to the first rectified image based at least in part on the first disparity map to obtain a first aligned image and a second alignment to the second rectified image based at least in part on the second disparity map to obtain a second aligned image. In these cases, CPU 101 is configured to stitch the first aligned image and the second aligned image to form a stitched image. The stitched image can be displayed on display 108. In some cases, graphical user interface 102 is configured to display the stitched image.

The network interface 107 allows CPU 101 to be coupled to another computer, computer network, or telecommunications network using a network connection as shown. Through the network interface 107, it is contemplated that the CPU 101 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 101 can be used to connect the computer system 100 to an external network and transfer data according to standard protocols. That is, method embodiments of the disclosed technique may execute solely upon CPU 101, or may be performed across a network such as the Internet, intranet networks, or local area networks, in conjunction with a remote CPU that shares a portion of the processing. Additional mass storage devices (not shown) may also be connected to CPU 101 through network interface 107.

An auxiliary I/O device interface (not shown) can be used in conjunction with computer system 100. The auxiliary I/O device interface can include general and customized interfaces that allow the CPU 101 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 1 is but an example of a computer system suitable for use with the disclosed technique. Other computer systems suitable for use with the disclosed technique may include additional or fewer subsystems. In addition, bus 106 is illustrative of any interconnection scheme serving to link the subsystems. Other computer architectures having different configurations of subsystems may also be utilized.

Figure 2:
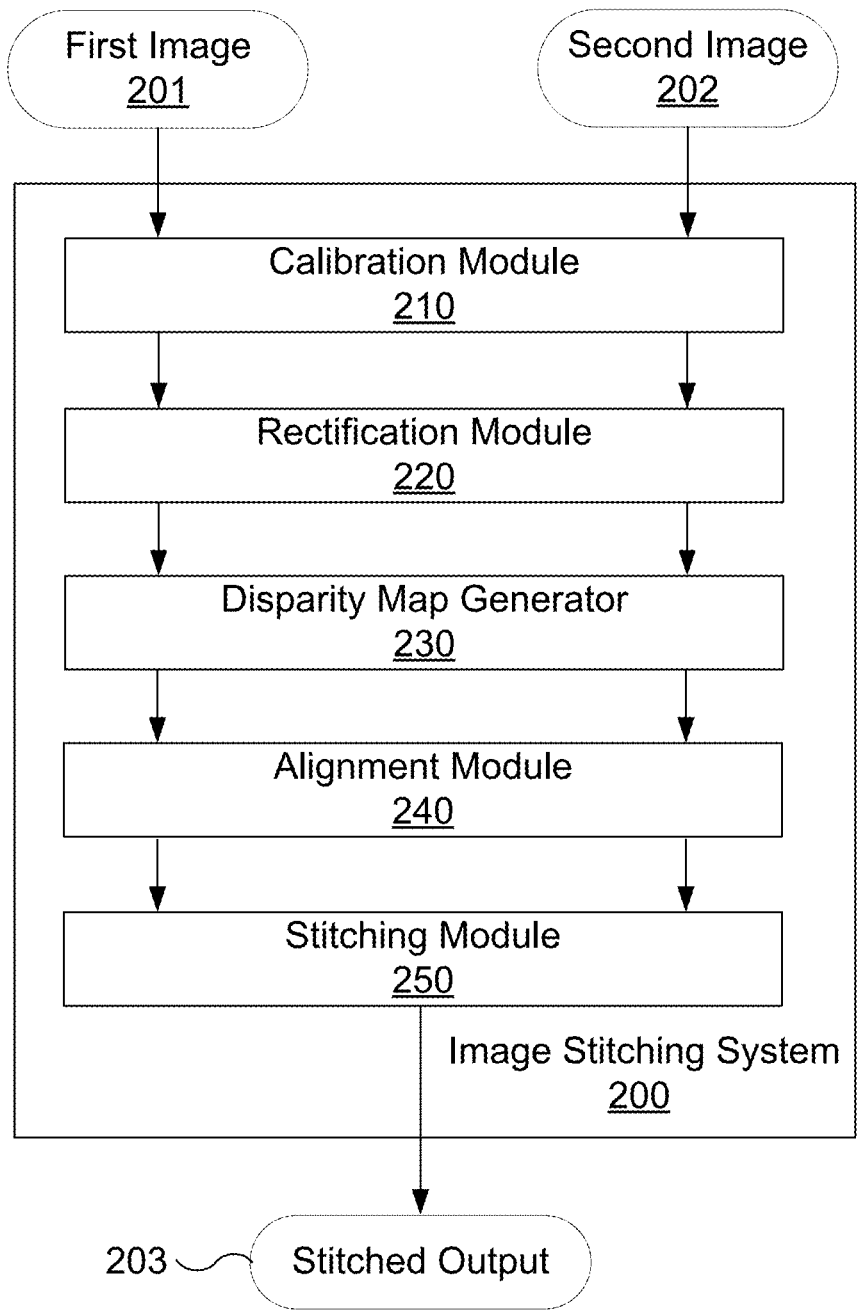
FIG. 2 is a block diagram of a system used in some embodiments to perform a process of image stitching.

FIG. 2 is a block diagram of a system used in some embodiments to perform a process of image stitching. In particular, FIG. 2 illustrates an embodiment of Image Stitching System 200 that comprises a processor and a memory coupled with the processor (not shown) along with a number of modules. The memory is configured to provide the processor with instructions that when executed (e.g., by the various modules shown in FIG. 2) cause the processor to perform a number of steps in the process of image stitching.

As shown in FIG. 2, Image Stitching System 200 is configured to receive a first image at 201 and a second image at 202. In the example shown, Rectification Module 220 is configured to rectify a first image to form a first rectified image and to rectify a second image to form a second rectified image.

Disparity Map Generator 230 is configured to estimate a depth of objects in a stitching region of the two images (e.g., the first rectified image and the second rectified image). In some cases, the objects comprise corresponding pixels in the two images to be stitched and estimating the depth comprises determining a disparity map for each pixel associated with an object to be aligned. In these cases, Alignment Module 240 is configured to align the two images based at least in part on aligning the objects in the stitching region using the estimated depth of the objects.

In some embodiments, Disparity Map Generator is configured to determine a first disparity map and a second disparity map based at least in part on the first rectified image and the second rectified image. Alignment Module 240 is configured to align the first rectified image and the second rectified image based at least in part on the first disparity map and the second disparity map. In some cases, Alignment Module 240 is configured to align the first rectified image based at least in part on the first disparity map to generate a first disparity corrected image and to align the second rectified image based at least in part on the second disparity map to generate a second disparity corrected image.

Stitching Module 250 is configured to stitch the aligned images to form a stitched image. In some cases, Stitching Module 250 is configured to stitch the first disparity corrected image and the second disparity corrected image to form a stitched image.

In some examples, the first image and the second image are calibrated by Calibration Module 210 using a 3D calibration process configured to remove or compensate for the effects of lens distortion and camera misalignment. Once the first and second images have been calibrated to remove differences between the images due to lens distortion and camera misalignment, rectification is performed on the images by Rectification Module 220 to provide a computationally efficient method for compensating for misalignment due to parallax. In particular, the problem of determining the disparity between matched pairs of points due to parallax in two images of a scene is reduced from a two-dimensional to a one-dimensional search space. In this manner, the rectification process as disclosed herein provides an approach to compensating for misalignment between images due to parallax in computationally efficient manner.

In some cases, the first image is calibrated to form a first calibrated image and the second image is calibrated to form a second calibrated image. The first calibrated image is rectified to form a first rectified image and the second calibrated image is rectified to form a second rectified image. In some cases, rectification is performed on an overlap region of the first and second images.

In some cases, the 3D calibration process is performed by Calibration Module 210 for a particular camera or lens setup on an initial set of images and calibration parameters are stored for future use on subsequent images to be stitched using the particular camera or lens setup. In some cases, the stored calibration parameters can be used by Calibration Module 210 for the calibration step provided the particular camera or lens setup does not change substantially. In cases where the camera or lens setup is changed to a new configuration, the 3D calibration process can be performed by Calibration Module 210 on another set of images based on the new configuration and those calibration parameters may be stored for future use on subsequent images to be stitched using the new configuration.

In some cases, the alignment process involves sub-pixel movement (e.g., points are moved from a location at a pixel by a disparity that does not correspond to an integer number of pixels). In these cases, Alignment Module 240 is configured to interpolate (e.g., using nearest neighbor interpolation or bilinear interpolation) to align the first rectified image and the second rectified image based at least in part on the first disparity map and the second disparity map.

In some cases, using nearest neighbor interpolation results in blocky features along lines in the stitched output. Accordingly, in a preferable embodiment, bilinear interpolation is used for interpolation resulting in fast implementation and improved smoothness in the stitched output.

Figure 3A:
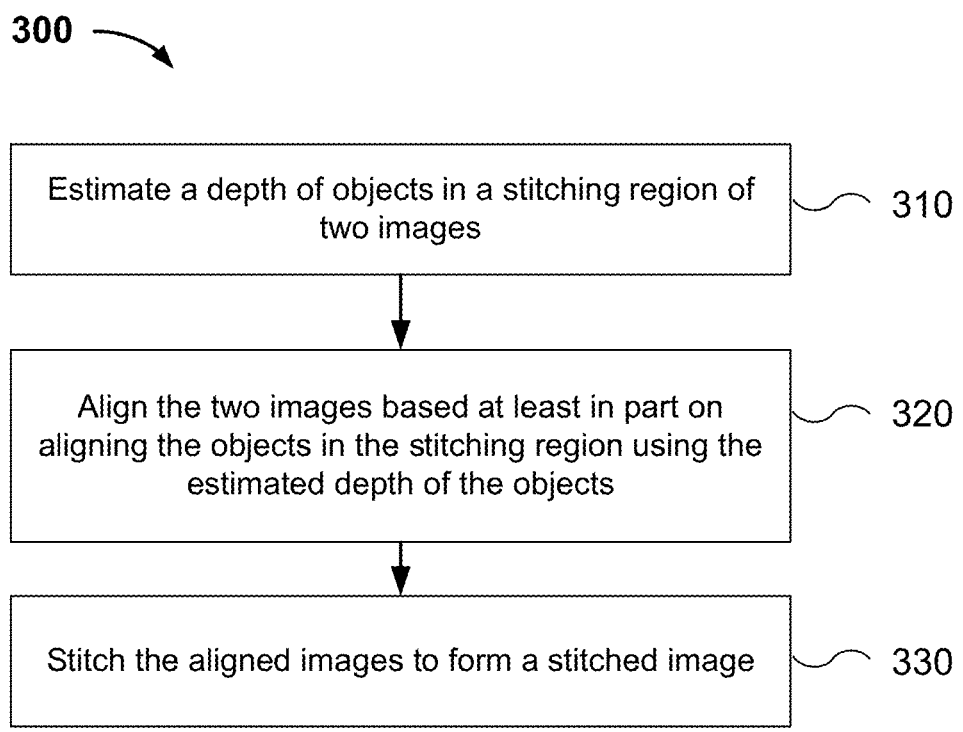
FIG. 3A is a flowchart of an embodiment of an image stitching method that can be performed by the exemplary systems depicted in FIGS. 1 and 2.

FIG. 3A is a flowchart of an embodiment of an image stitching method 300 that can be performed by the exemplary systems depicted in FIGS. 1 and 2. As shown in FIG. 3A, image stitching method 300 comprises estimating a depth of objects in a stitching region of two images at 310. At 320, the two images are aligned based at least in part on aligning the objects in the stitching region using the estimated depth of the objects. At 330, the aligned images are stitched to form a stitched image.

Although not shown in FIG. 3A, in some embodiments, the objects comprise corresponding pixels in two images to be stitched. Estimating the depth comprises determining a disparity map for each pixel associated with an object to be aligned.

In some cases, the disclosed image stitching method further comprises pre-processing each of the two images. For example, pre-processing each of the two images can include calibrating (e.g., by performing a calibration process as described herein) and/or rectifying (e.g., by performing a rectification process as described herein) each of the two images. In such cases, estimating the depth comprises determining a disparity map for each pixel in a stitching region based on the calibrated and/or rectified images and aligning the two images is based at least in part on the disparity map.

Figure 3B:
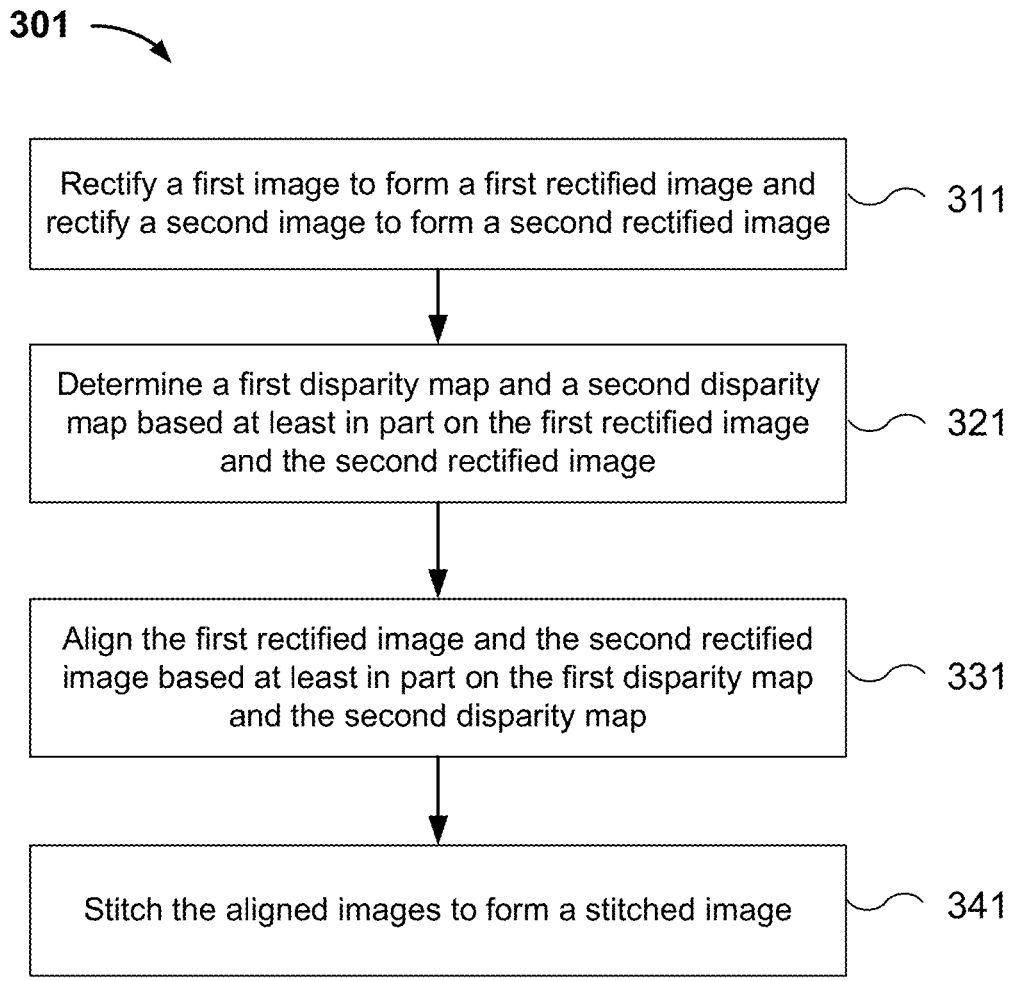
FIG. 3B is a flowchart of another embodiment of an image stitching method that can be performed by the exemplary systems depicted in FIGS. 1 and 2.

FIG. 3B is a flowchart of an embodiment of an image stitching method 301 that can be performed by the exemplary systems depicted in FIGS. 1 and 2. As shown in FIG. 3B, image stitching method 301 comprises rectifying a first image to form a first rectified image and rectifying a second image to form a second rectified image at 311 and determining a first disparity map and a second disparity map based at least in part on the first rectified image and the second rectified image at 321. Rectification of the two images can be performed by Rectification Module 220 of FIG. 2 and disparity maps can be determined using Disparity Map Generator 230 of FIG. 2. In some cases, the images are calibrated before or after rectification. In some instances, for example, the first image is calibrated to form a first calibrated image and the second image is calibrated to form a second calibrated image. The first calibrated image is rectified to form a first rectified image and the second calibrated image is rectified to form a second rectified image. In some cases, rectification is performed on an overlap region of the first and second images. As described herein, a 3D calibration process can be performed by Calibration Module 210 of FIG. 2.

Image stitching method 301 also includes aligning the first rectified image and the second rectified image based at least in part on the first disparity map and the second disparity map at 331 and stitching the aligned images to form a stitched image at 341. Alignment and stitching can be performed by Alignment Module 240 and Stitching Module 250 of FIG. 2 respectively.

In some cases, the aligning step at 331 involves sub-pixel movement (e.g., points are moved from a location at a pixel by a disparity that does not correspond to an integer number of pixels). In these cases, an interpolation (e.g., nearest neighbor interpolation or bilinear interpolation) is performed to align the first rectified image and the second rectified image based at least in part on the first disparity map and the second disparity map.

In some cases, using nearest neighbor interpolation results in blocky features along lines in the stitched output. Accordingly, in a preferable embodiment, bilinear interpolation is used for interpolation resulting in fast implementation and improved smoothness in the stitched output.

In some cases, the aligning step at 331 comprises aligning the first rectified image based at least in part on the first disparity map to generate a first disparity corrected image and aligning the second rectified image based at least in part on the second disparity map to generate a second disparity corrected image. In these cases, the stitching step at 341 comprises stitching the first disparity corrected image and the second disparity corrected image to form a stitched image.

In some cases, the first image is provided by a first camera or lens and the second image is provided by a second camera or lens. For example, the first image and the second image can be captured at substantially the same moment in time and cameras placed adjacent to each other at substantially the same location or position. In some cases, the first camera and the second camera are positioned with their respective lenses pointed in opposite directions along an optical axis such that the first field of view associated with the first camera overlaps the second field of view associated with the second camera and the first field of view taken together with the second field of view includes a full 360 degree view from a particular perspective. As an example, a first fisheye image from a first camera and a second fisheye image from a second camera are captured at substantially the same moment in time, the first camera and the second camera being positioned so that their lenses point in opposite directions. In some embodiments, each of the first camera and the second camera has a field of view of more than 180 degrees to provide an overlap region consisting of the overlap of the field of view of the first camera and the field of view of the second camera. In some cases, each of the first camera and the second camera has a field of view of at least 190 degrees, 220 degrees and up to 250 degrees (e.g., for cameras using a wide angle fisheye lens). The larger the field of view of each camera, the larger the possible resulting overlap region between the two cameras.

In some cases, the images are calibrated using a 3D calibration process configured to remove or compensate for the effects of lens distortion and camera misalignment. Once the first and second images have been calibrated to remove differences between the images due to lens distortion and camera misalignment, rectification is performed on the images by to provide a computationally efficient method for compensating for misalignment due to parallax. In particular, the problem of determining the disparity between matched pairs of points due to parallax in two images of a scene is reduced from a two-dimensional to a one-dimensional search space. In this manner, the rectification process as disclosed herein provides an approach to compensating for misalignment between images due to parallax in computationally efficient manner.

In some cases, the 3D calibration process is performed by Calibration Module 210 for a particular camera or lens setup on an initial set of images and calibration parameters are stored for future use on subsequent images to be stitched using the particular camera or lens setup. In some cases, the stored calibration parameters can be used by Calibration Module 210 for the calibration step provided the particular camera or lens setup does not change substantially. In cases where the camera or lens setup is changed to a new configuration, the 3D calibration process can be performed by Calibration Module 210 on another set of images based on the new configuration and those calibration parameters may be stored for future use on subsequent images to be stitched using the new configuration.

In embodiments where the first image and the second image are captured using wide angle fisheye lenses (e.g., having large fields of view that are greater than 180 degrees), the 3D calibration process includes performing a wide angle fisheye lens calibration process using an omnidirectional camera model.

An omnidirectional camera model and calibration methodology are described in "A Flexible Technique for Accurate Omnidirectional Camera Calibration and Structure from Motion," by Scaramuzza, D., Martinelli, A. and Siegwart, R., (2006), which is herein incorporated by reference in its entirety. The calibration procedure requires images of a checkerboard pattern taken from different orientations without any knowledge about the camera orientation or the checkerboard orientation. This omnidirectional camera model is described below with respect to FIGS. 4A-4C.

Figure 4A:
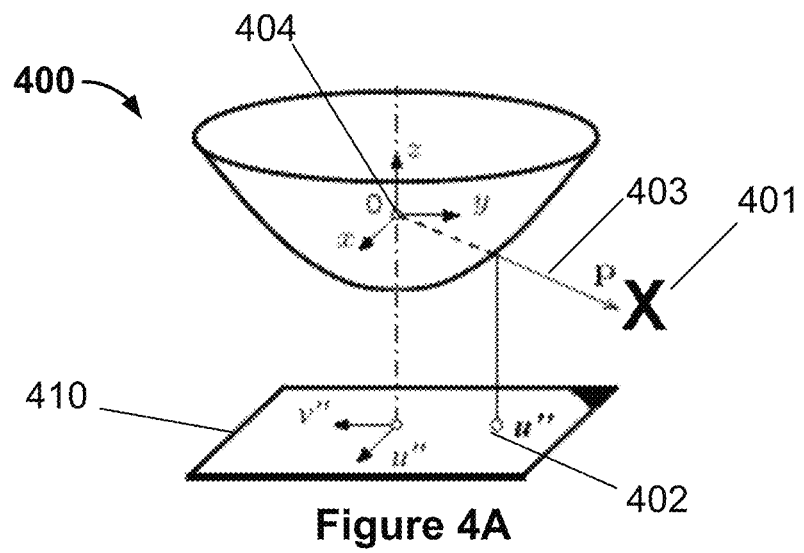
FIG. 4A depicts a coordinate system in the catadioptric case.
Figure 4B:
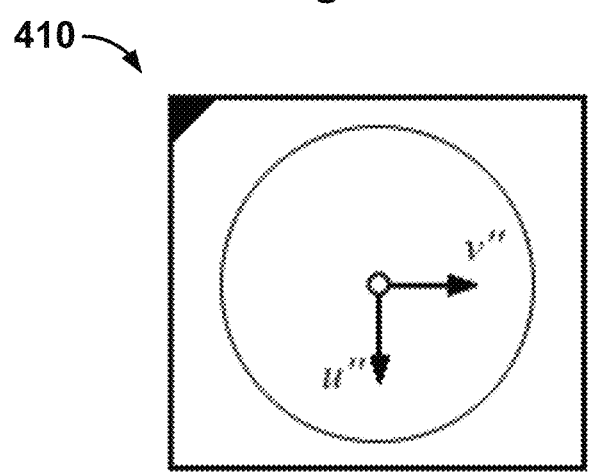
FIG. 4B depicts a sensor plane in metric coordinates.
Figure 4C:
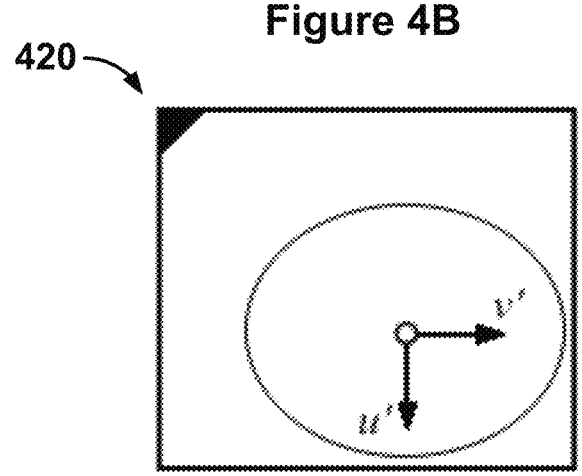
FIG. 4C depicts a camera image plane expressed in pixel coordinates.

FIG. 4A depicts a coordinate system 400 in the catadioptric case. FIG. 4B depicts a sensor plane 410 in metric coordinates and FIG. 4C depicts a camera image plane 420, expressed in pixel coordinates. As described in more detail below, the sensor plane 410 of FIG. 4B and the camera image plane 420 of FIG. 4C are related by an affine transformation.

In this example, as shown in FIG. 4A, X is a scene point (shown at 401). Referring to FIGS. 4A-4B, u"=[u", v"] is the projection of X onto the sensor plane 410, and u'=[u', v'] its image in the camera plane 420.

Now, u" and u' are related by an affine transformation that incorporates a digitization and center offset as provided by the following equation:

$$u''=Au'+t \qquad [1]$$

where A is 2×2 and t is 2×1. An image projection function g captures the relationship between a point u" (shown at 402) in the sensor plane and the vector p (shown at 403) emanating from the viewpoint O (shown at 404) to a scene point X (shown at 401). This relationship is captured by the following equation:

$$\lambda p = \lambda g(u'') = \lambda (Au'+t) = PX \qquad [2]$$

where P is the perspective projection matrix representing external camera parameters.

Here, an omnidirectional camera model assumes a form for g, as given by the following equation:

$$g(u'',v'')=(u'',v'',f(u'',v'')) \qquad [3]$$

where f is a function that models lens distortion and is rotationally symmetric with respect to the sensor axis.

The omnidirectional camera model proposes a polynomial form for f, shown in the following equation:

$$f(u'',v'')=a_0+a_1\rho+a_2\rho^2+\ldots+a_N\rho^N \qquad [4]$$

where $\rho$ is the metric distance from the sensor axis. Additionally, polynomials of order 4 are used based on a statistical analysis of experiments.

In this example, a calibration routine involves finding the matrices A, t, P in equation [1] and coefficients of the polynomial ($a_0$, $a_1$, $a_2$ . . . $a_N$) in equation [4] for a given camera. This calibration procedure requires a few images of a checkerboard pattern at different locations and orientations.

To produce quality results, the disclosed technique compensates for undesired artifacts due to lens distortion, camera misalignment, parallax, scene motion, and exposure differences that result from combining multiple images. The disclosed approach separately addresses the impact of mechanical camera misalignments (e.g., a different position in two images due to the 3D orientation of the two cameras) from the effect of parallax (e.g., a different position of an object in two images due to different depths). In particular, as described in further detail below, a 3D calibration of the cameras is first performed (e.g., by Calibration Module 210 of FIG. 2) to estimate camera misalignments during the calibration process leaving only the effects of parallax to be compensated for during the stitching process (e.g., by Stitching Module 250 of FIG. 2). In some cases, calibrating comprises determining a first distortion model associated with the first camera, a second distortion model associated with the second camera, and a misalignment parameter associated with a misalignment between the first camera and the second camera.

In some instances, camera calibration is used to estimate mappings from three dimensions to two dimensions or vice versa from a camera to the real world. For example, perspective camera mappings include extrinsic mappings comprising linear projections; lens distortion mappings include non-linear mappings that capture the effect of the camera lens on the image; and camera sensor projections include intrinsic linear mappings. Mappings are often defined by mapping parameters. For example, extrinsic parameters include location (translation) and orientation (rotation) of the camera, lens distortion parameters include coefficients of an $n^{th}$ degree polynomial used to model the lens distortion, and intrinsic parameters include characteristics of the camera such as focal length, aspect ratio, and optical center retinal location. Mappings and mapping parameters are used to map or translate from one space to another—for example, from a three-dimensional real world coordinate frame represented by world coordinates to a three-dimensional camera coordinate frame to a two-dimensional image coordinate frame represented by pixel coordinates.

Figure 5:
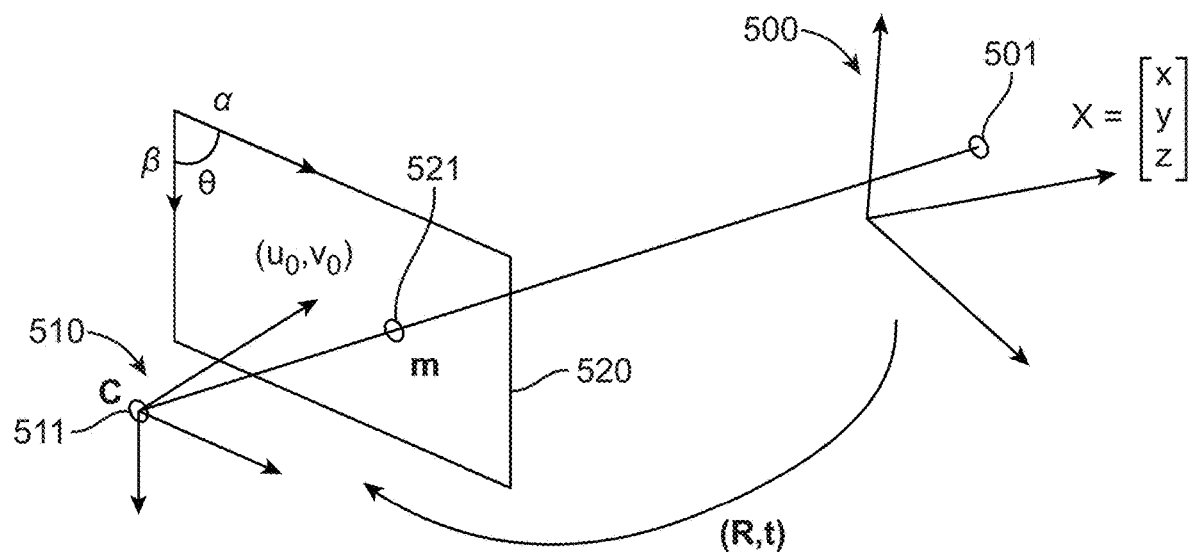
FIG. 5 is a visual depiction of coordinate frames and coordinate frame transformations as described herein.

FIG. 5 is a visual depiction of the coordinate frames and coordinate frame transformations as described herein. In particular, FIG. 5 shows that by applying Camera Matrix P (decomposed as described below) to World Coordinates X (shown at 501) on world coordinate frame 500, the Pixel Coordinates m (shown at 521) on image coordinate frame 520 are obtained. This relationship is captured by the following equation [5]:

$$\underbrace{\begin{bmatrix} u \\ v \end{bmatrix}}_{m} = P \begin{bmatrix} x \\ y \\ z \end{bmatrix}_{X} \quad [5]$$

In this case, Camera Matrix P maps World Coordinates X (shown at 501) to Pixel Coordinates m (shown at 521) and can be decomposed to separate intrinsic parameters (provided by Intrinsic Matrix K) and extrinsic parameters (provided by Extrinsic Matrix [R|t]=E). This decomposition is shown in the following equation [6]:

$$\underbrace{\begin{bmatrix} u \\ v \\ 1 \end{bmatrix}}_{\tilde{m}} = K[R|t] \underbrace{\begin{bmatrix} x \\ y \\ z \\ 1 \end{bmatrix}}_{\tilde{x}} \quad [6]$$

where Intrinsic Matrix K is a 3×3 matrix and Extrinsic Matrix [R|t]=E is a 3×4 matrix. In some cases, Extrinsic Matrix [R|t]=E takes the form of a rigid transformation matrix shown in equation [7] below as a 3×3 rotation matrix in a left block, and 3×1 translation column-vector in a right block.

$$[R|t] = \begin{bmatrix} r_{1,1} & r_{1,2} & r_{1,3} & t_1 \\ r_{2,1} & r_{2,2} & r_{2,3} & t_2 \\ r_{3,1} & r_{3,2} & r_{3,3} & t_3 \end{bmatrix} \quad [7]$$

An extra row of (0,0,0,1) is added to the bottom of the Extrinsic Matrix in some cases making the matrix square and allowing a further decomposition into a rotation R followed by translation t as shown in the following equation [8]:

$$\left[\frac{R|t}{0|1}\right] = \left[\frac{I|t}{0|1}\right] \times \left[\frac{R|0}{0|1}\right] = \begin{bmatrix} 1 & 0 & 0 & t_1 \\ 0 & 1 & 0 & t_2 \\ 0 & 0 & 1 & t_3 \\ 0 & 0 & 0 & 1 \end{bmatrix} \times \begin{bmatrix} r_{1,1} & r_{1,2} & r_{1,3} & 0 \\ r_{2,1} & r_{2,2} & r_{2,3} & 0 \\ r_{3,1} & r_{3,2} & r_{3,3} & 0 \\ 0 & 0 & 0 & 1 \end{bmatrix} \quad [8]$$

As shown in FIG. 5, the Extrinsic Matrix describes how to transform points in World Coordinates X (e.g., shown at 501) to Camera Coordinates C (e.g., shown at 502) on camera coordinate frame 500. In particular, the vector t can be interpreted as the position of the world origin in camera coordinates, and the columns of R represent the directions of the world axes in camera coordinates.

Figure 6:
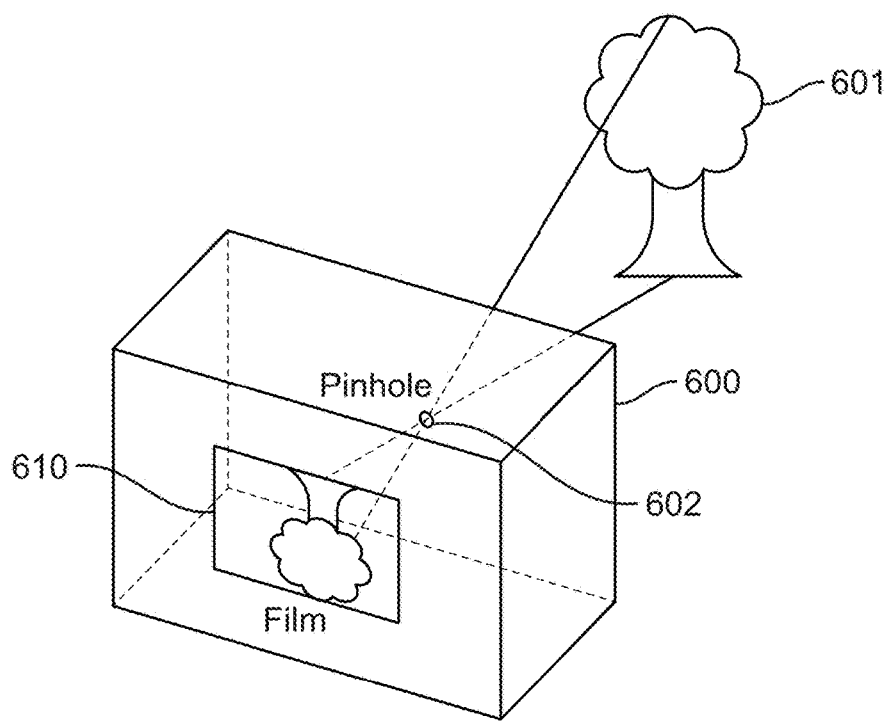
FIG. 6 shows a perspective projection modeled by an ideal pinhole camera.

FIG. 6 shows a perspective projection modeled by an ideal pinhole camera 600. As shown in FIG. 6, an object (e.g., shown at 601) is to be captured by a pinhole camera (e.g., shown at 600) having a pinhole (shown at 602), wherein the image is captured on film (e.g., image plane shown at 610). Returning to the coordinate frames shown in FIG. 5, in this case, Intrinsic Matrix K transforms 3D camera coordinates (e.g., Camera Coordinates C at 502 on camera coordinate frame 500) to 2D homogeneous image coordinates (e.g., Pixel Coordinates m at 521 on image coordinate frame 520), and can be characterized in the following equation [9]:

$$K = \begin{pmatrix} f_x & s & x_0 \\ 0 & f_y & y_0 \\ 0 & 0 & 1 \end{pmatrix} \quad [9]$$

where $f_x$ and $f_y$ are focal lengths (i.e., the distance between the pinhole and the film, which in this case is the image plane, and where $x_0$ and $y_0$ denote the principal point offset.

Figure 7:
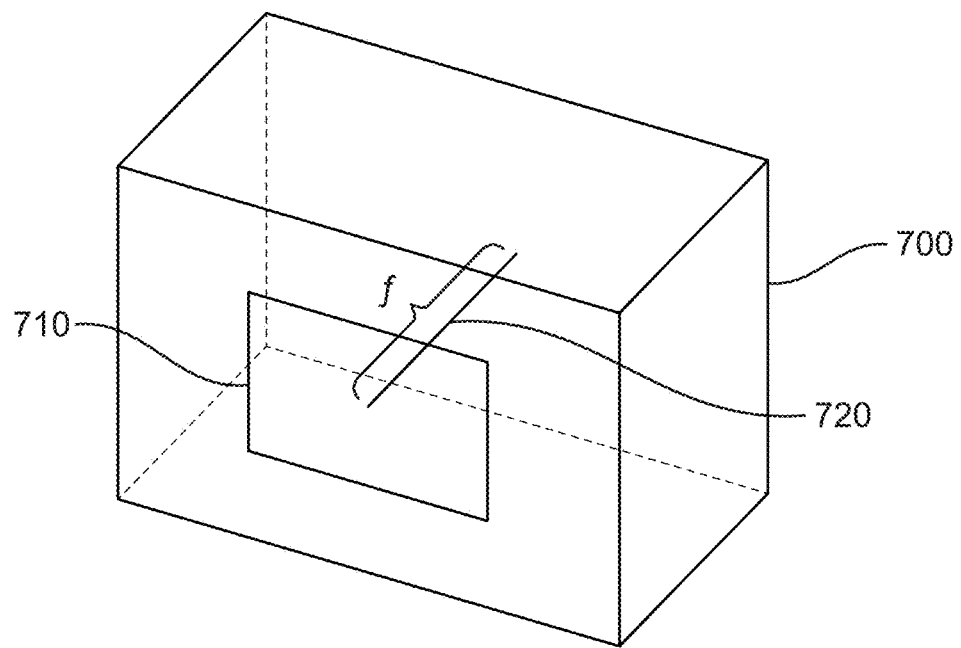
FIG. 7 depicts a true pinhole camera and image plane.

FIG. 7 depicts a true pinhole camera 700 and image plane 710, wherein both $f_x$ and $f_y$ have the same value, which is illustrated as f (e.g., shown at 720). However, in practice, $f_x$ and $f_y$ can differ for a number of reasons including flaws in the digital camera sensor, non-uniform scaling of the image in post-processing, unintentional distortion introduced by the camera's lens, use of an anamorphic format by the camera, where the camera's lens compresses a widescreen scene into a standard-sized sensor, and errors in camera calibration.

Figure 8:
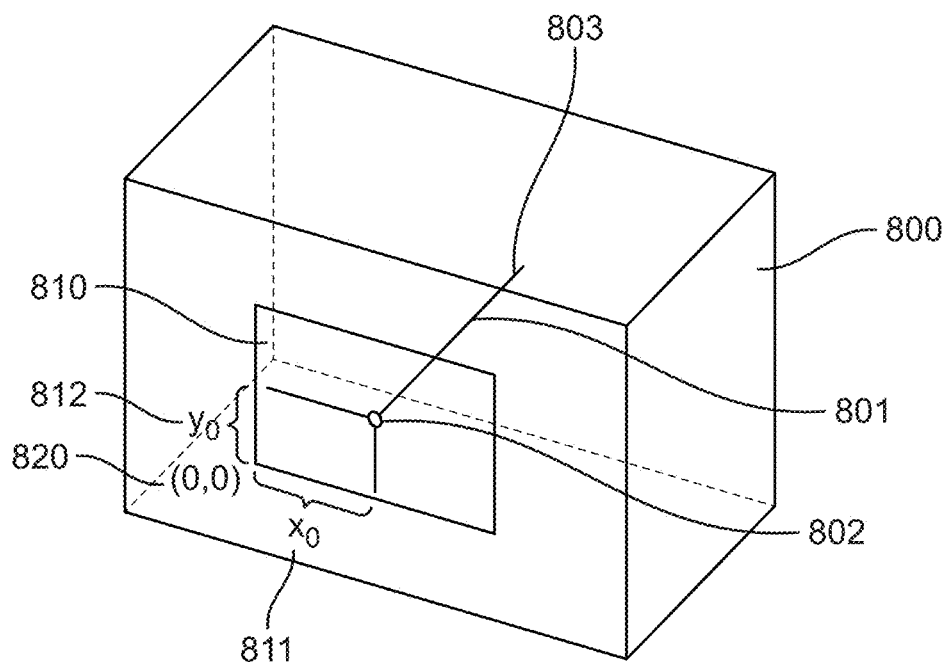
FIG. 8 depicts a pinhole camera with the camera's principal axis shown as a line perpendicular to the image plane that passes through the pinhole.

FIG. 8 depicts a pinhole camera 800 with the camera's principal axis 801 shown as a line perpendicular to the image plane 810 that passes through the pinhole 803. The intersection of the principal axis 801 with the image plane 810 is referred to as the principal point 802. The principal point offset $x_0$ (e.g., shown at 811) and $y_0$ (e.g., shown at 812) is the location of the principal point relative to the film's origin (0,0) shown at 820. The exact definition depends on which convention is used for the location of the origin; the illustration depicted in FIG. 8 assumes that the origin is located at a bottom corner of the film as shown.

Doubling all camera dimensions (film size and focal length) has no effect on the captured scene. The intrinsic matrix is only concerned with the relationship between camera coordinates and image coordinates, so the absolute camera dimensions are irrelevant. Using pixel units for focal length and principal point offset enables a representation of the relative dimensions of the camera, namely, the film's position relative to its size in pixels. Similar triangles can be used to convert pixel units to world units (e.g. mm) with knowledge of at least one camera dimension in world units.

For example, given that the camera's film or digital sensor has a width W in millimeters and the image width in pixels is w, the focal length $f_x$ can be converted to world units using the following equation [10]:

$$F_x = f_x \frac{W}{w} \quad [10]$$

Decomposing the intrinsic matrix (e.g., Intrinsic Matrix K) provides a new representation of the intrinsic matrix as a sequence of two dimensional affine transformations. In particular, the intrinsic matrix can be decomposed into a sequence of shear, scaling, and translation transformations, corresponding to axis skew s, focal length $f_x$ and $f_y$, and principal point offset $x_0$ and $y_0$, respectively. Here, axis skew is a parameter capturing shear distortion in the projected image. The decomposition of the intrinsic matrix is shown in the following equation [11]:

$$K = \begin{pmatrix} f_x & s & x_0 \\ 0 & f_y & y_0 \\ 0 & 0 & 1 \end{pmatrix} \quad [11]$$

Thus, the camera matrix P can be fully decomposed into a set of 2D affine transformations and 3D rigid transformations, as shown in the following equation [12]:

$$P = \overset{\text{Intrinsic Matrix}}{K} \times \overset{\text{Extrinsic Matrix}}{[R|t]} \quad [12]$$

$$= \underbrace{\begin{pmatrix} 1 & 0 & x_0 \\ 0 & 1 & y_0 \\ 0 & 0 & 1 \end{pmatrix}}_{\text{2D Translation}} \times \underbrace{\begin{pmatrix} f_x & 0 & 0 \\ 0 & f_y & 0 \\ 0 & 0 & 1 \end{pmatrix}}_{\text{2D Scaling}} \times$$

$$\underbrace{\begin{pmatrix} 1 & s/f_x & 0 \\ 0 & 1 & 0 \\ 0 & 0 & 1 \end{pmatrix}}_{\text{2D Shear}}$$

Apart from the extrinsic and intrinsic transformations as described herein, lens distortion is also modeled for some cameras (e.g., cameras with wide angle lenses or cameras with fisheye lenses). The lens distortion is assumed to be radially symmetric (i.e., the distortion depends only on the distance of the point from the image center) and a non-linear mapping between the observed radius i.e. (distance from the center) of an incoming ray and the actual radius of the incoming ray. In many cases, lens distortion is modeled as a polynomial.

For example, assuming an image center being at the origin, the radial distance $r_i$ of a projected point x=(x,y) from the center can be simply calculated using the following equation [13]:

$$r_i = \|x_i - x_c\| = \|x_i\| = \sqrt{x_i^2 + y_i^2} \quad [13]$$

The lens distortion can then be modeled using the following equation [14]:

$$\tilde{r} = f_{rad}(r) = r \cdot [1 + D(r,k)]. \quad [14]$$

In this case, the function D(r,k) specifies the (positive or negative) radial deviation for a given radius r. A simple but effective radial distortion model can be based on the following polynomial function:

$$D(r, k) = k_0 \cdot r^2 + k_1 \cdot r^4 = k \cdot \begin{pmatrix} r^2 \\ r^4 \end{pmatrix} \quad [15]$$

The mappings, transformations, and models above can be used to perform a camera calibration process, in particular, by estimating the extrinsic and intrinsic matrices and lens distortion coefficients of the models.

Figure 9:
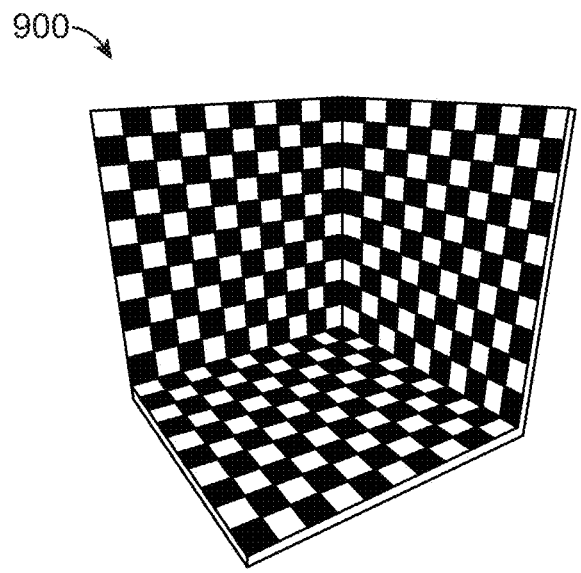
FIG. 9 depicts an exemplary 3D checkerboard calibration setup.

In some embodiments, a 3D calibration process includes using a 3D checkerboard calibration setup. FIG. 9 depicts an exemplary 3D checkerboard calibration setup 900 having three checkerboard two-dimensional planar images oriented orthogonally to each other along the three planes XY, YZ and XZ respectively in a three-dimensional space. Assuming the origin of the 3D checkerboard calibration setup to be the global origin (0,0,0), the width and height of each square in the 3D checkerboard are measured and 3D global coordinates of each checkerboard corner are determined. The images of this 3D checkerboard calibration setup are captured with a first camera having a first fisheye lens and a second camera having a second fisheye lens such that all of the checkerboard corners lie in an overlap region of the two fisheye lenses. In this case, the overlap region is defined by the intersection of the field of view of the first fisheye lens and the field of view of the second fisheye lens. In other words, the overlap region is the view of a scene that is visible in both cameras. The checkerboard corners are detected from the two images and using an individual calibration model of each lens previously carried out using standard calibration techniques, the direction of light rays from the checkerboard corners is determined. By projecting the actual global 3D coordinates of calibration points onto a sphere and using an estimate of points on the sphere from the calibration model, misalignment in each camera or lens is determined.

It is worth noting that using a 3D checkerboard calibration setup to perform a 3D calibration process as described above requires a step of performing an individual lens calibration for each camera. Moreover, building a 3D checkerboard calibration setup that requires three two-dimensional planes to be set orthogonally to each other can be a challenge. In particular, errors in the setup including mechanical errors such do to incorrectly positioning or orienting the two-dimensional planes with respect to each other and any offset errors of each two-dimensional checkerboard will affect the accuracy of the camera misalignment estimate.

Accordingly, in some embodiments a 3D calibration process combines fisheye lens calibration and misalignment estimation using a few images of a known two-dimensional pattern such as a planar checkerboard taken in different orientations and positions in the overlap region of at least two cameras. Using these images and the knowledge that the pattern is always present in one plane, the calibration procedure solves a non-linear optimization function to determine the calibration matrices and the distortion coefficients.

In some embodiments, a method of stereo calibration comprises: calibrating each of two cameras to determine distortion coefficients for each camera; capturing pairs of images (i.e., one image captured by a first camera and a second image captured by a second camera) of a known two-dimensional pattern, such as a planar checkerboard pattern, such that the entire pattern lies in an overlap region seen by both cameras; detecting a set of points of checkerboard corners and finding the set of points of corresponding corners from the pairs of images captured by the two cameras; projecting these points onto a three-dimensional sphere using the distortion coefficients of each camera; and finding the calibration matrix that captures the mapping or transformation between the point pairs.

A standard algorithm used for camera calibration is described in Z. Zhang. "A flexible new technique for camera calibration" *IEEE Trans. Pattern Analysis and Machine Intelligence*, 22(11):1330-1334, 2000, which is herein incorporated by reference in its entirety, and which introduces the idea of calibrating a camera using multiple views of a 2D checkerboard with no knowledge about its global position or orientation.

In some cases, an approach for 3D camera calibration includes capturing images of a planar 2D pattern with different views by moving the pattern or the camera or both and for each captured image, finding image points corresponding to model points on the checkerboard pattern (e.g., the checkerboard corners). Associated linear mappings from the model points and the 2D image points referred to as homographies ($H_0, \ldots, H_{M-1}(\ )$) are estimated for each view. From these M view homographies, intrinsic parameters of the camera are estimated using a closed-form linear solution, ignoring any lens distortion at this point. Once the camera intrinsic parameters are known, the extrinsic 3D parameters $R_i$ and $t_i$ are calculated for each camera view i. The radial distortion parameters $k_0$ and $k_1$ are estimated by linear least-squares minimization. Finally, using the estimated parameter values as an initial guess, all parameters are refined by non-linear optimization over all M views.

Using the camera calibration matrices as defined by the parameters estimated by the process described above (e.g., camera misalignment parameters such as the intrinsic and extrinsic parameters and lens distortion parameters such as radial distortion parameters), a given 2D image point can be projected in the real world (e.g., on a world coordinate frame). However, an accurate 3D location of the given image point cannot be accurately determined since all points on a ray passing through the given image point and the camera center will occur at the same location in the image, which means there is one more unknown than the number of equations.

While for a single lens calibration, the camera calibration matrix can be estimated up to a scale factor, mapping from 2D to 3D involves one more unknown than the number of equations and therefore an additional measurement is required to complete the mapping. Here, the camera is assumed to be at the origin (0,0,0) with Z as the optical axis and wherein all points on the calibration pattern are in a plane (e.g., assume the XY plane with Z coordinate 0). This assumption removes the one extra unknown and allows the other parameters to be determined. In particular, if the 2D coordinates of all the calibration points on the pattern are known, the 3D position of the calibration points can be estimated to an exact scale. To recover the complete global orientation and position of a checkerboard from its image requires determining the exact scale. One more physical measurement is needed to provide that extra information.

Accordingly, in some embodiments, a 3D calibration process includes measuring the width and height of at least one square of the checkerboard used for calibration, and based on the width and height of one checkerboard square, recovering the exact global position and orientation of the checkerboard from its image. In this case, using the additional information of the width and height dimensions of a single checkerboard square, the individual lens calibrations and the 3D calibration can be combined into a single calibration process. What is needed in this case are a few images of a simple checkerboard from each camera/lens and a few images where the checkerboard lies in the overlap region of the two cameras.

In some embodiments, an estimate of the global position and orientation of image points with respect to both cameras being at the origin is determined from images of a known two-dimensional pattern (e.g., a planar checkerboard) in the overlap region of the two cameras. In these cases, the rotation and translation between corresponding checkerboard orientations in each of two images taken by each of two cameras corresponds to the rotation and translation of the two camera centers and models the 3D misalignment of the camera/lens. Accordingly, to determine camera rotation and translation (i.e., the misalignment between two cameras), a rigid transform is estimated based on the best fitting rotation and translation of the checkerboard orientations.

In some cases, given a set of 3D points, a rigid transform or the rotation and translation is estimated using a systematic geometric algorithm an example of which is described in "*Least-Squares Rigid Motion Using SVD*" by Olga Sorkine-Hornung and Michael Rabinovich, Department of Computer Science, ETH Zurich, which is herein incorporated by reference in its entirety. This rotation and translation preserves lengths of objects. Such a transformation is called a rigid transform or an isometry.

Figure 10:
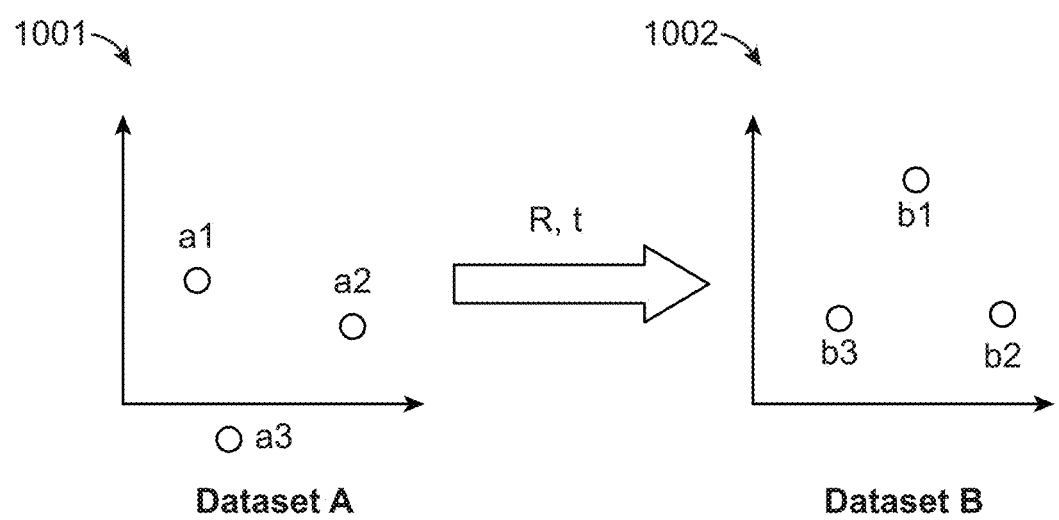
FIG. 10 illustrates how a rigid transform operates on a set of data points.

FIG. 10 illustrates how a rigid transform operates on a set of data points. In particular, FIG. 10 depicts a Dataset A comprising a set of points (a1, a2, a3) and a Dataset B comprising a set of points (b1, b2, b3). An algorithm to estimate a rigid transform (R, t), wherein R is an optimal rotation matrix and t is an optimal translation that captures the rotation and translation from Dataset A (a1, a2, a3) to Dataset B (b1, b2, b3) includes finding the centroids of each dataset (e.g., centroid$_A$ and centroid$_B$) using the following equations for a set of N points $P_A$ for Dataset A and equation [17] for a set of N points $P_B$ for Dataset B:

$$centroid_A = \frac{1}{N} \sum_{i=1}^{N} P_A^i \qquad [16]$$

$$centroid_B = \frac{1}{N} \sum_{i=1}^{N} P_B^i \qquad [17]$$

An accumulation matrix His formed using the following equation [18]:

$$H = \sum_{i=1}^{N} (P_A^i - centroid_A)(P_B^i - centroid_B)^T \qquad [18]$$

The SVD (singular value decomposition) of matrix H is calculated such that:

$$[U,S,V]=SVD(H) \quad [19]$$

Finally, the optimal rotation matrix R is given by:

$$R=VU^T \quad [20]$$

and the optimal translation t is given by:

$$t=-R \times centroid_A + centroid_B \quad [21]$$

wherein the first image is provided by a first camera and the second image is provided by a second camera and wherein calibrating comprises determining: a first distortion model associated with the first camera, a second distortion model associated with the second camera, and a misalignment parameter associated with a misalignment between the first camera and the second camera.

Figure 11:
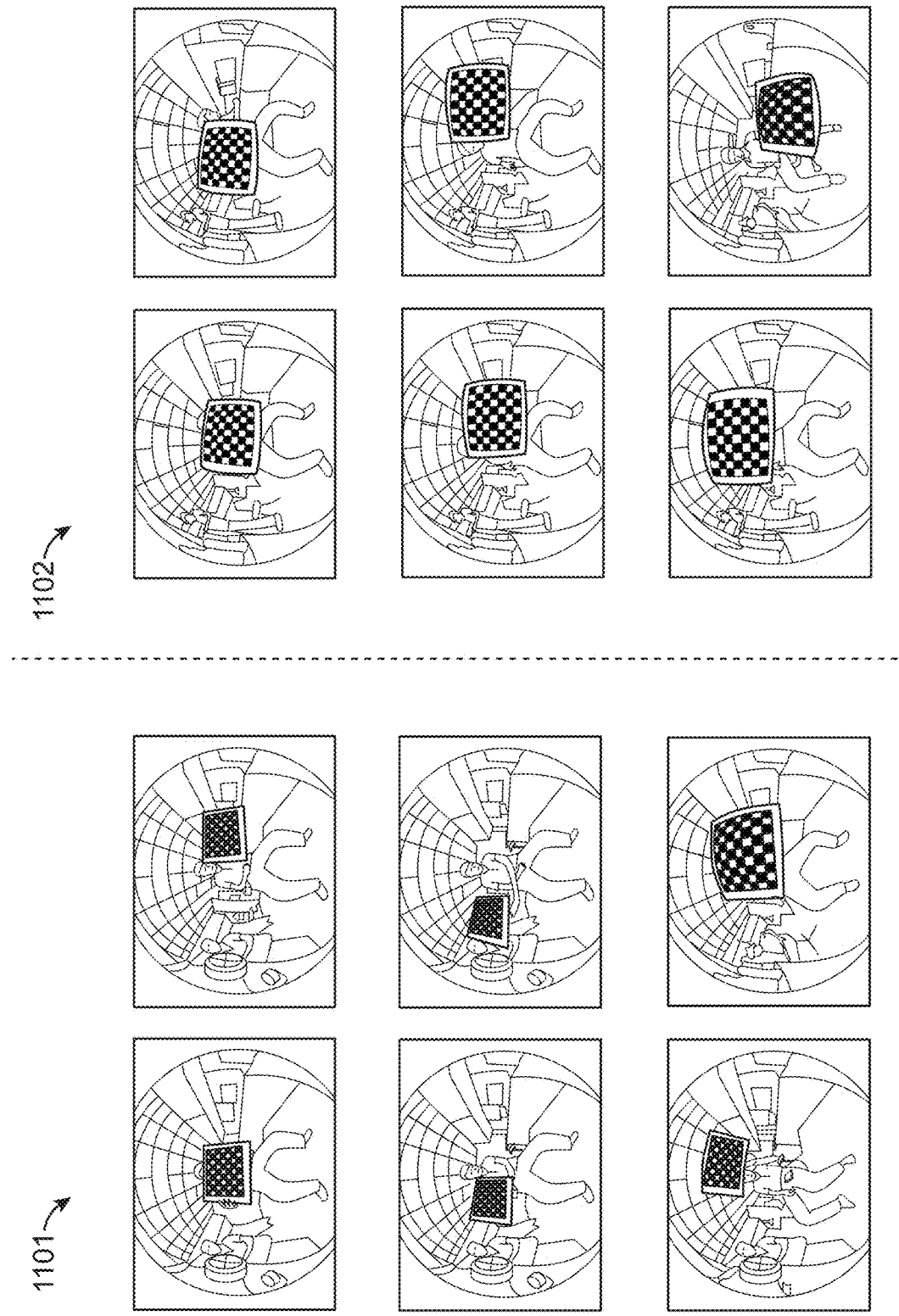
FIG. 11 depicts a few images of a planar checkerboard from each of two cameras or lenses, wherein each image captures a scene in a non-overlapping region of the two cameras.

FIG. 11 depicts a few images of a planar checkerboard from each of two cameras or lenses, wherein each image captures a scene in a non-overlapping region of the two cameras. In the example shown, a set of six images are captured from a Left Camera (Master) (e.g., shown at 1101) and a set of six images are captured from a Right Camera (Slave) (e.g., shown at 1102), respectively. Each of the set of six images from the Left Camera captures a scene from the view perspective of the Left Camera that does not overlap with each of the scenes captured in the set of six images from the Right Camera.

Figure 12:
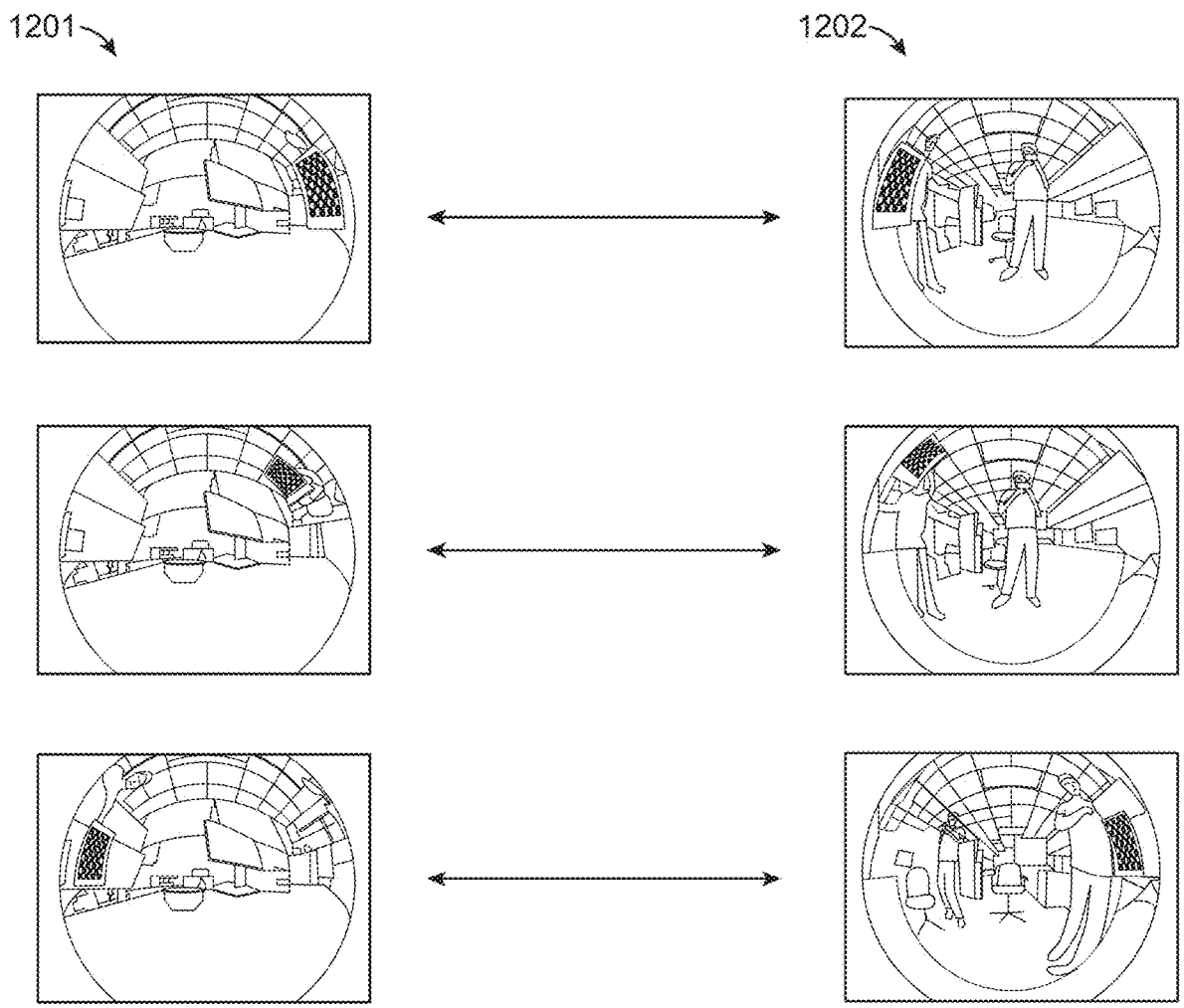
FIG. 12 depicts a few images where a planar checkerboard lies in an overlap region of the two cameras described in the example of FIG. 11.

FIG. 12 depicts a few images where a planar checkerboard lies in an overlap region of the two cameras described in the example of FIG. 11. Here, a set of three images are captured from a Left Camera (Master) (e.g., shown at 1201) in the overlap region of the two cameras and a set of three images are captured from a Right Camera (Slave) (e.g., shown at 1202) in the overlap region of the two cameras, respectively. In this case, the overlap region of the two cameras is a scenic region where both the Left Camera and the Right Camera have a view of the scene. Here, the images show the same planar checkerboard in a single position (in the overlap region) as seen from the Left Camera and the Right Camera at the same time.

Upon calibrating a single lens (e.g., a lens from the first camera or Left Camera or a lens from the second camera or Right Camera), the orientation and position of the planar checkerboard in each image can be captured up to a scale factor. However, the exact scale of the checkerboard orientations and positions can be determined using the measurement or dimensions of one checkerboard square.

Figure 13:
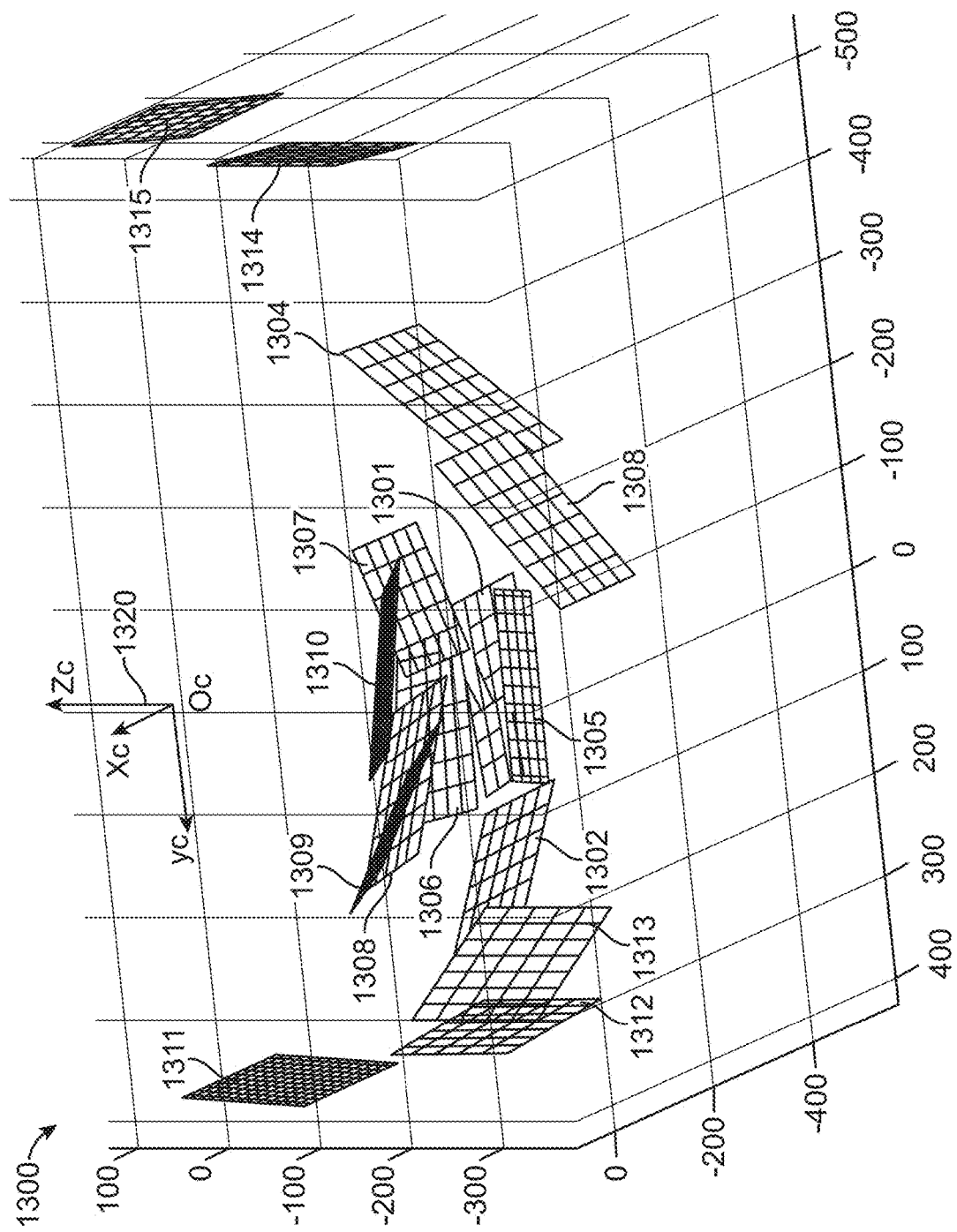
FIG. 13 depicts a plot of checkerboard orientations and positions corresponding to fifteen images taken with the Left Camera (Master) as described with respect to FIGS. 11 and 12.

FIG. 13 depicts a plot 1300 of checkerboard orientations and positions (shown here with units in millimeters) corresponding to fifteen images taken with the Left Camera (Master) as described with respect to FIGS. 11 and 12, with the Left Camera position being at the origin of the plot 1300. A reference axis is also shown at 1320 illustrating the direction of x, y, and z axes (e.g., $x_c$, $y_c$, and $z_c$) with respect to an origin $O_C$ that corresponds to the Left Camera position. In the example shown, the first ten checkerboard plot positions (e.g., shown at 1301-1310) correspond to ten images taken with the Left Camera in a non-overlapping region of the two cameras (e.g., the Left Camera and the Right Camera). In other words, the checkerboard plot positions (e.g., shown at 1301-1310) correspond to ten images of scenes only visible from the view perspective of the Left Camera. In contrast, the last five checkerboard plot positions (e.g., shown at 1311-1315) correspond to five images taken with the Left Camera in the overlap region of the two cameras (e.g., the Left Camera and the Right Camera). As described above, these last five images (e.g., shown at 1311-1315) capture five scenes that are visible from the view perspective of both the Left Camera and the Right Camera.

Figure 14:
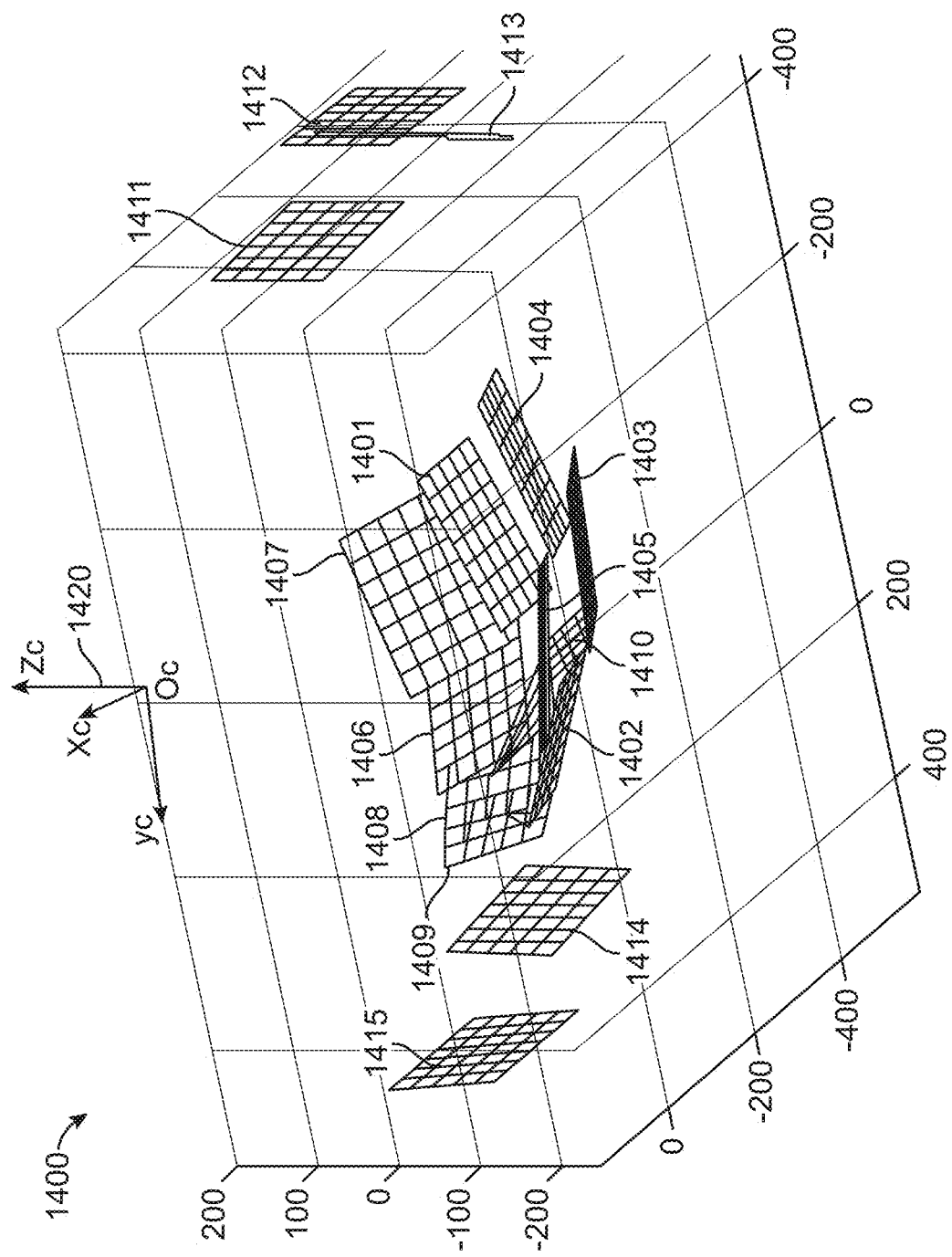
FIG. 14 depicts a plot of checkerboard orientations and positions corresponding to fifteen images taken with the Right Camera (Slave) as described with respect to FIGS. 11 and 12.

FIG. 14 depicts a plot 1400 of checkerboard orientations and positions (shown here with units in millimeters) corresponding to fifteen images taken with the Right Camera (Slave) as described with respect to FIGS. 11 and 12, with the Right Camera position being at the origin of the plot 1400. A reference axis is also shown at 1420 illustrating the direction of x, y, and z axes (e.g., $x_c$, $y_c$, and $z_c$) with respect to an origin $O_C$ that corresponds to the Right Camera position. In the example shown, the first ten checkerboard plot positions (e.g., shown at 1401-1410) correspond to ten images taken with the Right Camera in a non-overlapping region of the two cameras (e.g., the Left Camera and the Right Camera). In other words, the checkerboard plot positions (e.g., shown at 1401-1410) correspond to ten images of scenes only visible from the view perspective of the Right Camera. In contrast, the last five checkerboard plot positions (e.g., shown at 1411-1415) correspond to five images taken with the Right Camera in the overlap region of the two cameras (e.g., the Left Camera and the Right Camera). As described above, these last five images (e.g., shown at 1411-1415) capture five scenes that are visible from the view perspective of both the Left Camera and the Right Camera.

As shown in FIGS. 13 and 14, the checkerboard positions of each of the five scenes in the overlap region of the two cameras (e.g., shown at each of 1311-1315 and each of 1411-1415 respectively) are 180 degrees rotated with respect to each pair set of the five images corresponding to the Left Camera and the Right Camera, wherein a pair set (e.g., shown at 1311 and 1411) corresponds to a pair of images capturing the checkerboard at a single position in the overlap region when viewed simultaneously from the two cameras. Specifically, the checkerboard position shown at 1311 is 180 degrees rotated with respect to the checkerboard position shown at 1411, the checkerboard position shown at 1312 is 180 degrees rotated with respect to the checkerboard position shown at 1412, the checkerboard position shown at 1313 is 180 degrees rotated with respect to the checkerboard position shown at 1413, the checkerboard position shown at 1314 is 180 degrees rotated with respect to the checkerboard position shown at 1414, and the checkerboard position shown at 1315 is 180 degrees rotated with respect to the checkerboard position shown at 1415. For these last five images (e.g., images shown at 1311-1315 of FIG. 13 and 1411-1415 of FIG. 14, respectively) an estimate of each of image's global position and orientation can be determined with respect to each of the cameras (e.g., the Left Camera and the Right Camera respectively) being at the origin of plot 1300 and plot 1400.

In the example shown, recovering the camera rotation R and translation t between the corresponding checkerboard orientations is simply the rotation and translation of the camera centers, which models the 3D misalignment of the camera/lens. Accordingly, a rigid transform as described above is used to determine the best fitting rotation and translation of the checkerboard orientations.

In some cases, a 3D calibration process as described herein is performed for a particular camera or lens setup on an initial set of images and calibration parameters are stored for future use on subsequent images to be stitched using the particular camera or lens setup. In some cases, the stored calibration parameters can be used for the calibration step provided the particular camera or lens setup does not change substantially. In cases where the camera or lens setup is changed to a new configuration, the 3D calibration process can be performed on another set of images based on the new configuration and those calibration parameters may be stored for future use on subsequent images to be stitched using the new configuration.

Once the 3D calibration process has been performed to determine calibration parameters for calibrating the two images (e.g., camera misalignment parameters such as the intrinsic and extrinsic parameters and lens distortion parameters such as radial distortion parameters), the images are projected onto a sphere before being rectified. In some cases, two images (e.g., fisheye images from the Left Camera and the Right Camera respectively) are each projected onto a sphere. In the case of two fisheye images, every point on the sphere has a one to one correspondence with one point in either one or both (overlap region) of the fisheye images.

In some cases, the transformation between the fisheye image from each camera and the sphere corresponding to that camera has many variables. These variables include, for example, the center of the fisheye images, radius of the fisheye images, distortion coefficients of the fisheye lenses, and an alignment matrix that corrects the misalignment in the lenses.

In some embodiments, in order to improve alignment between the two images (e.g., fisheye images from the Left Camera and the Right Camera) prior to stitching, a method for optimizing the transformation is performed that includes using the overlap region of the two images to obtain a joint optimization for all the variables together. In this case, to match keypoints between two fisheye images in the overlap region, the keypoints from each of the two fisheye images from the Left Camera and the Right Camera must be mapped to the same point on a unit sphere, wherein the center perspective of each camera is assumed to be at the center of the sphere.

In this case, each of the keypoints from the two fisheye images corresponding to the same point on a scene in world coordinates are transformed or mapped to a sphere and a distance between the transformed points is used to minimize an error function that includes all the variables as optimization variables.

In some embodiments, the error function is given by the following equation:

$$\min_{C_l, C_r, k_l, k_r, R, H} \sum_{i=1}^{N} \|\text{Project\_to\_Sphere}(P_{l_i}) - H * \text{Project\_to\_Sphere}(P_{r_i})\|^2 \qquad [22]$$

where
- Cl: Center of left fisheye image
- Cr: Center of right fisheye image
- $k_l$: Distortion coefficients of left fisheye lens
- $k_r$: Distortion coefficients of right fisheye lens
- R: Radius of fisheye images (same for both images to reduce one variable)
- H: Alignment Matrix
- $P_{li}$, $P_{ri}$: $i^{th}$ matched keypoints in the overlap region
- $\|x\|$: L2 norm of x (Length of x)

Optimized parameters can be obtained by minimizing this error function which significantly improves alignment of the images. In this example, using the rotation misalignment estimate from the 3D calibration as described above in combination with the optimal center offset obtained by minimizing the error function improves the alignment results.

As described herein, 3D calibration is an important step for a stereo system comprising more than one camera/lens. The disclosed technique to perform a 3D calibration for a given stereo camera pair (e.g., a first camera such as the Left Camera and a second camera such as the Right Camera) provides a method to calibrate images (e.g., a first image and a second image) that can be performed by a system as disclosed herein (e.g., Calibration Module 210 of Image Stitching System 200 in FIG. 2). Note that the disclosed 3D calibration method is not specific or limited to fisheye lenses or to an omnidirectional camera model but rather, can be applied to stereo camera system with any lens (with or without a non-linear distortion model).

The 3D calibration process can be used to decompose the sources of image variability by first removing differences between images due to lens distortion and camera misalignment. In some cases, 3D calibration is performed to separate or decompose the impact of lens distortion and camera misalignments due to differences in the physical setup of the cameras/lenses from the impact of parallax misalignments due to different view perspectives. Performing the 3D calibration removes the impact of camera misalignments such that all that remains to compensate for during the stitching process is misalignment due to parallax.

In the misalignment estimation described above, matched keypoints from both images (e.g., fisheye images from the Left Camera and the Right Camera) are projected onto a sphere and a method for optimizing the transformation is performed in order to determine the best transform to align the two images.

In some embodiments, due to the first and second cameras (e.g., the Left Camera and the Right Camera) being in different physical positions or locations with a nonzero distance between the centers of their lenses, to properly compensate for parallax, the keypoints from each of the two images are not mapped to the same sphere but onto two different spheres. In this case, a first sphere (e.g., left sphere) is used for mapping a first camera's perspective (e.g., the Left Camera's perspective) and a second sphere (e.g., right sphere) is used for mapping a second camera's perspective (e.g., the Right Camera's perspective).

Figure 15:
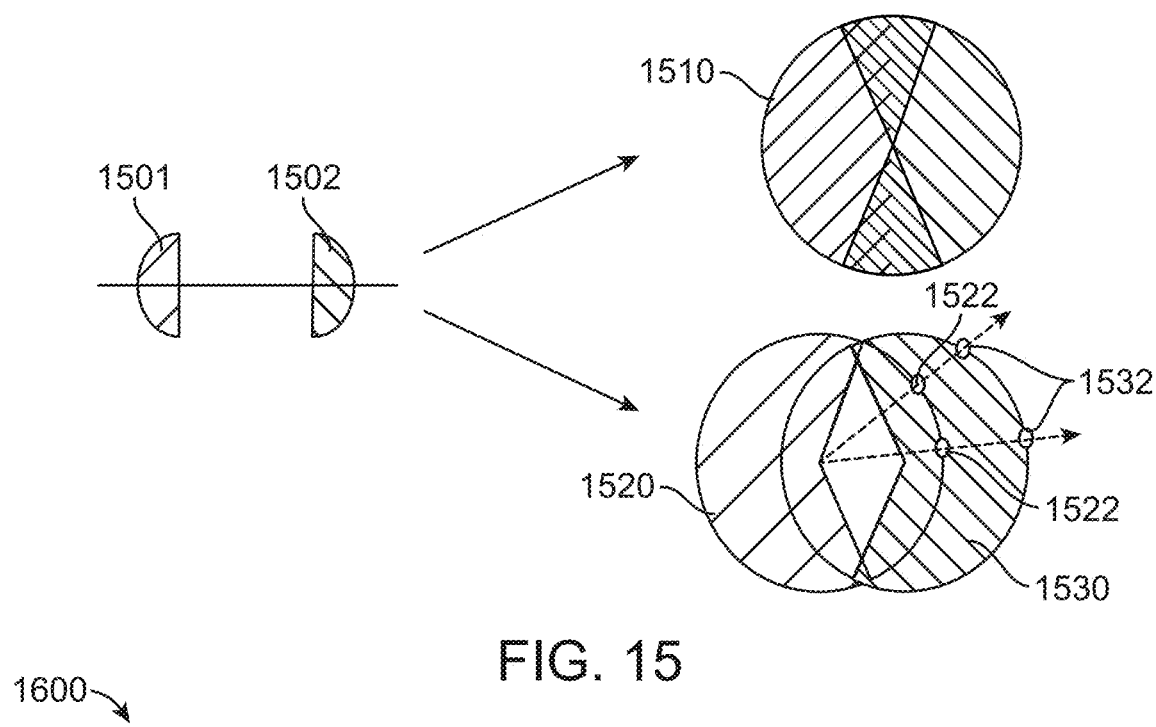
FIG. 15 depicts an example of projecting both Left and Right Camera's perspectives on a single sphere and projecting the perspective of each camera on one of two spheres.

FIG. 15 depicts an example of projecting both (e.g., the Left and Right) camera's perspectives on a single sphere (e.g., shown at 1501) and projecting the perspective of each camera on one of two spheres (e.g., shown at 1502). In the first case that does not account for parallax, a first image from a first camera (e.g., the Left Camera) having a first lens (e.g., shown at 1501) is shown projected on a single blending sphere (e.g., shown at 1510) along with the projection of a second image from a second camera (e.g., the Right Camera) having a second lens (e.g., shown at 1502). As noted above, however, this projection of both lenses onto the single sphere at 1510 does not account for parallax.

In contrast, in the second case, the first image from the first camera (e.g., the Left Camera) having a first lens (e.g., shown at 1501) is projected on a first blending sphere (e.g., left sphere shown at 1520) while a second image from a second camera (e.g., the Right Camera) having a second lens (e.g., shown at 1502) is projected on a second blending sphere (e.g., right sphere shown at 1530), which is different from the first blending sphere. Unlike, the projection of both lenses onto the single sphere at 1510, the projection of each lens onto its own blending sphere can be used to account for parallax by allowing a mapping of the center of each sphere to the center of each of two different perspectives of the two lenses (e.g., from the Left Camera and the Right Camera), which are physically located at different points in three-dimensional space.

In some embodiments, a blending sphere used to stitch the two images from two perspectives to form a stitched 360 degree view is selected from one of the two spheres and the unselected sphere is then projected onto the blending sphere during the stitching process. For example, if the left sphere is selected as the blending sphere, the right sphere is projected onto the left sphere. Note that this is not a simple translation of the right sphere, but is instead a projection of light rays from the right sphere towards the left lens center. As shown in FIG. 15, points from the right sphere (e.g., shown at 1532) are projected onto the left sphere (shown at 1522).

Assuming a certain distance from the cameras to a scene point, the two images (e.g., taken from the Left Camera and the Right Camera) can be aligned by adjusting the distance in between the centers of the two spheres (e.g., the left sphere and the right sphere). A center offset adjustment made by shifting the center of one sphere by some offset only aligns only the objects at a distance from a camera corresponding to that offset. As a result, using a single offset aligns objects that are a similar distance from the cameras but performs poorly where objects in a scene are at different distances from the cameras.

Ideally, to achieve proper alignment for a seamless stitching result, the two spheres as described above need to be shifted horizontally so that keypoints projected on the blending sphere are aligned with the non-blending sphere. However, due to differences in the offset needed for scene points at different distances from the cameras, a center offset adjustment of the spheres alone will not properly align all points in the scene. Further adjustment is needed to compensate for parallax with respect to scene points that are different distances from the cameras.

As explained above, misalignment in the lenses and cameras is determined by performing a 3D calibration on the cameras/lenses such that what remains is misalignment due to parallax. In particular, image points that correspond to scene points at different distances from the cameras/lenses must be adjusted by different shifts (e.g., shifting individual pixels in a first image with respect to a second image to align points at different distances by different amounts) in order to correctly align two images that are misaligned due to parallax. Accordingly, in order to correctly align points at different distances from a camera/lens, the depth of each point is detected using a depth estimation process.

In some embodiments, depth estimation techniques for stereo images are used to handle or compensate for the effects of parallax between two images in order to correctly align every point in the two images including points that capture objects at different distances from the camera/lens. In depth estimation, features are matched between two images such as a left image (e.g., captured by the Left Camera) and a right image (e.g., captured by the Right Camera). For example, to find the depth of a point in the left image, the same point must be found in the right image. Using the positions of the same point in the two images (left and right), triangulation can be used to calculate the depth of that point. The exact 3D location of the point can then be determined once the depth of a point is known so that the point can be projected to the blending sphere in the proper location.

Using the 3D calibration process and the omnidirectional model as described herein, the real world depth of the objects from the overlap region can be estimated using a simple geometrical algorithm to determine depth.

Figure 16:
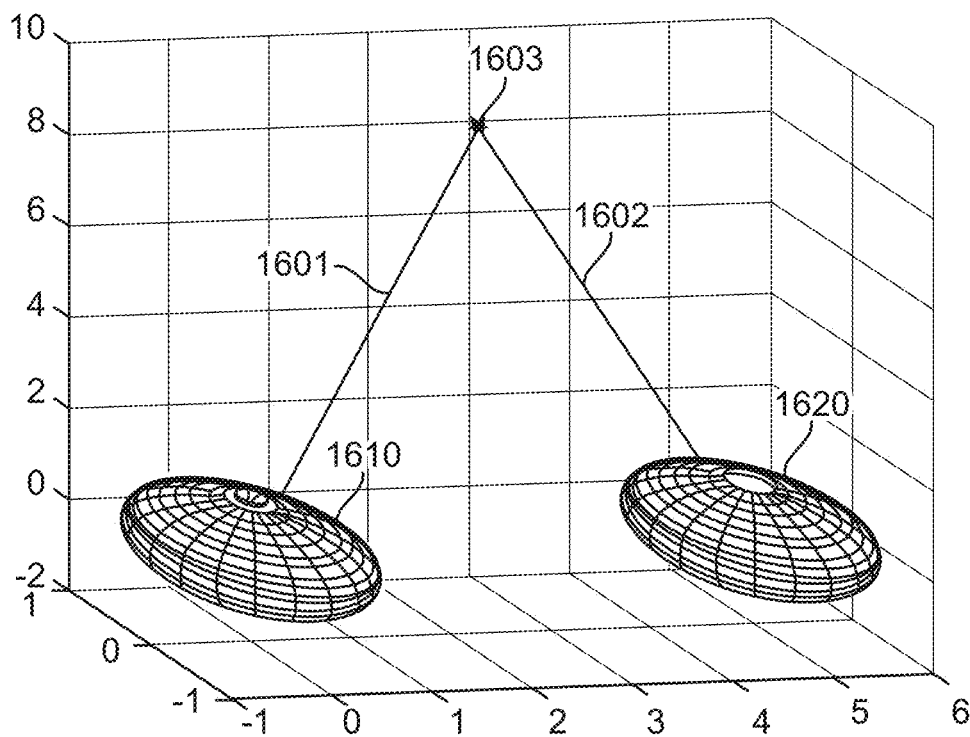
FIG. 16 depicts an illustration of how an algorithm may be used to determine depth of an object from the overlap region.

FIG. 16 depicts an illustration of how an algorithm (e.g., a simple geometrical algorithm) may be used to determine depth of an object from the overlap region. After a pair of matched keypoints is identified from two images captured by a first camera/lens and a second camera/lens, the two rays (e.g., a first ray 1601 from the first camera/lens and a second ray 1602 from the second camera/lens) of the matched keypoints are projected onto unit spheres (e.g., a first unit sphere 1610 and a second unit sphere 1620 each centered at their respective origins corresponding to the positions of a first and second camera/lens using the omnidirectional model). Using the rotation R and translation t parameters from the 3D calibration process described above, the first unit sphere and the ray from the first camera/lens projected on the first unit sphere are moved to the actual center (global origin). The rays are then extended outside their unit spheres to an intersection point P (e.g., shown at 1603) where they meet or intersect. This point P is the actual 3D location of the keypoint and its distance can be determined from the camera/lens positions.

In some cases, using the individual lens calibration, the ray along which an object is located in the real world is determined. In particular, the intersection of this ray and the unit sphere provides an estimate of the 3D location of the point.

To improve proper alignment and to compensate for parallax, depth estimation must be performed for every point seen by both cameras in the overlap region to properly project the point to the blending sphere. However, this depth estimation process has a potentially high computational cost. Accordingly, in some cases and as described in more detail below, a depth estimation process includes image rectification, disparity estimation, and depth map generation.

In some embodiments, to avoid the high computational cost of solving a two-dimensional search problem (e.g., the cost of searching the entire right image to find a matching point for every point in the left image), image rectification is performed to lower the computational cost by reducing the problem to a one-dimensional search.

In particular, a 3D calibration process is performed (e.g., by Calibration Module 210 of FIG. 2) on the images (e.g., the first image and the second image). In the case where calibration parameters are determined or have been previously stored for a given camera or lens setup, the calibration parameters can be used or retrieved to calibrate the images (e.g., to apply corrections to compensate for lens distortion and/or camera misalignment to the first image and the second image) before or after rectification. Once the images have been calibrated, an image rectification process is performed (e.g., by Rectification Module 230 of FIG. 2) to rectify a first image to form a first rectified image and to rectify a second image to form a second rectified image (e.g., as shown at 311 of FIG. 3B). The image rectification process is an important step in depth estimation because it simplifies the computation required to match points in two images by reducing the search space from two dimensions to one dimension.

Figure 17:
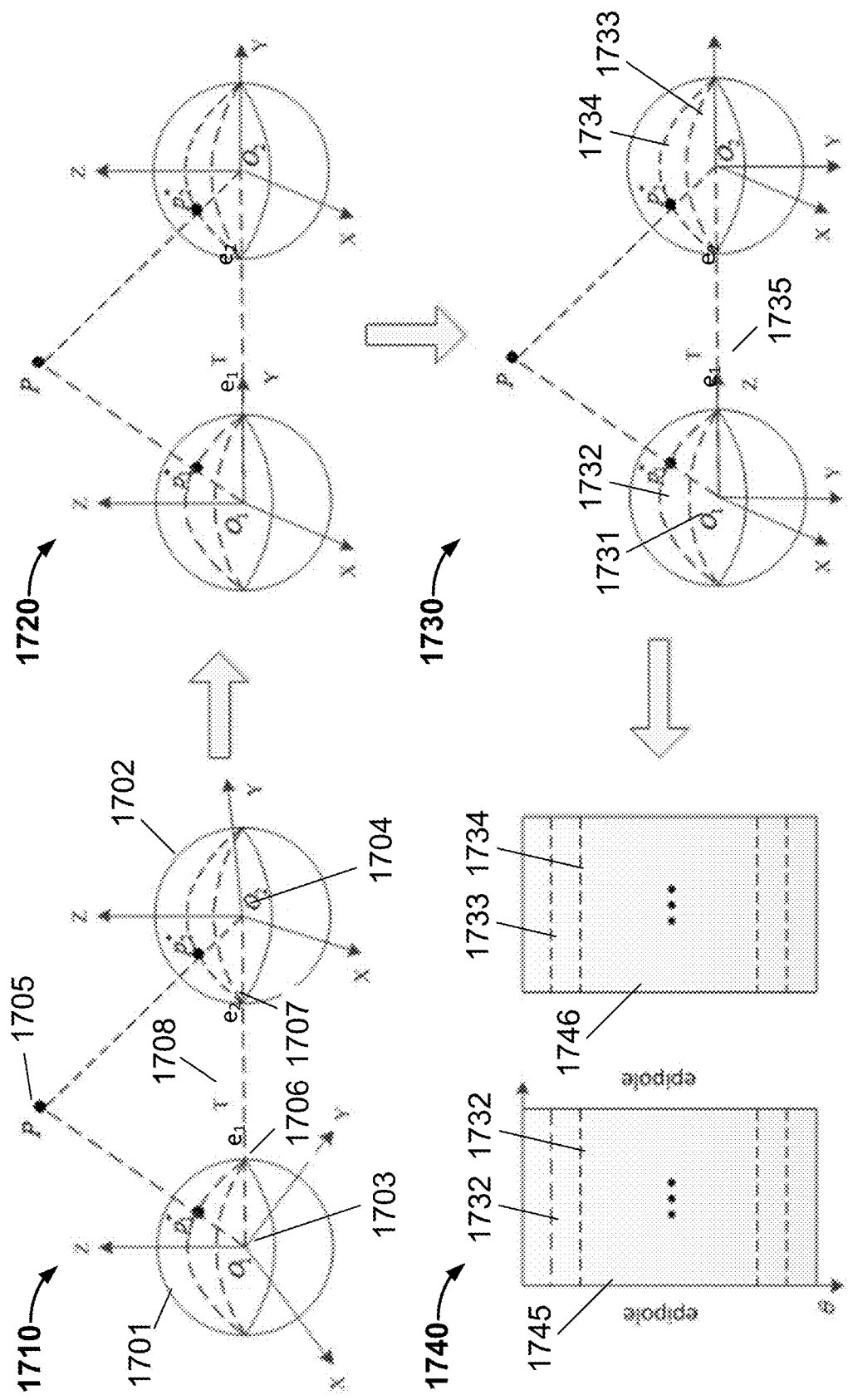
FIG. 17 depicts an epipolar geometry associated with spherical images for implementing an image rectification process.

FIG. 17 depicts the epipolar geometry associated with spherical images for implementing an image rectification process. In some embodiments, the approach depicted in FIG. 17 is applied to spherical images (e.g., the left sphere at 1520 of FIG. 15 obtained from projecting an image captured with a left fisheye camera/lens and the right sphere at 1530 of FIG. 15 obtained from projecting an image captured with a right fisheye camera/lens).

In the depiction shown at 1710, each of a first and second camera (e.g., the Left Camera and the Right Camera) identifies a 3D reference frame, the origin of which coincides with the projection center, and the Z-axis with the optical axis. The reference frames of the cameras are related via extrinsic parameters defining a rigid transformation in 3D space defined by a translation vector T=($O_1$–$O_2$) and a rotational matrix, R as described above in the 3D calibration process. The name epipolar geometry appears because the points $e_1$ (e.g., shown at 1706) and $e_2$ (e.g., shown at 1707) at which the line through the centers of projection intersects the corresponding spherical surfaces (e.g., shown at 1701 and 1702) are called epipoles. In the example shown, the left epipole $e_1$ depicts the projection center of the Right Camera and the right epipole $e_2$ depicts the projection center of the Left Camera.

In the example shown at 1710, a first camera (e.g., a Left Camera) is shown as centered at a first origin (e.g., $O_1$ at 1703) of a first spherical surface 1701 and a second camera (e.g., a Right Camera) is shown as centered at a second origin (e.g., $O_2$ at 1704) of a second spherical surface 1702. In this case, $O_1$ is positioned at a global origin (0,0,0) and the coordinates defining a difference T between the first origin and the second origin are given by: $O_2$–$O_1$=$O_2$=T (t1, t2, t3).

For a scene point P (e.g., shown at 1705) in 3D space, for the first camera, the projection of P on the first spherical surface 1701 is given by:

$$p_1^* = \frac{P}{\|P\|}, \quad [23]$$

and for the second camera, the projection of P on the second spherical surface 1702 (in world coordinates) is given by:

$$p_2^* = T + \frac{P - T}{\|P - T\|} \quad [24]$$

The plane through the points P, $O_1$, and $O_r$ is called an epipolar plane. It intersects each spherical surface in a circle. Both circles are horizontal great circles of the spherical surfaces called conjugated epipolar great circles. Given a point $p_1^*$ on the first spherical surface (e.g., the left spherical image), the 3D scene point P can lie anywhere on the ray from $O_1$ through $p_1^*$. Since this ray from $O_1$ through $p_1^*$ is depicted on the second spherical surface (e.g., the right spherical image) by the epipolar great circle through the corresponding point, $p_2^*$, the true match on the second spherical surface must lie on the epipolar great circle. The mapping between points on the first spherical surface and epipolar great circles on second spherical surface and vice versa is an epipolar constraint. Since all rays include the projection center, all epipolar great circles corresponding to a camera go through the camera's epipole. With the exception of the epipole, only one epipolar great circle goes through any image point. The epipolar constraint restricts the search for the match of a point on one spherical surface or image along the corresponding epipolar great circle in the other spherical surface or image. Thus, the search for correspondences to find a match of a point on a first spherical surface (e.g., the left spherical image) to a point on a second spherical surface (e.g., the right spherical image) is effectively reduced to a one-dimensional search problem reducing the computational cost significantly.

Alternatively, false matches due to occlusions can be rejected by verifying whether or not a candidate match lies on the corresponding epipolar great circle. The epipolar great circles are along any arbitrary directions in the spherical surface depending on the stereo geometry of the two cameras. Using knowledge of the stereo geometry (e.g., the transformations provided by the rotation R and translation t), the spherical images can be warped to align the epipolar great circles with rows or columns of the rectified image. This translates to a computational savings in the search algorithm which is now constrained to a one-dimensional search along the rows or columns of the rectified image.

Since the epipolar great circles on each spherical surface or image intersect the epipoles, rotating the camera reference such that the Z axes align to form a common Z axis with the epipole and the X and Y axes are parallel, the great circles passing through the horizontal poles on the common Z axis are epipolar curves. This rotation of the camera reference is shown at 1720 and 1730 of FIG. 17. In particular, as shown in the depiction at 1730, the left and right camera references have been rotated to align the Z axes of the original camera references in the depiction at 1710 to form a common Z axis (e.g. shown at 1735) with the epipole and the X and Y axes are parallel. Also shown in the depiction at 1730 are epipolar curves (e.g., shown at 1731 and 1732) on the first spherical surface (e.g., the left spherical image) and epipolar curves (e.g., shown at 1733 and 1734) on the second spherical surface (e.g., the right spherical image).

The rectified images corresponding to the first spherical surface (e.g., the left spherical image) and the second spherical surface (e.g., the right spherical image) are depicted at 1740. In the example shown, the first rectified image at 1745 is obtained by mapping the first spherical surface (e.g., the left spherical image) onto a rectangle such that the epipolar curves (e.g., shown at 1731 and 1732) lie along rows of the rectangle (e.g., shown at 1741 and 1742). Similarly, the second rectified image at 1746 is obtained by mapping the second spherical surface (e.g., the right spherical image) onto a rectangle such that the epipolar curves (e.g., shown at 1733 and 1734) lie along rows of the rectangle (e.g., shown at 1743 and 1744). Note that this mapping is similar to the equirectangular mapping, only in this case, the north pole and south poles are both rotated by 90 degrees and lie along the leftmost and rightmost vertical column of the rectangular images (e.g., shown at 1745 and 1746).

In some embodiments, rectifying the first image to form a first rectified image and rectifying the second image to form a second rectified image comprises performing a rectification process on an overlap region of the first spherical image and the second spherical image based at least in part on the overlap of a first field of view associated with the first camera or lens and a second field of view associated with the second camera or lens.

Once the spherical images are rectified, every point in the first rectified image (e.g., the left rectified image at 1745) is matched to a point in the same row of the second rectified image (e.g., the right rectified image at 1746). The distance in between the horizontal positions of the points to be matched between the first rectified image and the second rectified is called the disparity. This disparity is inversely proportional to the depth of the point. The disparity between matching points in the first and second rectified images provides a measure for the adjustment that needs to be made in order to align the two images to produce a seamless stitching result.

In some embodiments, a rectification process is also performed using the second rectified image. Specifically, every point in the second rectified image (e.g., the right rectified image at 1746) is matched to a point in the same row of the first rectified (e.g., the left rectified image at 1745) to generate a second disparity map (e.g., a right-to-left disparity map).

Returning to the system and method depicted in FIGS. 2 and 3 respectively, after rectifying (e.g., by Rectification Module 230 of FIG. 2) a first image to form a first rectified image and rectifying a second image to form a second rectified image (e.g., as shown at 311 of FIG. 3B), a first disparity map and a second disparity map are determined (e.g., by Disparity Map Generator 230 of FIG. 2) based at least in part on the first rectified image and the second rectified image (e.g., as shown at 321 of FIG. 3B). In some cases, the first disparity map (e.g., left-to-right disparity map) provides disparity values associated with an amount (e.g., pixel count) needed to move a pixel corresponding to a point in the first rectified image (e.g., the left rectified image) to align with a pixel corresponding to a matched point in the second rectified image (e.g., the right rectified image). For example, for a matched pair of points, a disparity value of 10 for a given point in the left rectified image means that the pixel corresponding to the given point needs to be moved by 10 pixels to the right in order to be properly aligned with its corresponding matched point in the right rectified image (e.g., the right image).

A commonly used method of matching points from the first and second rectified images (e.g., the left and right rectified images shown at 1746 and 1746 of FIG. 17 respectively) and estimating or calculating disparity is known as the Semiglobal Matching method, as described in: "Stereo Processing by Semi-Global Matching and Mutual Information" by Heiko Hirschmuller, which is herein incorporated by reference in its entirety. Using this method, the disparity of each point in the two images is estimated (e.g., by Disparity Map Generator 230 of FIG. 2) as described below.

In the case where the images are equirectangular, the disparity d is the angle $\angle O_1 P O_2$ (see, e.g., FIG. 17) by a constant. Assuming the corresponding points that have been matched in the same row of two images are given by $(x_1,y)$ and $(x_2,y)$ respectively, the disparity d is the difference between $x_1$ and $x_2$ (i.e. $d=x_2-x_1$) and $$\|O_1 P\| = \frac{T\sin(x_2)}{\sin(d)} \text{ and } \|O_1 P\| = \frac{T\sin(x_2)}{\sin(d)} \quad [25]$$

where, $T=\|O_1-O_2\|$.

From equation [25], the actual depth and 3D coordinates of every point in each image can be calculated and disparity maps for the images can be determined.

The Semi-Global Block Matching (SGBM) described above is a disparity estimation algorithm that operates by performing a simple block matching between two images to estimate the disparity at each pixel and by also running a global optimization that enforces an extra constraint of neighboring pixels having similar disparity values. As a result, a disparity map generated using SGBM is smooth and better quality as compared with other algorithms. However, because it runs a global optimization, the SGBM algorithm requires a lot of memory, cannot be parallelized, and thus requires a lot of time for calculation.

Accordingly, in some embodiments, to decrease the memory requirement and increase computational speed, a Block Matching algorithm is used that performs the block matching operation locally without running a global optimization. While the Block Matching algorithm requires less memory, can be run in parallel, and thus operates more quickly on embedded devices (e.g., an embedded processor in a camera) to decrease the required computation time, the disparity maps generated are less smooth as compared with those generated using SGBM.

Returning to the system and method depicted in FIGS. 2 and 3 respectively, once a first disparity map and a second disparity map are determined (e.g., by Disparity Map Generator 230 of FIG. 2) based at least in part on the first rectified image and the second rectified image (e.g., as shown at 321 of FIG. 3B), the disparity maps can be used to correct or adjust the images to compensate for parallax. For example, the first rectified image and the second rectified image are aligned (e.g., by Alignment Module 240 of FIG. 2) based at least in part on the first disparity map and the second disparity map (e.g., as shown at 331 of FIG. 3B), and the aligned images are stitched (e.g., by Stitching Module 240 of FIG. 2) to form a stitched image (e.g., as shown at 341 of FIG. 3B).

In particular, using the disparity map for the second rectified image, objects that appear in the overlap region can be moved or adjusted in the second rectified image by an amount as given by the disparity at each point (e.g., as provided by the second disparity map). This adjustment aligns each point in the second rectified image to a corresponding point in the right rectified image so that the objects that appear in both images taken by the two cameras in the overlap region are compensated for the parallax effect and correctly aligned for stitching (e.g., by Alignment Module 240 of FIG. 2).

In some cases, applying the disparity maps as described above in an initial raw form without further adjustment or refinement produces a result with undesired artifacts or discontinuities in the final stitched image. These undesired artifacts or discontinuities can be due to invalid, missing, or incorrect values in the raw or unfiltered disparity maps that cause the stitched output to appear noisy due to inaccuracies in the disparity map determination and the alignment processes. In these cases, as discussed in more detail below with respect to the following figures, the raw disparity maps are filtered in order to remove unwanted artifacts or discontinuities and to generate a smooth end result in the final stitched output.

Figure 18:
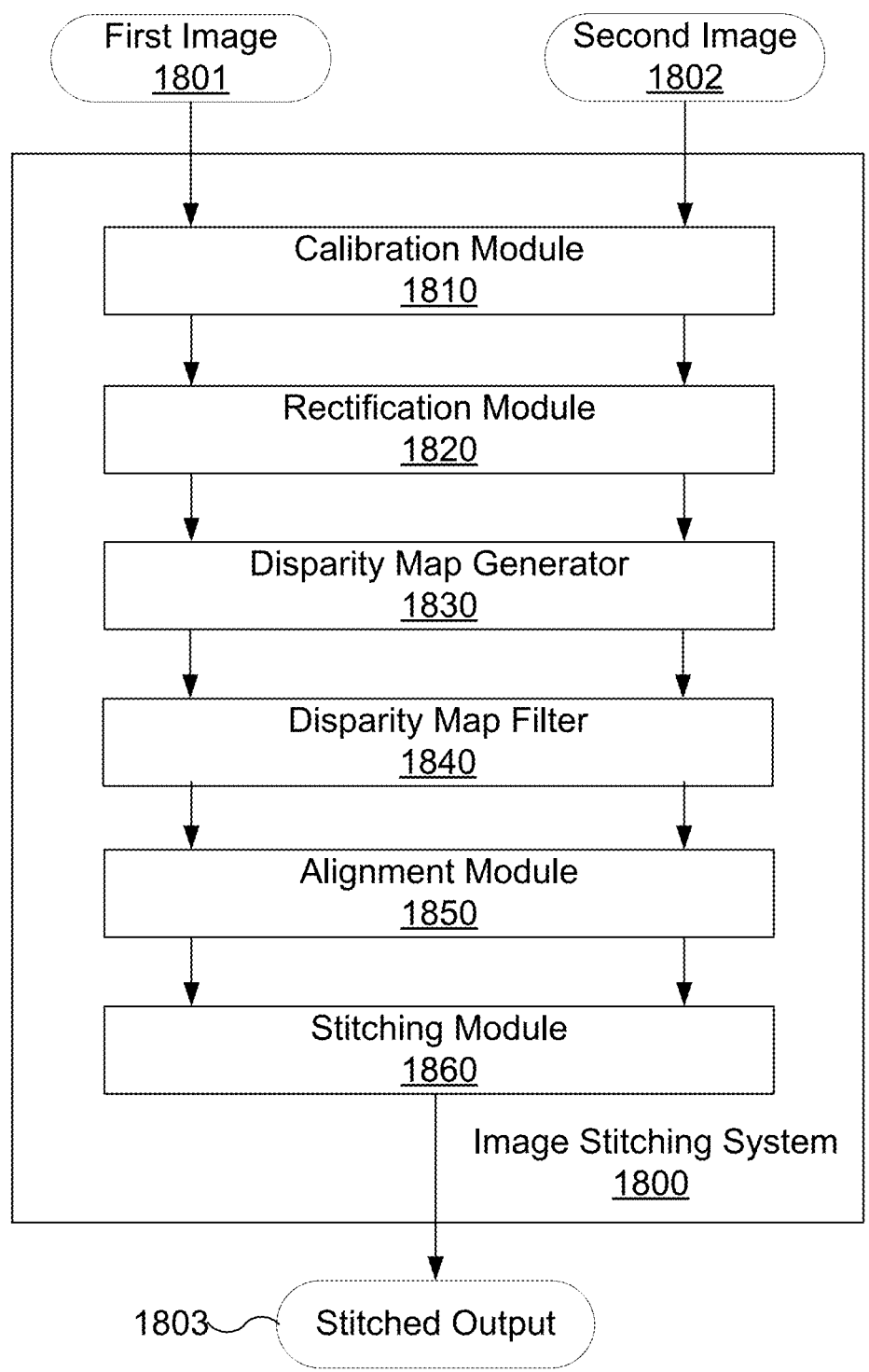
FIG. 18 is a block diagram of a system used in some embodiments to perform a process of image stitching that includes disparity map filtering to improve the stitched output.

FIG. 18 is a block diagram of a system used in some embodiments to perform a process of image stitching that includes disparity map filtering to improve the stitched output. Like Image Stitching System 200 of FIG. 2, the Image Stitching System 1800 of FIG. 18 comprises a processor and a memory coupled with the processor (not shown) along with a number of modules. The memory is configured to provide the processor with instructions that when executed (e.g., by the various modules shown in FIG. 18) cause the processor to perform a number of steps in the process of image stitching.

Like Image Stitching System 200 of FIG. 2, Image Stitching System 1800 is configured to receive a first image at 1801 and a second image at 1802 and Rectification Module 1820 is configured to rectify a first image to form a first rectified image and to rectify a second image to form a second rectified image. Disparity Map Generator 1830 is configured to determine a first disparity map and a second disparity map based at least in part on the first rectified image and the second rectified image. At this point, unlike Image Stitching System 200 of FIG. 2, Image Stitching System 1800 also includes a Disparity Map Filter 1840 configured to filter the first disparity map to obtain a first filtered disparity map and to filter the second disparity map to obtain a second filtered disparity map. Thus, in this case, Alignment Module 1850 is configured to align the first rectified image and the second rectified image based at least in part on the first filtered disparity map and the second filtered disparity map. Stitching Module 1860 is configured to stitch the aligned images to form a stitched image (e.g., shown at 1803 as the Stitched Output).

In some cases, the alignment process involves sub-pixel movement (e.g., points are moved from a location at a pixel by a disparity that does not correspond to an integer number of pixels). In these cases, Alignment Module 1850 is configured to interpolate (e.g., using nearest neighbor interpolation or bilinear interpolation) to align the first rectified image and the second rectified image based at least in part on the first filtered disparity map and the second filtered disparity map.

In some cases, using nearest neighbor interpolation results in blocky features along lines in the stitched output. Accordingly, in a preferable embodiment, bilinear interpolation is used for interpolation resulting in fast implementation and improved smoothness in the stitched output.

In some cases, Alignment Module 1850 is configured to align the first rectified image based at least in part on the first filtered disparity map to generate a first disparity corrected image and to align the second rectified image based at least in part on the second filtered disparity map to generate a second disparity corrected image. In these cases, Stitching Module 1860 is configured to stitch the first disparity corrected image and the second disparity corrected image to form a stitched image (e.g., shown at 1803 as the Stitched Output).

In some examples, the first image and the second image are calibrated by a Calibration Module 1810 using a 3D calibration process configured to remove or compensate for the effects of lens distortion and camera misalignment. Once the first and second images have been calibrated to remove differences between the images due to lens distortion and camera misalignment, rectification is performed on the images by Rectification Module 1820 to provide a computationally efficient method for compensating for misalignment due to parallax. In particular, the problem of determining the disparity between matched pairs of points due to parallax in two images of a scene is reduced from a two-dimensional to a one-dimensional search space. In this manner, the rectification process as disclosed herein provides an approach to compensating for misalignment between images due to parallax in computationally efficient manner.

In some cases, the first image is calibrated to form a first calibrated image and the second image is calibrated to form a second calibrated image. The first calibrated image is rectified to form a first rectified image and the second calibrated image is rectified to form a second rectified image. In some cases, rectification is performed on an overlap region of the first and second images.

In some cases, the 3D calibration process is performed by Calibration Module 1810 for a particular camera or lens setup on an initial set of images and calibration parameters are stored for future use on subsequent images to be stitched using the particular camera or lens setup. In some cases, the stored calibration parameters can be used by Calibration Module 1810 for the calibration step provided the particular camera or lens setup does not change substantially. In cases where the camera or lens setup is changed to a new configuration, the 3D calibration process can be performed by Calibration Module 1810 on another set of images based on the new configuration and those calibration parameters may be stored for future use on subsequent images to be stitched using the new configuration.

Figure 19:
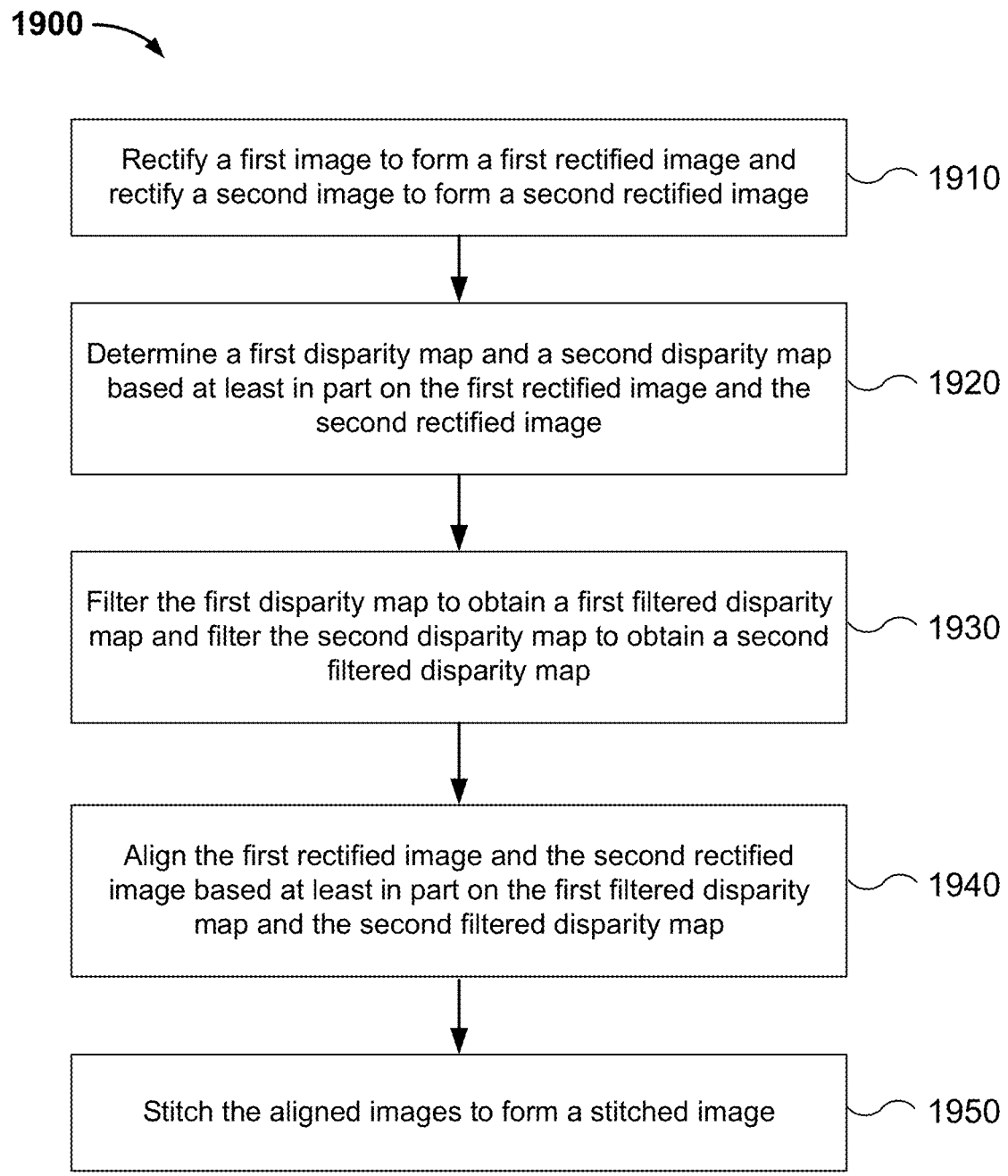
FIG. 19 is a flowchart of an embodiment of a method for image stitching that includes disparity map filtering and can be performed by the exemplary systems depicted in FIGS. 1 and 18.

FIG. 19 is a flowchart of an embodiment of a method 1900 for image stitching that includes disparity map filtering and can be performed by the exemplary systems depicted in FIGS. 1 and 18. Like method 301 of FIG. 3B, method 1900 of FIG. 9 comprises rectifying a first image to form a first rectified image and rectifying a second image to form a second rectified image at 1910 and determining a first disparity map and a second disparity map based at least in part on the first rectified image and the second rectified image at 1920. In this case, rectification of the two images can be performed by Rectification Module 1820 of FIG. 18 and disparity maps can be determined using Disparity Map Generator 1830 of FIG. 18.

In some cases, the first image and the second image are calibrated (e.g., by Calibration Module 1810 of FIG. 18) using a 3D calibration process configured to remove or compensate for the effects of lens distortion and camera misalignment. Once the first and second images have been calibrated to remove differences between the images due to lens distortion and camera misalignment, rectification is performed on the images (e.g., by Rectification Module 1820 of FIG. 18) to provide a computationally efficient method for compensating for misalignment due to parallax.

In some cases, the first image is calibrated to form a first calibrated image and the second image is calibrated to form a second calibrated image. The first calibrated image is rectified to form a first rectified image and the second calibrated image is rectified to form a second rectified image. In some cases, rectification is performed on an overlap region of the first and second images.

In some cases, the 3D calibration process is performed (e.g., by Calibration Module 1810) for a particular camera or lens setup on an initial set of images and calibration parameters are stored for future use on subsequent images to be stitched using the particular camera or lens setup. In some cases, the stored calibration parameters can be used for the calibration step provided the particular camera or lens setup does not change substantially. In cases where the camera or lens setup is changed to a new configuration, the 3D calibration process can be performed on another set of images based on the new configuration and those calibration parameters may be stored for future use on subsequent images to be stitched using the new configuration.

Returning to FIG. 19, unlike the method 301 of FIG. 3B, method 1900 further comprises an additional step at 1930 of filtering the first disparity map to obtain a first filtered disparity map and filtering the second disparity map to obtain a second filtered disparity map. As described with respect to FIG. 18, filtering of the disparity maps can be performed by Disparity Map Filter 1840. Finally, method 1900 includes aligning the first rectified image and the second rectified image based at least in part on the first filtered disparity map and the second filtered disparity map at 1940 and stitching the aligned images to form a stitched image at 1950. Alignment and stitching can be performed by Alignment Module 1850 and Stitching Module 1860 of FIG. 18 respectively.

In some cases, the aligning step at 1940 involves sub-pixel movement (e.g., points are moved from a location at a pixel by a disparity that does not correspond to an integer number of pixels). In these cases, an interpolation (e.g., nearest neighbor interpolation or bilinear interpolation) is performed to align the first rectified image and the second rectified image based at least in part on the first filtered disparity map and the second filtered disparity map.

In some cases, using nearest neighbor interpolation results in blocky features along lines in the stitched output. Accordingly, in a preferable embodiment, bilinear interpolation is used for interpolation resulting in fast implementation and improved smoothness in the stitched output.

In some cases, the aligning step at 1940 comprises aligning the first rectified image based at least in part on the first filtered disparity map to generate a first disparity corrected image and aligning the second rectified image based at least in part on the second filtered disparity map to generate a second disparity corrected image. In these cases, the stitching step at 1950 comprises stitching the first disparity corrected image and the second disparity corrected image to form a stitched image.

In some embodiments, a Weighted Least Squares (WLS) based disparity filtering method is used to perform filtering of the disparity maps. The WLS method employs a global smoothing filter using a guide image along with an image to be smoothened. In this case, the image to be smoothened is the initial raw disparity map and the guide image is an RGB rectified image. For example, in the case where the disparity is determined with respect to the first image (e.g., the left image), the first rectified image is used as a guide image to obtain a filtered disparity map. In the case where the disparity is determined with respect to the second image (e.g., the right image), the second rectified image is used as a guide image to obtain a filtered disparity map.

In a preferable embodiment, to increase computational speed, a Guided Filter is used to perform filtering of the disparity maps. The Guided Filter employs a local filtering approach and thus has a much faster implementation that, unlike the WLS filter, can also be parallelized due to its local nature. In this case, the WLS filter and the Guided Filter appear to perform equally well.

Images can be in various different formats. For example, as described above, in some cases, the first rectified image (e.g., the left rectified image) is used as the guide image. Alternatively, in other cases, disparity data is transformed from a rectified image onto a sphere, which is converted into equirectangular format to obtain a disparity map that is also in equirectangular format. In these cases, the filtered disparity maps and aligned images are in equirectangular format and the stitched output image is also in equirectangular format.

One problem with normal smoothing filters is that as low pass filters, edges get blurred since they are high frequency components. But the goal of filtering here is to retain the edges and smooth out other noisy areas. Thus, methods that employ edge-preserving or edge-aware smoothing filter are preferable for use in disparity map filtering.

In some cases, a method called spatially inhomogeneous edge-preserving image smoothing based on Weighted Least Squares filtering is used to perform filtering of the disparity maps. The method, which falls under the category of edge preserving smoothing filters, is described in "Fast global image smoothing based on weighted least squares," by D. Min, S. Choi, J. Lu, B. Ham, K. Sohn, M. N. Do, IEEE Transactions on Image Processing, vol. 23, no. 12, pp. 5638-5653, December 2014.

In spatially inhomogeneous edge-preserving image smoothing, the WLS filtering problem is formulated as an optimization problem and in particular, as minimizing an energy function comprising the data and prior terms. The solution to this WLS filtering problem is obtained by solving a linear system. Moreover, a special formulation of the WLS filtering problem as described in more detail below allows for a very fast implementation of the algorithm, which can be implemented as a linear time algorithm (O(N)).

In particular, given an input image 'f' and a guidance image 'g', a desired output 'u' is obtained by minimizing the following weighted least squares (WLS) energy function:

$$J(u) = \sum_p \left( (u_p - f_p)^2 + \lambda \sum_{q \in N(p)} w_{p,q}(g)(u_p - u_q)^2 \right) \quad [26]$$

where,
p=(x,y), 0<x<W (width of image), 0<y<H (height of image)
N(p) is a set of neighbors (typically, 4) of a pixel p
λ controls the balance between the two terms. Increasing λ results in more smoothing in the output u, and
$w_{p,q}$ represents a similarity between two pixels p and q, and for example can be defined as follows:

$$w_{p,q}(g) = \exp(-\|g_p - g_q\|/\sigma_c) \quad [27]$$

By setting the gradient of J(u) defined by equation [26] to zero, the minimizer 'u' is obtained by solving a linear system based on a large sparse matrix:

$$(I + \lambda A)u = f \quad [28]$$

where,
u and f denote S×1 column vectors containing color values of u and f (S=W*H)
I: S×5 Identity matrix
A is a S×5 spatially-varying Laplacian matrix defined as:

$$A(m,n) = \begin{cases} \sum_{l \in N(m)} w_{m,l}(g) & n = m \\ -w_{m,n}(g) & n \in N(m) \\ 0 & \text{otherwise} \end{cases} \quad [29]$$

The final smoothing result can be written as follows:

$$u(m) = ((I + \lambda A)^{-1} f)(m). \quad [30]$$

In some cases, a disparity map is displayed as a depth map, where the amount of disparity corresponding to a misalignment between a pair of matched points in two images due to parallax is plotted as brightness values. In these cases, the brighter the pixel in a depth map, the greater the disparity or amount of misalignment due to parallax and the darker the pixel, the less the disparity or amount of misalignment due to parallax. Because objects that are closer in a scene to the camera/lens pairs exhibit a larger misalignment due to parallax than objects that are further away, closer objects will appear brighter while objects at a greater distance from the camera/lens pairs will appear darker in the depth map.

Figure 20:
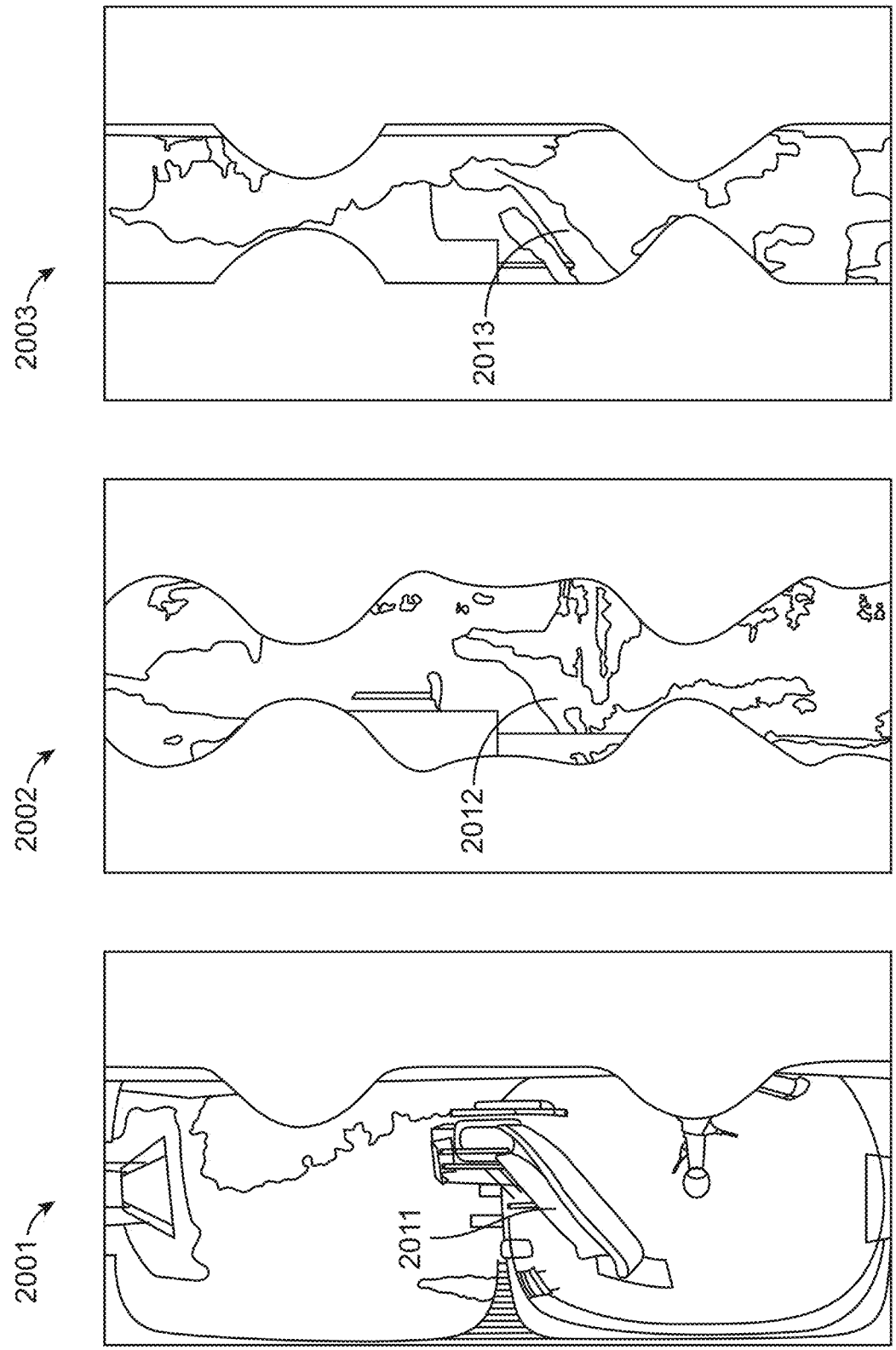
FIG. 20 shows an example of a first rectified image, a first disparity map, and a first filtered disparity map.

FIG. 20 shows an example of a first rectified image 2001 taken of a playground having a slide (e.g., shown at 2011) in a central region of the first rectified image 2001, a first disparity map (raw and unfiltered) displayed as a first depth map 2002, based at least in part on the first rectified image 2001 and a second rectified image (not shown), and a first filtered disparity map displayed as a first filtered depth map 2003, determined or estimated using a WLS Filter or the Guided Filter as described above. Note that the slide (e.g., shown at 2012) depicted in the first rectified image 2001 appears as a brighter region or set of pixels (e.g., shown at 2011) in the first depth map 2002 and also appears as a brighter region or set of pixels (e.g., shown at 2013) in the first filtered depth map 2003. Also note that, after the filtering process, the first filtered depth map 2003 has a smoother less noisy appearance compared to the first raw unfiltered depth map 2002. In particular, the edges and shape of the slide 2013 in the first filtered depth map 2003 appear sharper and are more clearly visible and well-defined as compared to the image of the slide 2013 in the first raw unfiltered depth map 2003

Figure 21:
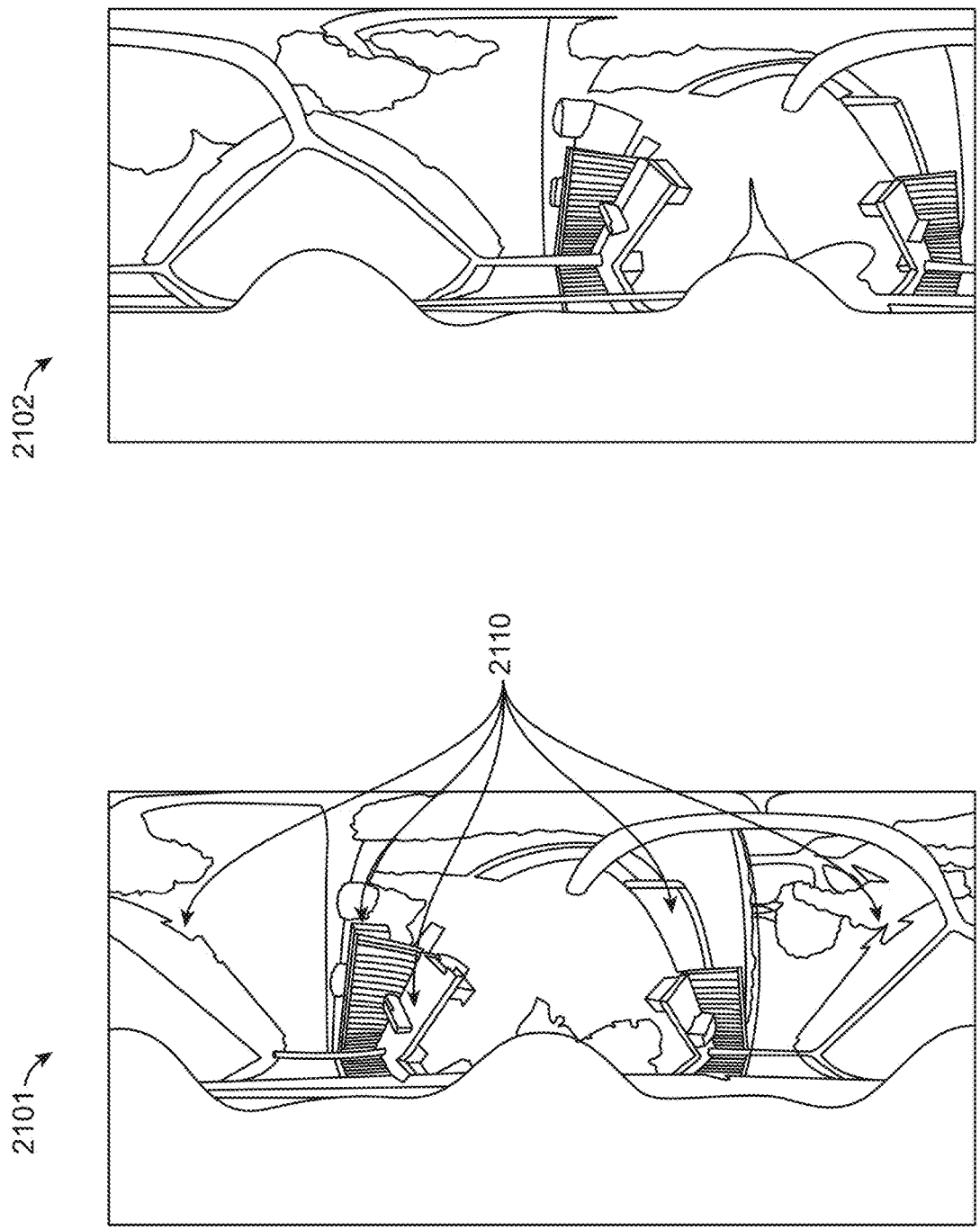
FIG. 21 shows an example of a right rectified image corrected for disparity using a raw disparity map without disparity filtering and a right rectified image corrected for disparity using a filtered disparity map.

FIG. 21 shows an example of a right rectified image 2101 corrected for disparity using a raw disparity map without disparity filtering and a right rectified image 2102 corrected for disparity using a filtered disparity map. As shown in FIG. 21, the right rectified image 2101 exhibits numerous discontinuities (e.g., shown at 2110) while the right rectified image 2102, having been corrected using the filtering process as described above, exhibits significantly less discontinuities.

In a preferable embodiment, the disparity map generation and disparity map filtering process as described above is performed with confidence. Performing these processes with confidence includes determining two raw disparity maps (e.g., left-to-right and right-to-left) and filtering both disparity maps to obtain two filtered disparity maps. However, in some cases, the disparity map generation and disparity map filtering process can be performed without confidence, that is, by determining only one raw disparity map and filtering the one disparity map (e.g., either a left-to-right or a right-to-left raw and filtered disparity map but not both). Although not a preferred embodiment, in some applications, the computational savings may be worth the degradation in performance with respect to the final stitched output.

In cases where the first image is captured by a first camera or lens and the second image is captured by a second camera or lens and where computational speed of the stitching technique is an important concern, the rectification, disparity map generation, disparity map filtering, and alignment processes described herein are performed only on an overlap region of the first image and the second image. Here, the overlap region consists of the portion of a scene visible to both cameras or to both lenses (in this case, to both the first camera or lens and the second camera or lens). In other words, the overlap region is defined by the overlap or intersection of a first field of view associated with the first camera or lens and a second field of view associated with the second camera or lens.

In some embodiments, a first disparity corrected image is obtained based on the first disparity map (or in the case where disparity map filtering is applied, based on the first filtered disparity map) by shifting objects or pixels in the first rectified image according to the value provided by the disparity map. In the case where the first rectified image is a left rectified image (e.g., captured by a Left Camera), the objects are shifted to the left to compensate for parallax and a left disparity corrected image is obtained as a result of the shift. Similarly, a second disparity corrected image is obtained based on the second disparity map (or in the case where disparity map filtering is applied, based on the second filtered disparity map) by shifting objects or pixels in the second rectified image according to the value provided by the disparity map. In the case where the second rectified image is a right rectified image (e.g., captured by a Right Camera), the objects are shifted to the right to compensate for parallax and a right disparity corrected image is obtained as a result of the shift.

Determining the disparity maps only in the overlap region has certain results. One of these is that the left disparity corrected image will have invalid values in a section of columns adjacent to its right edge boundary (since there are no pixels in the left image to move beyond its right boundary from the right of the overlap region), while the right disparity corrected image will have invalid values in a section of columns adjacent to its left edge boundary (since there are no pixels in the right image to move beyond its left boundary from the left of the overlap region).

Figure 22:
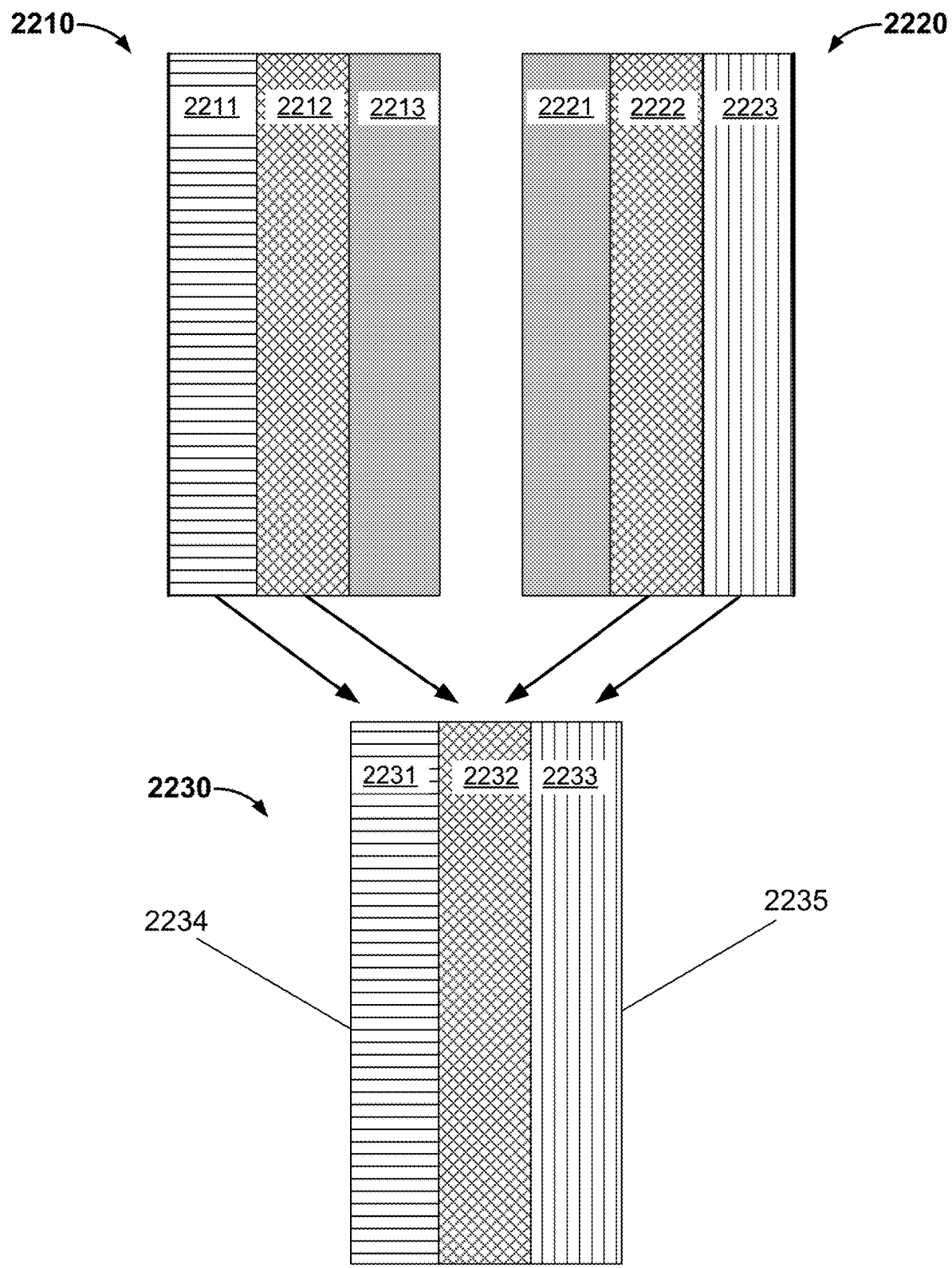
FIG. 22 is a depiction of the alignment process applied to obtain a left disparity corrected image and a right disparity corrected image for stitching.

FIG. 22 is a depiction of the alignment process applied to obtain a left disparity corrected image (e.g., shown at 2210) and a right disparity corrected image (e.g., shown at 2220) for stitching. In the example shown, the left disparity corrected image 2210 is divided into three sections consisting of a set of columns (e.g., left section 2211, middle section 2212, and right section 2213 respectively), each section having a width of 128 pixels. In this case, a side section of columns adjacent to the right edge boundary (e.g., the right section shown at 2213) of the left disparity corrected image 2210 will contain invalid values.

Similarly, the right disparity corrected image 2220 is divided into three sections consisting of a set of columns (e.g., left section 2221, middle section 2222, and right section 2223 respectively), each section having a width of 128 pixels. In this case, a side section of columns adjacent to the left edge boundary (e.g., the left section shown at 2221) of the right disparity corrected image 2220 will also contain invalid values.

In some cases, where two disparity maps are determined (e.g., a left-to-right disparity map providing disparity values for aligning a left rectified image to a right rectified image, and a right-to-left disparity map providing disparity values for aligning a right rectified image to a left rectified image), the alignment process comprises adjusting pixels in the first or left rectified image by half the disparity value provided by the first disparity map (e.g., the left-to-right disparity map) and adjusting pixels in the second or right rectified image by half the disparity value provided by the second disparity map (e.g., the right-to-left disparity map). In other words, the left rectified image is adjusted such that its pixels are moved to the right by half the disparity value provided by the left-to-right disparity map and the right rectified image is adjusted such that its pixels are moved to the left by half the disparity value provided by the right-to-left disparity map. In essence, the two images are moved half the distance required to meet each other in a middle position between the left and right images.

As shown in FIG. 22, in this example, the left disparity corrected image 2210 is obtained by shifting the left rectified image by half the disparity value provided by the left disparity map or the left filtered disparity map and the right disparity corrected image 2220 is obtained by shifting the right rectified image by half the disparity value provided by the right disparity map or the right filtered disparity map such that the two corrected images (e.g., 2210 and 2220) align with each other (due to each of the rectified images having been shifted half the distance required to meet in a middle position between the left and right rectified images). After alignment, a stitching process is applied to stitch the left disparity corrected image 2210 together with the right disparity corrected image 2220 to obtain a stitched image 2230, which in this case, consists of the overlap region only.

In some embodiments, the stitched image 2230 is obtained by combining a middle section of the left disparity corrected image 2210 (e.g., shown at 2212) and a middle section of the right disparity corrected image 2220 (e.g., shown at 2222) with each other to form a middle section of the stitched image 2230 (e.g., shown at 2232). In some cases, the two middle sections of the two disparity corrected images (e.g., shown at 2212 and 2222 respectively) are combined using multiband blending techniques. For example, an approach for multiband blending is described in *A Multiresolution Spline With Application to Image Mosaics by Peter J. Burt and Edward H. Adelson*, which is herein incorporated by reference in its entirety. In other cases, for example, to decrease the memory required and increase computational speed, a simple linear blending such as feather blending is used.

The width of the images used for multiband blending and the number of columns over which blending is carried out at each level affects the blending output significantly. In some embodiments, a width of $2^{N+1}$ is preferable along with single column blending at each level to produce a smoother blend between the two images.

As shown in FIG. 22, the stitched image 2230 comprises: a first side section (e.g., left section 2231), which in this case is the first side section (e.g., left section 2211) of the left disparity corrected image 2210; a middle section (e.g. middle section 2232), which in this case is a linear or multiband blended combination of the two middle sections from the left and right disparity corrected images (e.g., shown at 2212 and 2222 respectively), and a second side section (e.g., right section 2233), which in this case is the second side section (e.g., right section 2223) of the right disparity corrected image 2220.

As described above, in cases wherein the rectification, disparity map generation, disparity map filtering, and alignment processes (e.g., steps 311-331 of FIG. 3B and steps 1810-1840 of FIG. 18) are performed only on an overlap region of the first image and the second image, the rectified images are aligned to obtain disparity corrected images and stitched together to form a stitched image of the overlap region based at least in part on the disparity corrected images. Accordingly, to obtain a stitched image of the complete scene (e.g., a 360-degree view comprising the views of both the first and second images) a non-overlap region of the first image (e.g., left image) and a non-overlap region of the second image (e.g., right image) are combined with the stitched image of the overlap region.

Returning to FIG. 22, to obtain a stitched image of the complete scene in the example shown, a non-overlap region of the original first image (e.g., the original left image) is stitched to the stitched image of the overlap region (e.g., shown at 2230) to form a seam along the left boundary or edge of the stitched image (e.g., shown at 2234). Similarly, a non-overlap region of the original second image (e.g., the right image) is stitched to the stitched image of the overlap region (e.g., shown at 2230) to form a seam along the right boundary or edge of the stitched image (e.g., shown at 2235). Note that the non-overlap regions in this case do not need to be rectified before stitching, but can be obtained in other forms (e.g., from the original left and right fisheye images respectively). Also note that the side sections containing invalid values (e.g., shown at 2213 and 2221 respectively) are not used in forming the stitched image 2230.

In some embodiments, to obtain a smooth stitched result and in particular, to avoid visible artifacts or discontinuities along the seams between the stitched image of the overlap region and the non-overlap regions as described above requires adjusting the disparity maps or the filtered disparity maps before combining the stitched image of the overlap region with non-overlap regions taken from each of the original first and second images, which in this example are the original left and right images. Here, because each of the disparity maps is determined based on the first rectified image and the second rectified image respectively, which in this case, consist only of the overlap region, parallax is compensated for only in the overlap region. In particular, the initial raw disparity calculation generates a disparity map only in the overlap area and thus, points that are matched in the non-overlap area will be incorrect or noise. Filtering the disparity maps using a WLS Filter or Guided Filter for a first rectified image will use the second rectified image as guide image and will thus extend the disparity map into the non-overlap region.

Thus, applying the filtered disparity maps to shift objects (e.g, pixels) appearing in the rectified images to align with each other results in objects at or near a boundary or edge of the overlap region to shift into the non-overlap region. Applying the filtered disparity maps formed only to compensate for parallax in the overlap region results in objects that have zero disparity (no movement due to no parallax since they are only in the field of view of one camera) in the non-overlap region near the boundary or edge of the overlap region being replaced by objects shifted by the disparity map, while objects in the non-overlap region that are not replaced remain as they were in the original image. The effect of this is a sharp discontinuity at a boundary region (e.g., the seams at edges shown at 2234 and 2235 of FIG. 22) between the overlap and non-overlap regions where they are stitched together to form a single 360-degree view.

Accordingly, in some cases, as described in more detail below with respect to the following figures, an adjustment process is performed after the filtering process to adjust the filtered disparity maps before the alignment process in order to improve the stitched image of the complete scene to form a single 360-degree view.

Figure 23:
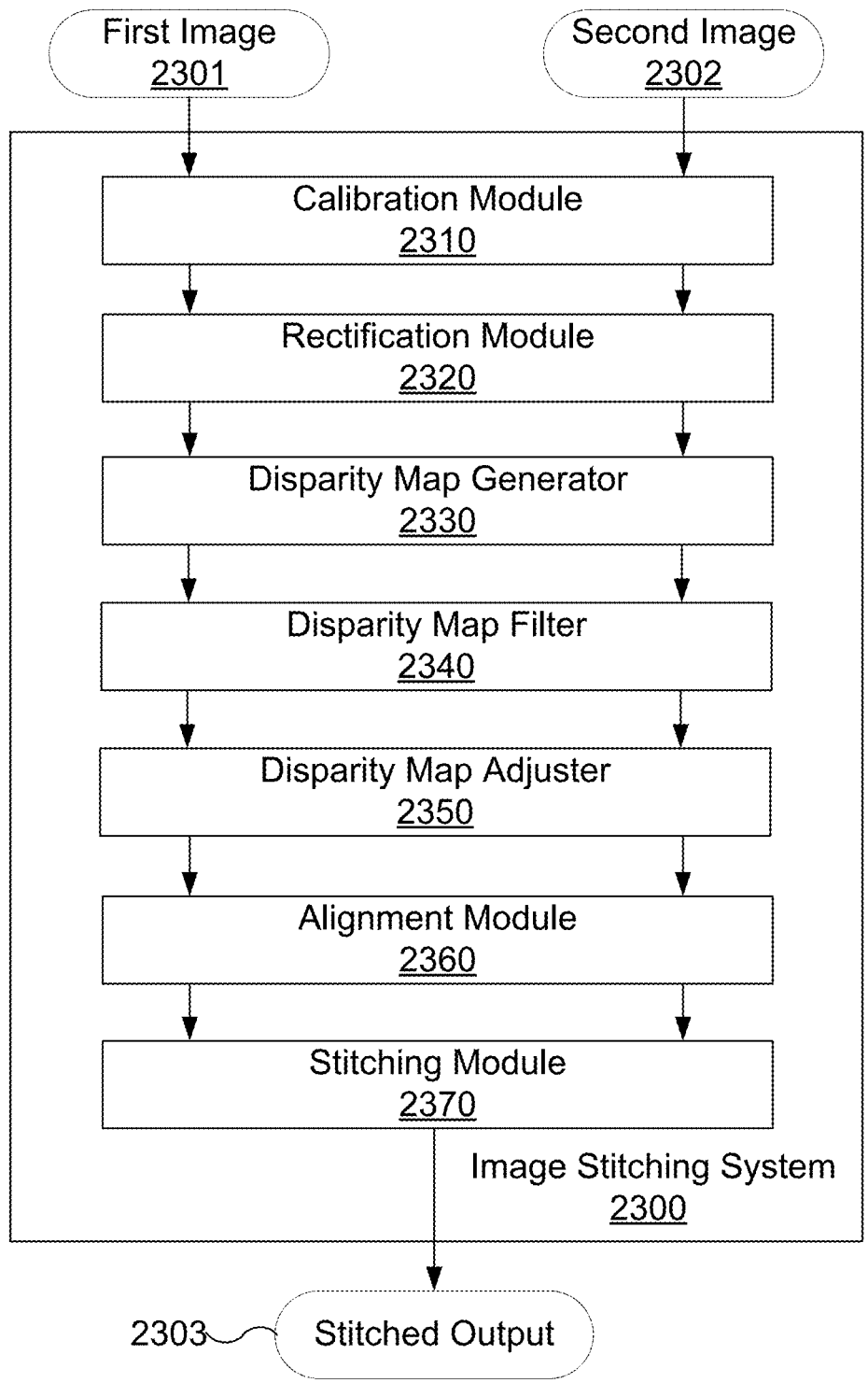
FIG. 23 is a block diagram of a system used in some embodiments to perform a process of image stitching that includes disparity map adjustment to improve the stitched output.

FIG. 23 is a block diagram of a system used in some embodiments to perform a process of image stitching that includes disparity map adjustment to improve the stitched output. Like the systems shown in FIG. 2 and FIG. 18, the Image Stitching System 2300 of FIG. 23 comprises a processor and a memory coupled with the processor (not shown) along with a number of modules. The memory is configured to provide the processor with instructions that when executed (e.g., by the various modules shown in FIG. 23) cause the processor to perform a number of steps in the process of image stitching.

Like the systems shown in FIG. 2 and FIG. 18, Image Stitching System 2300 of FIG. 23 is configured to receive a first image at 2301 and a second image at 2302 and Rectification Module 2320 is configured to rectify a first image to form a first rectified image and to rectify a second image to form a second rectified image. Disparity Map Generator 2330 is configured to determine a first disparity map and a second disparity map based at least in part on the first rectified image and the second rectified image. Disparity Map Filter 2340 is configured to filter the first disparity map to obtain a first filtered disparity map and to filter the second disparity map to obtain a second filtered disparity map. Unlike the embodiments shown in FIG. 2 and FIG. 8, Image Stitching System 2300 also includes Disparity Map Adjuster 2350 which is configured in the example shown to adjust the first filtered disparity map to obtain a first adjusted disparity map and to adjust the second disparity map to obtain a second adjusted disparity map.

Accordingly, in this case, Alignment Module 2360 is configured to align the first rectified image and the second rectified image based at least in part on the first adjusted disparity map and the second adjusted disparity map. Stitching Module 2370 is configured to stitch the aligned images to form a stitched image (e.g., shown at 2303 as the Stitched Output).

In some cases, the alignment process involves sub-pixel movement (e.g., points are moved from a location at a pixel by a disparity that does not correspond to an integer number of pixels). In these cases, Alignment Module 2360 is configured to interpolate (e.g., using nearest neighbor interpolation or bilinear interpolation) to align the first rectified image and the second rectified image based at least in part on the first adjusted disparity map and the second adjusted disparity map.

In some cases, using nearest neighbor interpolation results in blocky features along lines in the stitched output. Accordingly, in a preferable embodiment, bilinear interpolation is used for interpolation resulting in fast implementation and improved smoothness in the stitched output.

In some cases, Alignment Module 2360 is configured to align the first rectified image based at least in part on the first adjusted disparity map to generate a first disparity corrected image and to align the second rectified image based at least in part on the second adjusted disparity map to generate a second disparity corrected image. In these cases, Stitching Module 2370 is configured to stitch the first disparity corrected image and the second disparity corrected image to form a stitched image (e.g., shown at 2303 as the Stitched Output).

In some examples, the first image and the second image are calibrated by a Calibration Module 2310 using a 3D calibration process configured to remove or compensate for the effects of lens distortion and camera misalignment. Once the first and second images have been calibrated to remove differences between the images due to lens distortion and camera misalignment, rectification is performed on the images by Rectification Module 2320 to provide a computationally efficient method for compensating for misalignment due to parallax. In particular, the problem of determining the disparity between matched pairs of points due to parallax in two images of a scene is reduced from a two-dimensional to a one-dimensional search space. In this manner, the rectification process as disclosed herein provides an approach to compensating for misalignment between images due to parallax in computationally efficient manner.

In some cases, the first image is calibrated to form a first calibrated image and the second image is calibrated to form a second calibrated image. The first calibrated image is rectified to form a first rectified image and the second calibrated image is rectified to form a second rectified image. In some cases, rectification is performed on an overlap region of the first and second images.

In some cases, the 3D calibration process is performed by Calibration Module 2310 for a particular camera or lens setup on an initial set of images and calibration parameters are stored for future use on subsequent images to be stitched using the particular camera or lens setup. In some cases, the stored calibration parameters can be used by Calibration Module 2310 for the calibration step provided the particular camera or lens setup does not change substantially. In cases where the camera or lens setup is changed to a new configuration, the 3D calibration process can be performed by Calibration Module 2310 on another set of images based on the new configuration and those calibration parameters may be stored for future use on subsequent images to be stitched using the new configuration.

Figure 24:
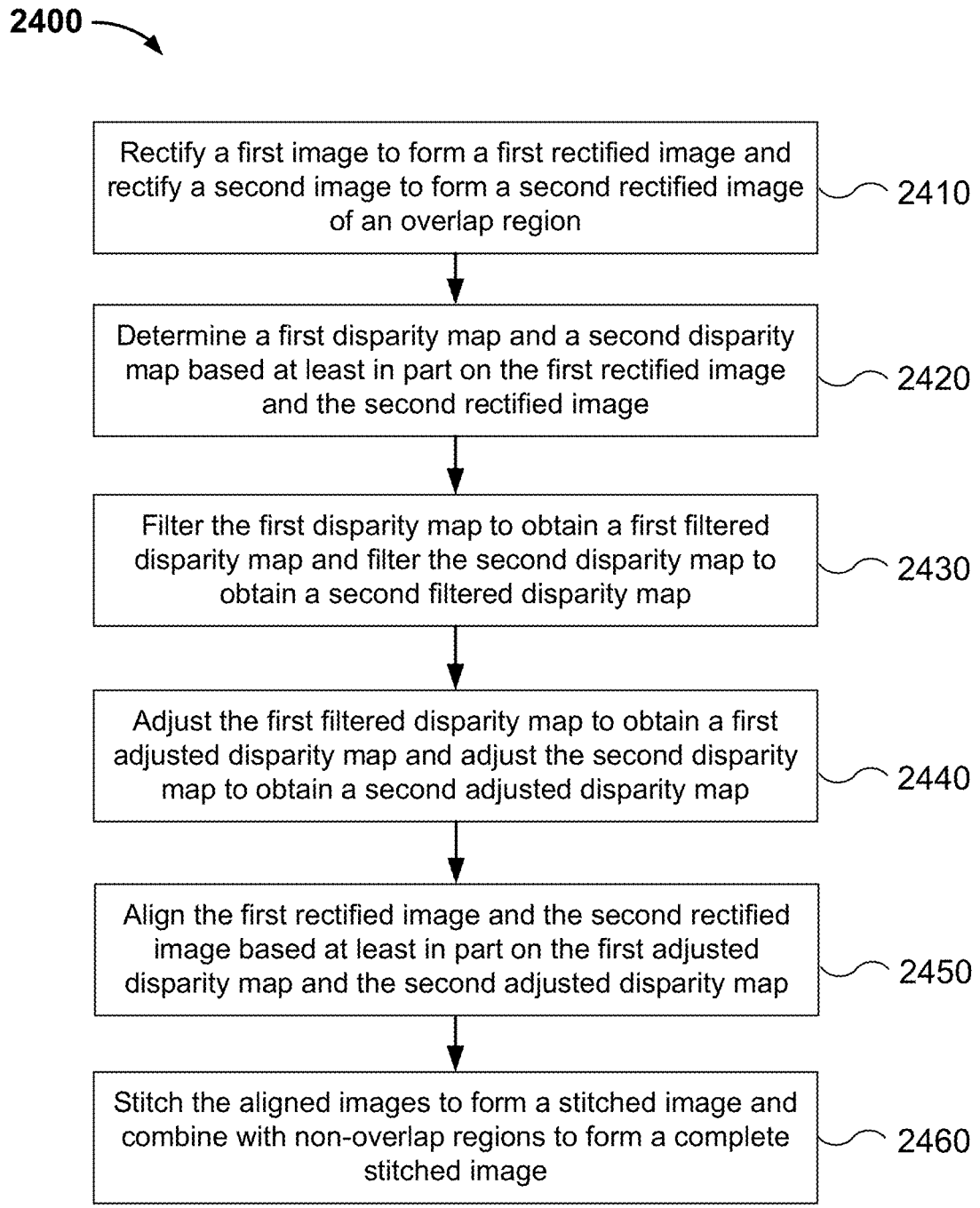
FIG. 24 is a flowchart of an embodiment of a method for image stitching that includes disparity map adjustment and can be performed by the exemplary systems depicted in FIGS. 1 and 23.

FIG. 24 is a flowchart of an embodiment of a method 2400 for image stitching that includes disparity map adjustment and can be performed by the exemplary systems depicted in FIGS. 1 and 23.

Like the methods described with respect to FIG. 3B and FIG. 19, method 2400 of FIG. 24 comprises: rectifying a first image to form a first rectified image and rectifying a second image to form a second rectified image at 2410, determining a first disparity map and a second disparity map based at least in part on the first rectified image and the second rectified image at 2420, and filtering the first disparity map to obtain a first filtered disparity map and filtering the second disparity map to obtain a second filtered disparity map at 2430. In this case, rectification of the two images can be performed by Rectification Module 2320 of FIG. 23, disparity maps can be determined using Disparity Map Generator 2330 of FIG. 23, and filtering of the disparity maps can be performed by Disparity Map Filter 2340 of FIG. 23.

In some cases, the first image and the second image are calibrated (e.g., by Calibration Module 2310 of FIG. 23) using a 3D calibration process configured to remove or compensate for the effects of lens distortion and camera misalignment. Once the first and second images have been calibrated to remove differences between the images due to lens distortion and camera misalignment, rectification is performed on the images (e.g., by Rectification Module 2320 of FIG. 23) to provide a computationally efficient method for compensating for misalignment due to parallax.

In some cases, the first image is calibrated to form a first calibrated image and the second image is calibrated to form a second calibrated image. The first calibrated image is rectified to form a first rectified image and the second calibrated image is rectified to form a second rectified image. In some cases, rectification is performed on an overlap region of the first and second images.

In some cases, the 3D calibration process is performed (e.g., by Calibration Module 2310) for a particular camera or lens setup on an initial set of images and calibration parameters are stored for future use on subsequent images to be stitched using the particular camera or lens setup. In some cases, the stored calibration parameters can be used for the calibration step provided the particular camera or lens setup does not change substantially. In cases where the camera or lens setup is changed to a new configuration, the 3D calibration process can be performed on another set of images based on the new configuration and those calibration parameters may be stored for future use on subsequent images to be stitched using the new configuration.

Returning to FIG. 24, unlike the methods described with respect to FIG. 3B and FIG. 19, method 2400 further comprises an additional step at 2440 of adjusting the first filtered disparity map to obtain a first adjusted disparity map and adjusting the second disparity map to obtain a second adjusted disparity map. Here, as described with respect to FIG. 23, adjusting the disparity maps can be performed by Disparity Map Adjuster 2350. Accordingly, the alignment process is performed based on the adjusted disparity maps. In this case, method 2400 includes aligning the first rectified image and the second rectified image based at least in part on the first adjusted disparity map and the second filtered disparity map at 2450 and stitching the aligned images to form a stitched image at 2460. Alignment and stitching can be performed by Alignment Module 2360 and Stitching Module 2370 of FIG. 23 respectively.

In some cases, the aligning step at 2450 involves sub-pixel movement (e.g., points are moved from a location at a pixel by a disparity that does not correspond to an integer number of pixels). In these cases, an interpolation (e.g., nearest neighbor interpolation or bilinear interpolation) is performed to align the first rectified image and the second rectified image based at least in part on the first adjusted disparity map and the second filtered disparity map.

In some cases, using nearest neighbor interpolation results in blocky features along lines in the stitched output. Accordingly, in a preferable embodiment, bilinear interpolation is used for interpolation resulting in fast implementation and improved smoothness in the stitched output.

In some cases, the aligning step at 2450 comprises aligning the first rectified image based at least in part on the first adjusted disparity map to generate a first disparity corrected image and aligning the second rectified image based at least in part on the second adjusted disparity map to generate a second disparity corrected image. In these cases, the stitching step at 2460 comprises stitching the first disparity corrected image and the second disparity corrected image to form a stitched image.

In some examples, the first image and the second image are calibrated by a Calibration Module 2310 using a 3D calibration process configured to remove or compensate for the effects of lens distortion and camera misalignment. Once the first and second images have been calibrated to remove differences between the images due to lens distortion and camera misalignment, rectification is performed on the images by Rectification Module 2320 to provide a computationally efficient method for compensating for misalignment due to parallax. In particular, the problem of determining the disparity between matched pairs of points due to parallax in two images of a scene is reduced from a two-dimensional to a one-dimensional search space. In this manner, the rectification process as disclosed herein provides an approach to compensating for misalignment between images due to parallax in computationally efficient manner.

In some cases, to improve the stitched image, adjusting the first filtered disparity map and the second filtered disparity map comprises performing a linear weighting process to smoothen a transition between an overlap and a non-overlap region. As an example, a linear weighting process is configured to adjust each of the filtered disparity maps such that when applied to align the two rectified images, substantially aligns a middle section of the two rectified images and aligns a side section of the rectified images in a manner to smooth discontinuities along an edge or seam between an overlap region and a non-overlap region in a stitched image of a complete scene.

Figure 25:
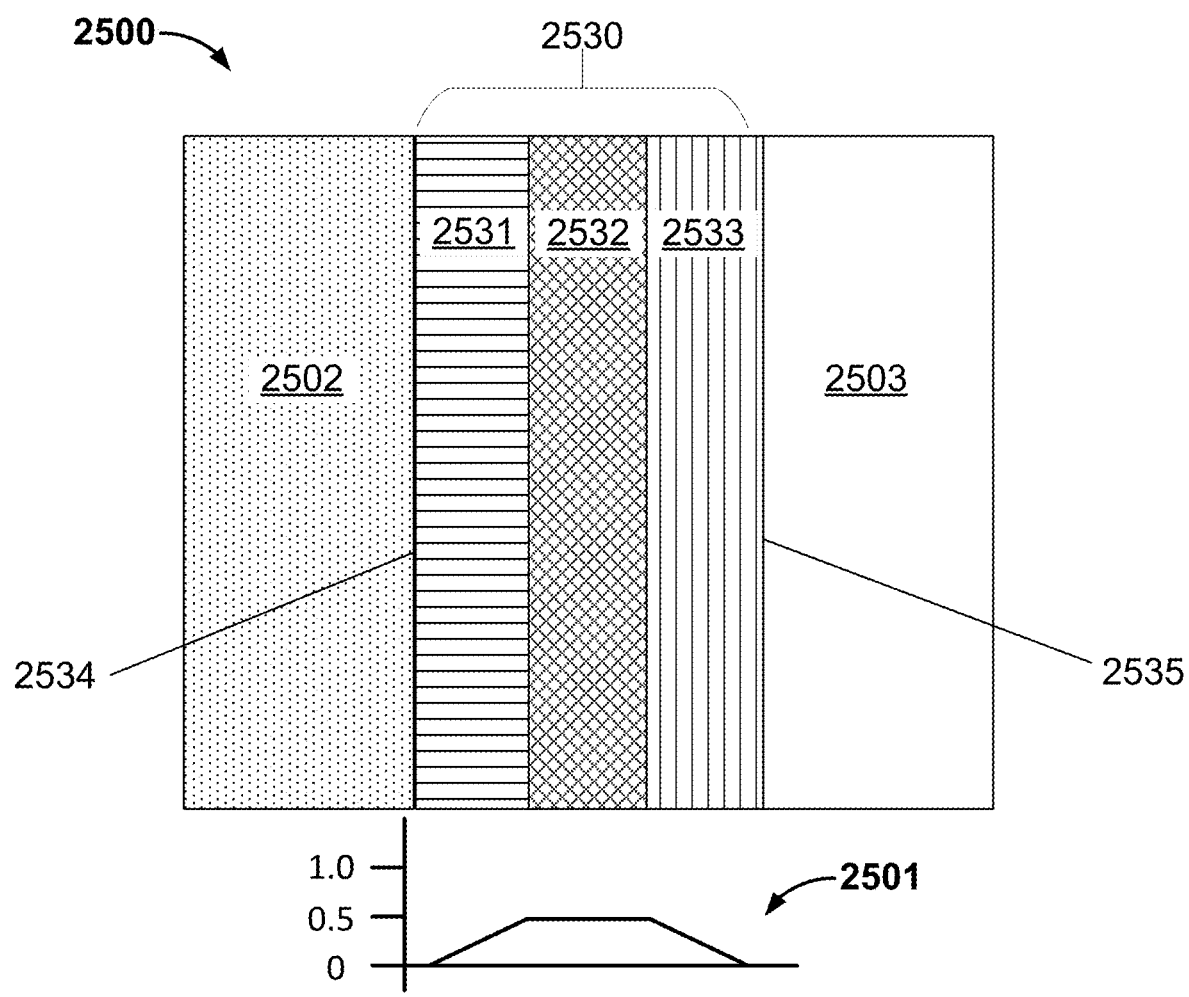
FIG. 25 is a depiction of a linear weighting process applied to adjust the disparity maps or the filtered disparity maps to address discontinuities along seams of a stitched image that appear between an overlap region and a non-overlap region.

FIG. 25 is a depiction of a linear weighting process applied to adjust the disparity maps or the filtered disparity maps as described herein to address discontinuities along seams of a stitched image that appear between an overlap region and a non-overlap region.

As shown in FIG. 25, the stitched image of a complete scene (e.g., shown at 2500) is composed of a number of sections that are stitched together to form a single image. In particular, in the example shown, a stitched image of the overlap region (e.g., shown at 2530) comprises a first or left side section (e.g., shown at 2531), a middle section (e.g., shown at 2532), and a second or right side section (e.g., shown at 2533). Here, the stitched image of the overlap region (e.g. shown at 2530) is stitched together with an image of a non-overlap region obtained from the first image (e.g., shown at 2502) forming a first seam (e.g., shown at 2534) at a first or left edge or boundary between the stitched image of the overlap region and the image of the non-overlap region taken from the first image. The stitched image of the overlap region (e.g. shown at 2530) is also stitched together with an image of a non-overlap region obtained from the second image (e.g., shown at 2503) forming a second seam (e.g., shown at 2535) at a second or right edge or boundary between the stitched image of the overlap region and the image of the non-overlap region taken from the second image. Note here that 2500 is a depiction of a complete stitched image and that the images of the non-overlap regions (e.g., shown at 2502 and 2503) need not be rectified but may be obtained directly from original images (e.g., a first fisheye image and a second fisheye image respectively).

To address the discontinuity along the seams (e.g., the first seam 2534 and the second seam 2535) formed between the stitched image of the overlap region and the images of the non-overlap region, a linear weighting process is performed to improve a transition between the non-overlap regions and the overlap regions of the stitched images to be more continuous or smooth. In particular, the first disparity map and the second disparity map are adjusted by performing a linear weighting process configured to adjust the disparity maps such that when applied to align the two rectified images, they will substantially align a middle section of the two rectified images and align a side section of the rectified images to smooth an edge or transition between the overlap region and a non-overlap region. If a filtering process is performed to filter the disparity maps prior to the alignment process, the filtered disparity maps (e.g., the first filtered disparity map and the second filtered disparity map) are adjusted by performing a linear weighting process as described in more detail below.

As shown in FIG. 25, the two side sections of the disparity maps (e.g., corresponding to side sections shown at 2531 and 2533) applied to align the rectified images to form the disparity corrected images are linearly weighted with values from zero to 0.5 (e.g. shown at 2501), wherein the weights increase from a zero value at the edge or boundary along the seam to a value of 0.5 at the middle of the stitched image of the overlap region. The middle section of the disparity maps (e.g., corresponding to the middle section shown at 2532) applied to align the rectified images to form the disparity corrected images is weighted with a value of 0.5. The result of the linear weighting process depicted in FIG. 25 is to adjust the disparity maps or filtered disparity maps such that when applied to align two rectified images, a middle section of the two rectified images is substantially aligned in middle position at a disparity between the two rectified images and a side section of the each of the rectified images is aligned to smooth an edge between the overlap region and a non-overlap region. Additionally, in some cases, a blending process is performed to stitch the aligned middle sections of the two rectified images. The blending process can comprise linear blending or multiband blending. In some examples, the blending process is performed to lessen or remove the appearance of undesired artifacts or visible seams from the stitched image.

Note that although a linear weighting process is performed in the example shown, other weighting schemes including non-linear or other configurations to produce an improvement in the transition along the seams between the overlap region and non-overlap regions of the images as described above.

Another issue arises due to the rectification, disparity estimation, and filtering processes in the disclosed system and method for image stitching. As described above, the rectified images used for disparity estimation, disparity map generation, and disparity map filtering are two dimensional rectangular images. In particular, a rectified image of the overlap region as described herein is extracted around a circumference of a three dimensional sphere such that epipolar curves of the sphere lie along rows of the rectangle (see, e.g., FIG. 17). As a result of the rectification process, objects in a rectified image that extend beyond the top of the rectified image are actually continued at the bottom of the rectified image since the image is continuous on the three dimensional sphere. However, the disparity estimation and filtering processes do not take this into account and as a result, different disparities (e.g., disparity values) may be assigned to the same object (e.g., a set of pixels in the same object) appearing at the top and bottom of the rectified images. The assignment of different disparities by the disparity estimation and filtering algorithms described herein will result in the same object to be shifted differently in the disparity corrected images during the alignment process resulting in a visible discontinuity when viewing the final stitched image of the complete scene.

Accordingly, to address this top-bottom discontinuity problem described above, in some embodiments, the adjustment process also includes adjusting the disparity maps or filtered disparity maps to improve a transition between a top section and bottom section of the disparity corrected images. As described below, in some cases, adjusting the first filtered disparity map and the second filtered disparity map comprises adjusting the disparity values at a top section or a bottom section of the filtered disparity maps to lessen differences between top and bottom disparity values.

In particular, to address the discontinuity that can appear due to an abrupt change of disparity values between the top and bottom sections of the disparity maps or the filtered disparity maps, the disparity values at the top and bottom sections must be matched to provide a smooth transition between the two sections. A top-bottom disparity smoothing process is performed to smoothly increase or decrease one of the sections (e.g., the top section or the bottom section) such that the two sections have equal values at a boundary where the two sections will meet.

As an example, taking a disparity map (filtered or unfiltered depending on the application) and assuming the disparity d for a pixel in the top row of a given column has the value dtop and a pixel in the bottom row of the same given column has the value dbot which is less than dtop (i.e., dtop>dbot). A goal of the top-bottom disparity smoothing process in this case is to adjust the disparity values of the bottom rows by smoothly increasing the disparity of the pixels in rows that are above and leading to the bottom value dbot such the final value dbot will be equal to dtop.

For example, applying this adjustment or correction on the bottom K rows (bottom-K) of a disparity map, then for rows "bottom-K to bottom," the disparities will be given as follows:

for m=0: K disparity(bottom-$m$)=disparity(bottom-$K$)+
(($d$top−$d$bot)*($K$−$m$)/$K$)

Using the formulation above, the disparity smoothly increases to dtop in the bottom row and matches the top row. An advantage of this method (as opposed for example to applying linear weights to smoothly transition between top and bottom sections) is that the disparities are only adjusted where the disparity values do not match at the top and bottom. In the case where the top and bottom values match (e.g., dtop=dbot) or where there is only small difference delta between the top and bottom values (e.g., dtop−dbot<delta, where delta is a small value that can be specified depending on the application), this method does not change the disparity values at all. But in cases where the disparity values between the top and bottom are significantly larger than zero, this method will smoothly align the top and bottom rows to have the same high disparity value. Note that the number of rows K for this correction is a free parameter that can be selected depending on the application. In some cases, it is preferable to set K as small as possible which results in using the original disparity values (in the raw or filtered disparity map) on most of the image and will also smooth any visible discontinuity in the viewed image resulting from differences between the top and bottom disparity values of the rectified images.

In some embodiments, the disclosed technique for image stitching is used for video stitching. In these cases, as described in further detail with respect to the following figures, an inter-frame approach that compares successive frames is taken to apply the disclosed technique for image stitching to generate a stitched video having a 360-degree viewing perspective.

Applying the disclosed image stitching technique to independently stitch each video frame in a successive sequence of video frames (e.g., from two or more video cameras/lenses) without further adjustment does not take into account the presence of objects that do not move or move only slightly between frames. Disparity maps and parameters that are determined or estimated independently on each individual frame in a video will vary between successive video frames in a sequence due to the disparity estimation, generation, filtering and adjustment processes as described herein.

A video comprised of successive video frames typically includes a very short time period between video frames. For example, for a video taken at 30 frames per second, the period between successive video frames will be ⅓₀ of a second, while for a video taken at 60 frames per second, the period between successive video frames will be ¹⁄₆₀ of a second. In cases where the video frame rate is sufficiently high, an object in one frame has likely not moved much at all between frames, particularly if the object is stationary, and will therefore have a very similar disparity value for each of its pixels as the previous frame in the sequence. For example, applying the disclosed image stitching technique independently on each of two successive frames may associate different disparity values to pixels corresponding to an object that is substantially stationary with respect to the camera/lens. Where different disparity values are determined for pixels associated with an object that does not move substantially across successive frames in a sequence of video frames, that object will appear to shake in the stitched video output when it should remain stationary. This is due to the disparity estimation and filtering processes conducted independently on each frame (e.g., by the image stitching systems as disclosed herein), resulting in applying difference maps having different disparity values for pixels associated with the same object in two successive frames. This in turn results in a shifting of pixels associated with the same object by different amounts in successive frames when the pixels should be shifted by the same amount since the object has not substantially moved.

The inter-frame approach as disclosed herein applies the disclosed image stitching technique to each video frame in a sequence of video frames while improving temporal continuity between successive frames across the stitched video output. To apply the disclosed image stitching technique to successive frames in a video, the disparity maps for subsequent frames are temporally adjusted by identifying objects that have not moved between frames (e.g., between a subsequent frame and a previous frame, wherein the subsequent frame follows or is subsequent to a previous frame in a sequence of video frames) and applying appropriately weighted disparity values to pixels associated with the same object in successive frames (e.g., an object in the subsequent frame and the previous frame). This temporal adjustment is configured to maintain temporal continuity between a subsequent frame and a previous frame in a sequence of video frames.

As described below with respect to the following figures, in an inter-frame approach, as each frame in a sequence of video frames is obtained or received, it is compared with a previous frame in the sequence of frames to determine whether an object appearing in successive frames has moved. If the object is determined to be in the same place in successive frames (e.g., the subsequent frame and the previous frame), the disparity map of the subsequent frame is adjusted so that the disparity values corresponding to the object remain the same or similar for the previous frame and subsequent frame. This maintains the position of the object in the same place (e.g., its pixels are shifted by the same amount as determined by the disparity values) resulting in an improved stitched video output.

Figure 26:
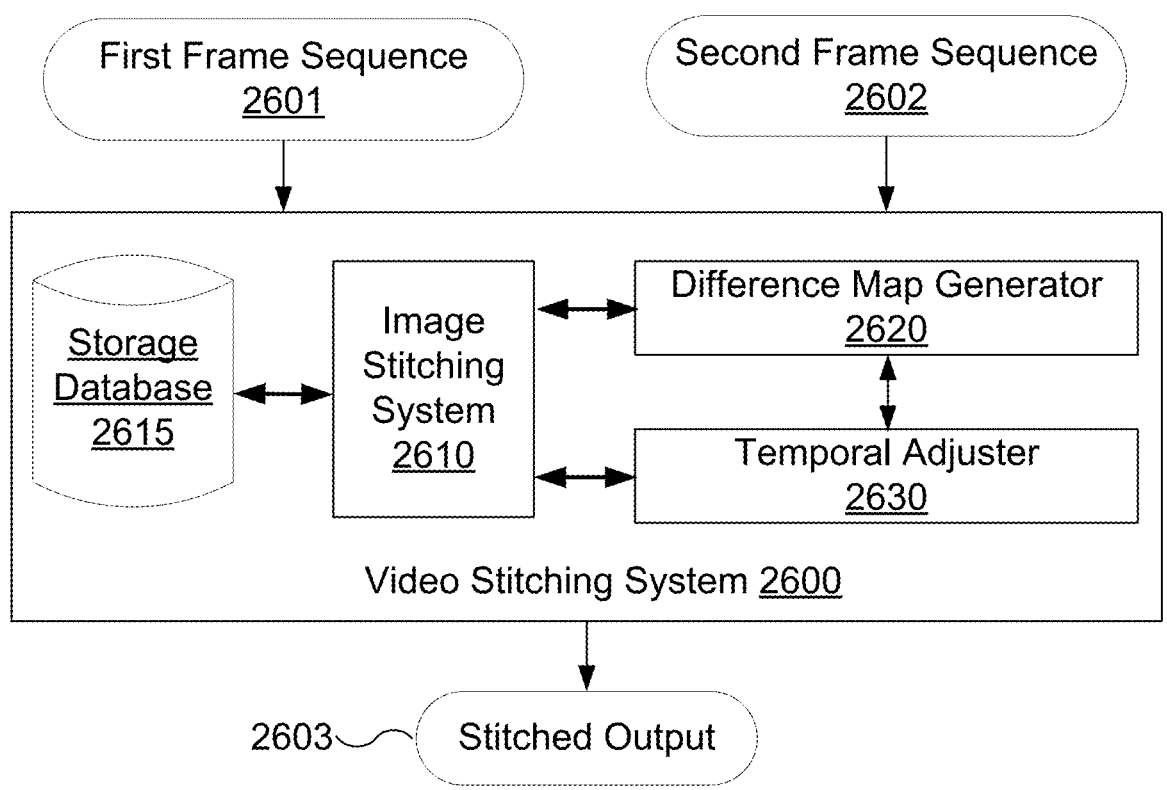
FIG. 26 is a block diagram of a Video Stitching System used in some embodiments to perform a process of video stitching.

FIG. 26 is a block diagram of a Video Stitching System used in some embodiments to perform a process of video stitching. Like Image Stitching System 200 of FIG. 2, the Video Stitching System 2600 of FIG. 26 comprises a processor and a memory coupled with the processor (not shown) along with a number of modules. The memory is configured to provide the processor with instructions that when executed (e.g., by the various modules shown in FIG. 26) cause the processor to perform a number of steps in the process of video stitching.

Video Stitching System 2600 is configured to receive a subsequent first frame in a first frame sequence and a subsequent second frame in a second frame sequence. In some cases, the subsequent first frame (received at 2601) follows a previous first frame in the first frame sequence and the subsequent second frame (received at 2602) follows a previous second frame in the second frame sequence. In some cases, the first frame sequence is captured or obtained by a first video camera or lens and the second frame sequence is captured or obtained by a second video camera or lens.

As described in more detail below, the subsequent first frame and subsequent second frame are used as inputs (e.g., as a first image and a second image) to Image Stitching System 2610 to form a subsequent stitched video frame using temporally adjusted disparity maps in the alignment process. In particular, temporal continuity between successive frames is improved by adjusting disparity values in subsequent disparity maps (e.g., determined based on the subsequent first frame and subsequent second frame) based at least in part on disparity values in previous disparity maps (e.g., determined based on the previous first frame and previous second frame).

Receiving two subsequent frames as inputs, Image Stitching System 2610 rectifies the subsequent first frame to form a subsequent first rectified frame and rectifies a subsequent second frame to form a subsequent second rectified frame. In some cases, the rectification is performed only in an overlap region of the first and second frames. Image Stitching System 2610 determines a subsequent first disparity map and a subsequent second disparity map based at least in part on the subsequent first rectified frame and the subsequent second rectified frame.

In some examples, Image Stitching System 2610 calibrates the subsequent first frame and the subsequent second frame using a 3D calibration process configured to remove or compensate for the effects of lens distortion and camera misalignment before being rectified. In these cases, Image Stitching System 2610 calibrates the subsequent first frame to form a subsequent first calibrated frame and calibrates the subsequent second frame to form a subsequent second calibrated frame. Image Stitching System 2610 rectifies the subsequent first calibrated frame to form a subsequent first rectified frame and rectifies a subsequent second calibrated frame to form a subsequent second rectified frame.

In the case where calibration parameters have been stored for a given camera or lens setup (e.g., for the first and second video cameras or lenses), the calibration parameters can be retrieved to calibrate the frames (e.g., to apply corrections to compensate for lens distortion and/or camera misalignment to the subsequent first frame and the subsequent second frame) before or after rectification. As noted previously, the stored calibration parameters can be used for the calibration step in successive frames provided the particular camera or lens setup does not change substantially between frames.

Storage Database 2615 is configured to store data used or generated by the Video Stitching System 2600. These data include images, frames, and parameters obtained, received, used, estimated, determined or generated by the Video Stitching System 2600. As an example, images, frames, and parameters received, used, determined or generated by Image Stitching System 2610 are stored in Storage Database 2615. Stored parameters include but are not limited to: calibration parameters, rectified images or frames, difference maps (e.g., as described in more detail below), raw disparity maps, filtered disparity maps, adjusted disparity maps, disparity corrected images or frames, and stitched images or frames (e.g., in rectified format and/or in an overlap region). A previous first rectified frame, previous second rectified frame, and previous disparity maps (raw, filtered, and/or adjusted disparity maps) received, used, determined or generated in the process of outputting a previous stitched video frame can be stored in Storage Database 2615 for future use. Additionally, any subsequent images, frames, and parameters received, used, determined or generated in the process of outputting a subsequent stitched video frame can also be stored in Storage Database 2615.

Thus, as described above, Video Stitching System 2600 stores various parameters, including parameters previously determined or generated (e.g. calibration parameters, rectified images or frames, raw disparity maps, filtered disparity maps, adjusted disparity maps, and disparity corrected images or frames, and stitched images or frames) in a database (e.g., Storage Database 2615) and can retrieve these parameters for future use.

To improve temporal continuity between successive frames, after receiving a subsequent first frame in the first frame sequence (e.g., received at 2601) and a subsequent second frame in the second frame sequence (e.g., received at 2602), Difference Map Generator 2610 generates a first difference map by comparing the subsequent first frame to a previous first frame (e.g., stored in Storage Database 2615) and a second difference map by comparing the subsequent second frame to a previous second frame (e.g., stored in Storage Database 2615). In some examples, the comparison is based on a grayscale difference between corresponding pixels of the subsequent frame and the previous frame from a frame sequence captured by each video camera/lens. These difference maps provide a metric for comparing an object in a previous frame to an object in a subsequent frame, in particular, to determine whether the object is the same object in a substantially same position or location in both frames.

In some cases, the first and second difference maps are determined based at least in part on comparing successive frames (e.g., a previous frame and a subsequent frame) in a rectified format. Rectification is performed by a rectification module in the image stitching system (e.g., Rectification Modules shown at 220, 1820, and 2320). As an example, the first and second difference maps are determined based at least in part on comparing the subsequent first and second rectified frames (e.g., obtained by rectifying the subsequent first frame and the subsequent second frame) to previous first and second rectified frames (e.g., obtained by rectifying a previous first frame and a previous second frame).

Accordingly, in some cases, Difference Map Generator 2610 generates a first difference map by comparing the subsequent first rectified frame to a previous first rectified frame and generates a second difference map by comparing the subsequent second rectified frame to a previous second rectified frame. In some cases, the rectification is performed only in an overlap region of the first and second frames. In some cases, the rectification is performed after difference maps have been generated based on the originally received first and second frames (e.g., shown at 2601 and 2602).

Alternatively, in some cases, difference maps are generated before rectification. In these cases, Difference Map Generator 2610 generates a first difference map by comparing the subsequent first frame received by the system (e.g., shown at 2601) to a previous first frame and a second difference map is generated by comparing the subsequent second frame received by the system (e.g., shown at 2602) to a previous second frame. The first and second difference maps can then be rectified for use with the rectified frames.

In some cases, the parameters stored in Storage Database 2615 include previously rectified images or rectified frames used in the image stitching process. Difference Map Generator 2610 generates a first difference map by comparing the subsequent first rectified frame to the previous first rectified frame (e.g., previously stored and retrieved from Storage Database 2615) and generates a second difference map by comparing the subsequent second rectified frame to the previous second rectified frame (e.g., previously stored and retrieved from Storage Database 2615).

In some cases, successive frames are converted from RGB to grayscale and the first and second difference maps are determined based on taking a grayscale difference between a subsequent frame and a previous frame. As an example, a grayscale difference for each pixel is determined by subtracting the grayscale value of a given pixel in the previous frame from the grayscale value of a corresponding pixel in the subsequent frame.

In the case of a first frame from a first video camera/lens and a second frame from a second video camera/lens, Difference Map Generator 2610 determines a first difference map based at least in part on subtracting grayscale values of each pixel in a previous first frame from the grayscale values of corresponding pixels in a subsequent first frame. Similarly, a second difference map is determined based at least in part on subtracting grayscale values of each pixel in a previous second frame from the grayscale values of corresponding pixels in a subsequent second frame. In some cases, each of the frames is rectified before performing subtraction of grayscale values.

Temporal Adjuster 2630 temporally adjusts the subsequent first disparity map based at least in part on the first difference map and a previous first disparity map and temporally adjusts the subsequent second disparity map based at least in part on the second difference map and a previous second disparity map. In some cases, Temporal Adjuster 2630 adjusts the subsequent first disparity map based at least in part on the first difference map and a previous first disparity map to form a subsequent first temporally adjusted disparity map. Similarly, in some cases, Temporal Adjuster 2630 adjusts the subsequent second disparity map based at least in part on the second difference map and a previous second disparity map to form a subsequent second temporally adjusted disparity map. The previous first and second disparity maps can be obtained or retrieved from storage (e.g., Storage Database 2615) along with any other parameters previously determined or generated and stored by Image Stitching System 2610.

In some cases, Temporal Adjuster 2630 uses a weighted sum of previous disparity values from previous disparity maps and subsequent disparity values from subsequent disparity maps to perform a temporal adjustment process. In some cases, the temporal adjustment process includes temporally adjusting disparity values in the disparity maps used to align the subsequent first and second frames to each other to form a stitched video output (e.g., Stitched Output 2603) using a weighted sum of previous disparity values from previous disparity maps and subsequent disparity values from subsequent disparity maps.

In some cases, the weight given to previous disparity values for a given pixel is determined based at least in part on a difference value associated with the given pixel as provided by a difference map. As an example, the weight given to previous disparity values for a given pixel is determined based on a difference associated with the given pixel as provided by the difference map based at least in part on a threshold. For instance, where the difference (e.g., grayscale difference) is under a first threshold indicating a high similarity of the given pixel between two successive frames, the previous disparity value is given greater weight over the subsequent disparity value for the given pixel. On the other hand, where the difference (e.g., grayscale difference) is over a second threshold indicating a low similarity (or high difference) of the given pixel between two successive frames, the subsequent disparity value is given greater weight over the previous disparity value for the given pixel. In this manner, weighted sums for disparity values for each pixel in the temporally adjusted disparity map are determined and used to align the subsequent first frame and the subsequent second frame. In some embodiments, the weighted sum is taken over one or more previous disparity values obtained from one or more previous disparity maps from processing one or more previous frames. Moreover, other methods can be used to combine previous disparity values with subsequent disparity values without limiting the scope of the disclosed video stitching technique.

In some cases, a confidence level is associated with each pixel in a disparity map that indicates a level of confidence in the disparity value estimated for the pixel. As an example, disparity maps estimated or determined based on images or frames at a lower resolution (e.g., half resolution) can be associated with lower confidence levels than disparity maps estimated or determined based on images or frames at a higher resolution (e.g., full resolution). In such cases, the process of taking weighted sums of previous and subsequent disparity values as described above is adjusted by the confidence level associated with the disparity values. In particular, a pixel having a disparity value associated with a higher confidence level is given greater weight than a pixel having a disparity value associated with a lower confidence level. For example, if a previous disparity value has a lower confidence level than a subsequent disparity value, the subsequent disparity is given greater weight to account for its higher confidence value.

In some embodiments, Image Stitching System 2610 aligns the subsequent first rectified frame and the subsequent second rectified frame based at least in part on the subsequent first temporally adjusted disparity map and the subsequent second temporally adjusted disparity map.

In some embodiments, in addition to the temporal adjustment process described above, Image Stitching System 2610 performs other adjustments to the subsequent raw or filtered disparity maps before the alignment process to lessen the appearance of visible seams or undesired artifacts in the final stitched output. As an example, in some cases, Image Stitching System 2610 adjusts each of the subsequent disparity maps by performing a linear weighting process to smoothen a transition between an overlap and a non-overlap region. In other cases, Image Stitching System 2610 adjusts the disparity values at a top section or a bottom section of the subsequent disparity maps to lessen differences between top and bottom disparity values.

Once the subsequent disparity maps have been adjusted (e.g., by performing a temporal adjustment or other adjustments to improve the final stitched output), Image Stitching System 2610 aligns the subsequent first rectified frame and the subsequent second rectified frame based on the adjusted disparity maps. Image Stitching System 2610 stitches the aligned subsequent first and second rectified frames to form a subsequent stitched rectified frame.

In some cases, a rectified-to-equirectangular conversion is performed to obtain a final subsequent stitched frame for 360-degree viewing. In cases where the rectified-to-equirectangular conversion is performed on a rectified frame of an overlap area, the final stitched frame is obtained using frame data from non-overlap regions of the original images (e.g., the subsequent first frame and the subsequent second frame) together with the rectified-to-equirectangular converted subsequent stitched frame of the overlap region.

In some cases, Image Stitching System 2610 aligns the subsequent first rectified frame based at least in part on the subsequent first adjusted disparity map to generate a subsequent first disparity corrected frame and aligns the subsequent second rectified frame based at least in part on the subsequent second adjusted disparity map to generate a subsequent second disparity corrected frame. In these cases, Image Stitching System 2610 stitches the subsequent first disparity corrected frame and the subsequent second disparity corrected frame to form a subsequent stitched frame.

In some embodiments, Image Stitching System 2610 performs a blending process as described herein to stitch substantially aligned middle sections of a subsequent first rectified frame and a subsequent second rectified frame. The blending process can comprise linear blending or multiband blending. The blending process is performed to lessen or remove the appearance of undesired artifacts or visible seams from the stitched image or frame. Although multiband blending generates sharper images as compared with linear blending for still images, in video stitching both blending methods result in a similar performance with no visibly noticeable differences in the final stitched video frames.

In some embodiments, the Stitched Output 2603 comprises a sequence of stitched video frames corresponding to stitching frames from the two frame sequences received from the two video cameras/lenses (e.g., the first frame sequence at 2601 and second frame sequence at 2602). In some cases, the Stitched Output 2603 is provided in a format that is configured or can be converted for viewing and display (e.g., using a 360-degree video viewing or displaying device).

Figure 27:
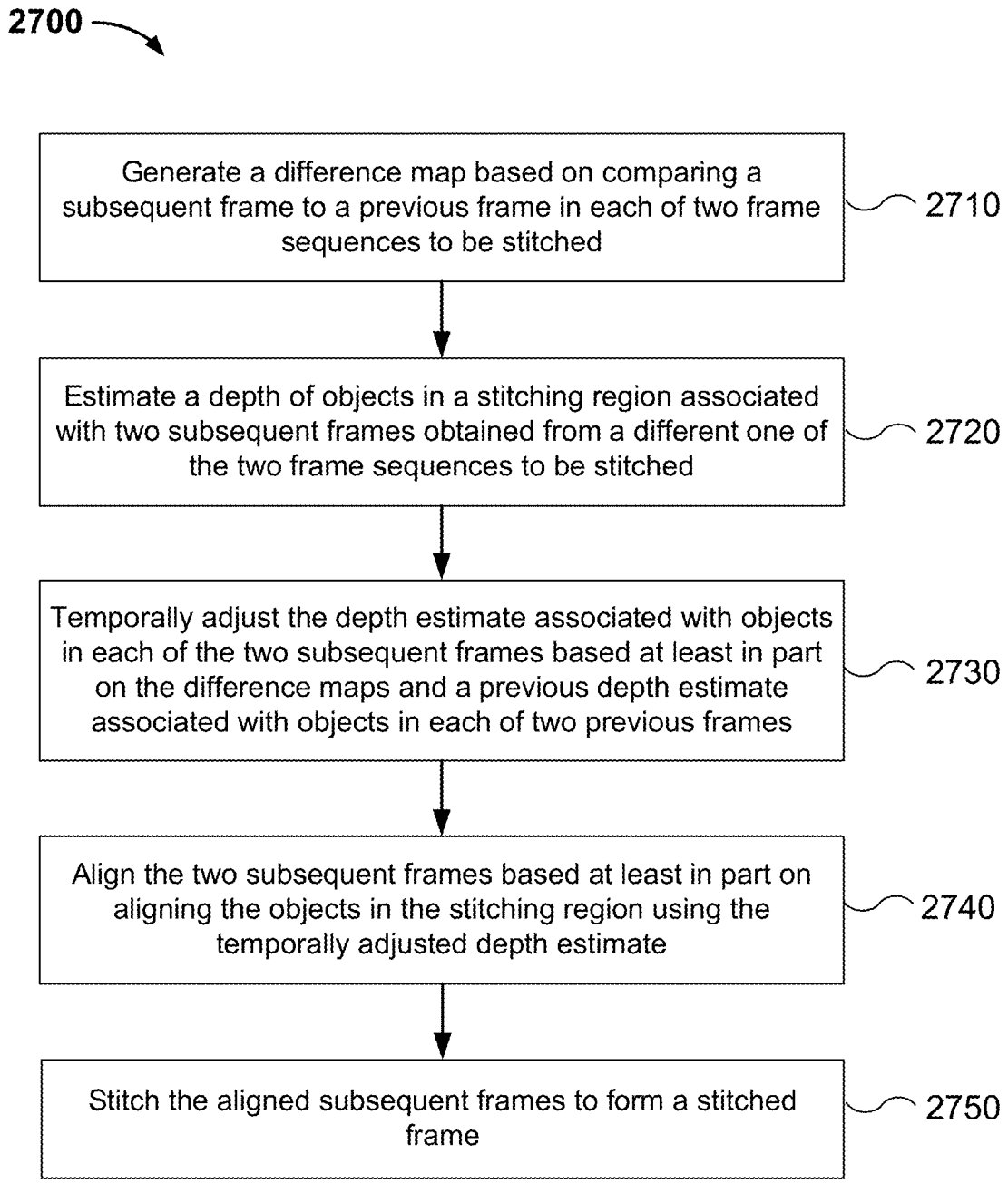
FIG. 27 is a flowchart of an embodiment of a method for video stitching that can be performed by the exemplary system depicted in FIG. 26.

FIG. 27 is a flowchart of an embodiment of a method 2700 for video stitching that can be performed by the exemplary system depicted in FIG. 26.

At 2710, the method includes generating a difference map based on comparing a subsequent frame to a previous frame in each of two frame sequences to be stitched. In particular, generating a difference map based on comparing two successive frames is performed to improve temporal continuity between successive frames. For example, comparing subsequent frames to previous frames in each of the frame sequences to generate a difference map provides a metric for comparing an object in a previous frame to an object in a subsequent frame (e.g., to determine whether the object is the same object in a substantially same position or location in both frames). Difference maps can be generated for example by Difference Map Generator 2620 of FIG. 26.

At 2720, the method includes estimating a depth of objects in a stitching region associated with two subsequent frames obtained from a different one of the two frame sequences to be stitched. In some cases, as described in more detail below, estimating the depth of objects in a stitching region associated with two subsequent frames comprises determining a subsequent disparity map for each pixel associated with an object to be aligned in the subsequent frames (e.g., wherein the object comprises corresponding pixels in two subsequent frames to be stitched). Depth estimation and/or disparity map generation can be performed for example by Image Stitching System 2610 of FIG. 26.

At 2730, the method includes temporally adjusting the depth estimate associated with objects in each of the two subsequent frames based at least in part on the difference maps and a previous depth estimate associated with objects in each of two previous frames. In some cases, the previous depth estimate associated with objects in each of two previous frames comprises a previous disparity map for each pixel associated with an object to be aligned in the previous frames (e.g., wherein the object comprises corresponding pixels in two previous frames to be stitched). Additionally, in some examples, temporally adjusting the depth estimate associated with objects in each of the two subsequent frames comprises temporally adjusting the subsequent disparity map based at least in part on the previous disparity map. Temporal adjustments can be performed for example by Temporal Adjuster 2630 of FIG. 26.

At 2740, the method includes aligning the two subsequent frames based at least in part on aligning the objects in the stitching region using the temporally adjusted depth estimate. In some cases, aligning the two subsequent frames is based at least in part on the temporally adjusted subsequent disparity map.

At 2750, the method includes stitching the aligned subsequent frames to form a stitched frame.

In some embodiments, although not depicted in FIG. 27, the method includes pre-processing each of the two subsequent frames. In some cases, as described in more detail below, pre-processing each of the two subsequent frames includes calibrating or rectifying each of the two subsequent frames and estimating the depth of objects in a stitching region associated with the two subsequent frames comprises determining a subsequent disparity map for each pixel associated with an object to be aligned in the two subsequent calibrated or rectified frames. As an example, the method described with respect to FIG. 28 includes rectifying subsequent frames and determining subsequent disparity maps based at least in part on the rectified subsequent frames.

Figure 28:
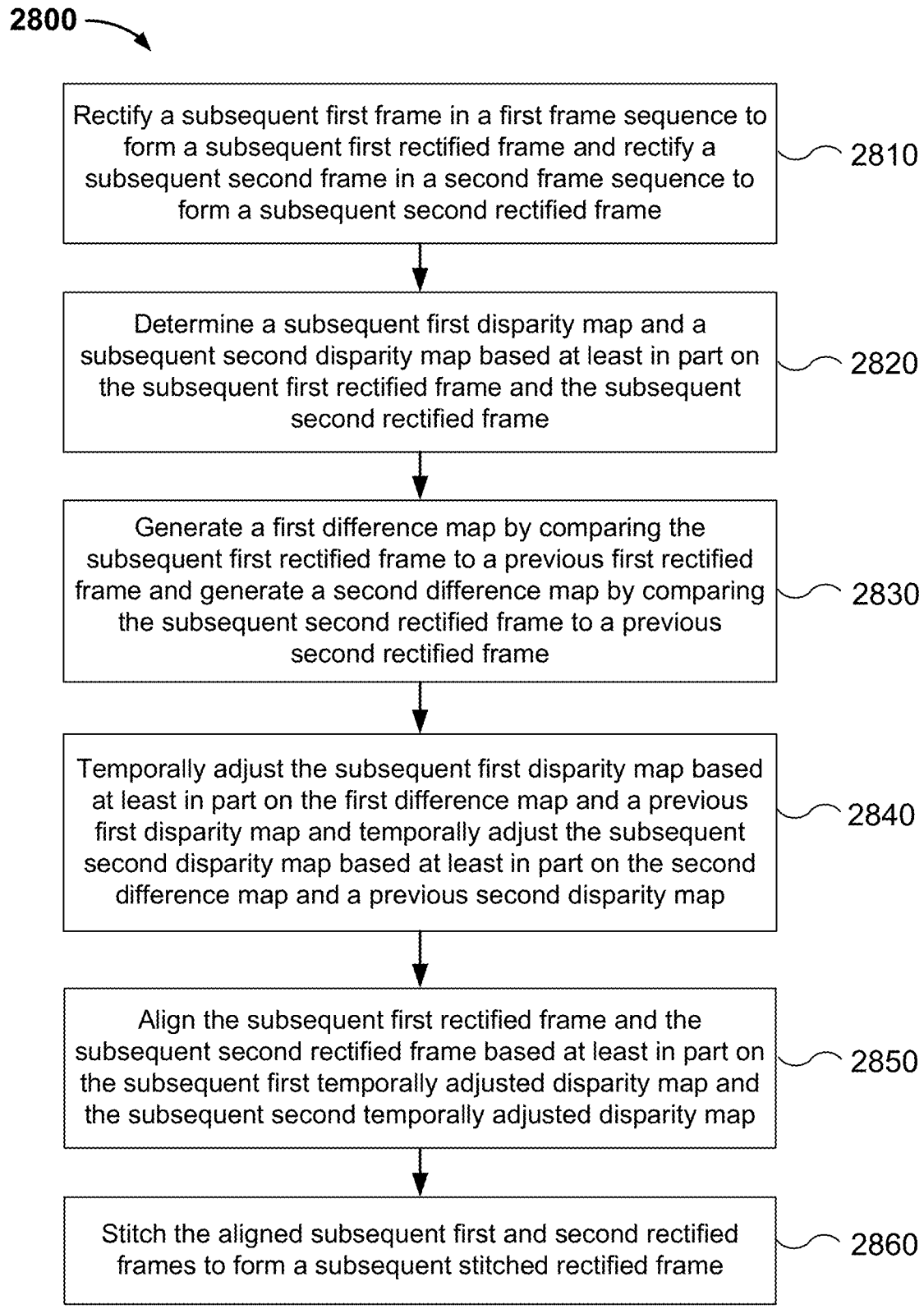
FIG. 28 is a flowchart of another embodiment of a method for video stitching that can be performed by the exemplary system depicted in FIG. 26.

Depicted in FIG. 28 is a flowchart of another embodiment of a method 2800 for video stitching that can be performed by the exemplary system depicted in FIG. 26.

As shown in FIG. 28, at 2810, the method includes rectifying a subsequent first frame in a first frame sequence to form a subsequent first rectified frame and rectifying a subsequent second frame in a second frame sequence to form a subsequent second rectified frame. In some cases, the rectification is performed only in an overlap region of the subsequent first and second frames.

In some cases, the subsequent first frame in the first frame sequence is received by a video stitching system (e.g. at 2601 of FIG. 26) and the subsequent second frame in the second frame sequence is received by a video stitching system (e.g., at 2602 of FIG. 26). In some cases, the subsequent first frame follows a previous first frame in the first frame sequence and the subsequent second frame follows a previous second frame in the second frame sequence. In some cases, the first frame sequence is captured or obtained by a first video camera or lens and the second frame sequence is captured or obtained by a second video camera or lens.

In some embodiments, the subsequent first frame and subsequent second frame are used as inputs (e.g., as a first image and a second image) to Image Stitching System 2610 to form a subsequent stitched video frame using temporally adjusted disparity maps in the alignment process. In particular, temporal continuity between successive frames is improved by adjusting disparity values in subsequent disparity maps (e.g., determined based on the subsequent first frame and subsequent second frame) based at least in part on disparity values in previous disparity maps (e.g., determined based on the previous first frame and previous second frame).

Returning to method 2800 of FIG. 28, as shown at 2820, the method includes determining a subsequent first disparity map and a subsequent second disparity map based at least in part on the subsequent first rectified frame and the subsequent second rectified frame.

In some examples, the subsequent first frame and the subsequent second frame are calibrated using a 3D calibration process configured to remove or compensate for the effects of lens distortion and camera misalignment before being rectified. In these cases, the subsequent first frame is calibrated to form a subsequent first calibrated frame and the subsequent second frame is calibrated to form a subsequent second calibrated frame. The subsequent first calibrated frame is rectified to form a subsequent first rectified frame and the subsequent second calibrated frame is rectified to form a subsequent second rectified frame.

In the case where calibration parameters are determined or have been stored for a given camera or lens setup (e.g., for the first and second video cameras or lenses), the calibration parameters are used or retrieved to calibrate the frames (e.g., to apply corrections to compensate for lens distortion and/or camera misalignment to the subsequent first frame and the subsequent second frame) before or after rectification. As noted previously, the stored calibration parameters can be used for the calibration step in successive frames provided the particular camera or lens setup does not change substantially between frames.

As described with respect to FIG. 27, to improve temporal continuity between successive frames, the disclosed method includes generating difference maps based on comparing two successive frames, for example, by comparing subsequent frames to previous frames in each of the frame sequences. The difference maps provide a metric for comparing an object in a previous frame to an object in a subsequent frame, in particular, to determine whether the object is the same object in a substantially same position or location in both frames.

In some cases, the method includes generating a first difference map by comparing the subsequent first frame to a previous first frame (e.g., retrieved from Storage Database 2615) and generating a second difference map by comparing the subsequent second frame to a previous second frame (e.g., retrieved from Storage Database 2615). Difference maps can be generated by Difference Map Generator (e.g., as shown at 2620 of FIG. 26).

In the case where the subsequent frames have been rectified as in the example of FIG. 17, method 2800 includes (e.g., as shown at 2830) generating a first difference map by comparing the subsequent first rectified frame to a previous first rectified frame and generating a second difference map by comparing the subsequent second rectified frame to a previous second rectified frame. In some cases, the rectification is performed only in an overlap region of the first and second frames. In some cases, the rectification is performed after difference maps have been generated based on the originally received first and second frames (e.g., shown at 2601 and 2602 of FIG. 26).

Alternatively, in some cases, difference maps are generated before rectification. In these cases, a first difference map is generated by comparing the subsequent first frame received by the system (e.g., shown at 2601 in the exemplary system of FIG. 26) to a previous first frame and a second difference map is generated by comparing the subsequent second frame received by the system (e.g., shown at 2602 in the exemplary system 2600 of FIG. 26) to a previous second frame. The first and second difference maps can then be rectified for use with the rectified frames.

In some examples, comparing subsequent frames to previous frames is based on a grayscale difference between corresponding pixels of the subsequent frame and a previous frame in a frame sequence from a video camera or lens. In these cases, a grayscale conversion is performed followed by determining a grayscale difference between corresponding pixels of the successive frames.

As an example, in the case of a first frame from a first video camera or lens and a second frame from a second video camera or lens, the subsequent first frame and the previous first frame are converted from RGB to grayscale and a first grayscale difference is determined by subtracting grayscale values for each pixel in the previous first frame from grayscales for each corresponding pixel in the subsequent first frame. Similarly, the subsequent second frame and the previous second frame are converted to grayscale and a second grayscale difference is determined by subtracting grayscale values for each pixel in the previous second frame from grayscale values for each corresponding pixel in the subsequent second frame.

Returning to method 2800 of FIG. 28, as shown at 2840, the method includes temporally adjusting the subsequent first disparity map based at least in part on the first difference map and a previous first disparity map and temporally adjusting the subsequent second disparity map based at least in part on the second difference map and a previous second disparity map. In some cases, the subsequent first disparity map is adjusted based at least in part on the first difference map and a previous first disparity map to form a subsequent first temporally adjusted disparity map. Similarly, in some cases, the subsequent second disparity map is adjusted based at least in part on the second difference map and a previous second disparity map to form a subsequent second temporally adjusted disparity map. The previous first and second disparity maps can be obtained or retrieved from storage (e.g., Storage Database 2615) along with any other parameters previously determined or generated and stored by Image Stitching System 2610. Temporal adjustments can be performed by Temporal Adjuster (e.g., as shown at 2630 of FIG. 26).

In some cases, a weighted sum of previous disparity values from previous disparity maps and subsequent disparity values from subsequent disparity maps are used to perform a temporal adjustment process. In some cases, the temporal adjustment process includes temporally adjusting disparity values in the disparity maps used to align the subsequent first and second frames to each other to form a stitched video output (e.g., Stitched Output 2603) based at least in part on a weighted sum of previous disparity values from previous disparity maps and subsequent disparity values from subsequent disparity maps. The temporal adjustment process can be performed by Temporal Adjuster (e.g., as shown at 2630 of FIG. 26).

As an example, in some cases, temporally adjusting the subsequent first disparity map is based at least in part on the first difference map and a weighted sum of disparity values from the previous first disparity map and disparity values from the subsequent first disparity map and temporally adjusting the subsequent second disparity map is based at least in part on the second difference map and a weighted sum of disparity values from the previous second disparity map and disparity values from the subsequent second disparity map.

In some cases, the weight given to disparity values in the previous first disparity map is determined based at least in part on a difference value obtained from the first difference map and the weight given to disparity values in the previous second disparity map is determined based at least in part on a difference value obtained from the second difference map.

In some cases, the weight given to previous disparity values for a given pixel is determined based at least in part on a difference value associated with the given pixel as provided by a difference map. As an example, the weight given to previous disparity values for a given pixel is determined based on a difference associated with the given pixel as provided by the difference map based at least in part on a threshold. For instance, where the difference (e.g., grayscale difference) is under a first threshold indicating a high similarity of the given pixel between two successive frames, the previous disparity value is given greater weight over the subsequent disparity value for the given pixel. On the other hand, where the difference (e.g., grayscale difference) is over a second threshold indicating a low similarity (or high difference) of the given pixel between two successive frames, the subsequent disparity value is given greater weight over the previous disparity value for the given pixel. In this manner, weighted sums for disparity values for each pixel in the temporally adjusted disparity map are determined and used to align the subsequent first frame and the subsequent second frame. In some embodiments, the weighted sum is taken over one or more previous disparity values obtained from one or more previous disparity maps from processing one or more previous frames. Moreover, other methods can be used to combine previous disparity values with subsequent disparity values without limiting the scope of the disclosed video stitching technique.

In some cases, a confidence level is associated with each pixel in a disparity map that indicates a level of confidence in the disparity value estimated for the pixel. As an example, disparity maps estimated or determined based on images or frames at a lower resolution (e.g., half resolution) can be associated with lower confidence levels than disparity maps estimated or determined based on images or frames at a higher resolution (e.g., full resolution). In such cases, the process of taking weighted sums of previous and subsequent disparity values as described above is adjusted by the confidence level associated with the disparity values. In particular, a pixel having a disparity value associated with a higher confidence level is given greater weight than a pixel having a disparity value associated with a lower confidence level. For example, if a previous disparity value has a lower confidence level than a subsequent disparity value, the subsequent disparity is given greater weight to account for its higher confidence value.

Returning to method 2800 of FIG. 28, as shown at 2850, the method includes aligning the subsequent first rectified frame and the subsequent second rectified frame based at least in part on the subsequent first temporally adjusted disparity map and the subsequent second temporally adjusted disparity map.

In some embodiments, in addition to the temporal adjustment process described above, other adjustments are made to the subsequent raw or filtered disparity maps before the alignment process of step 2850 to lessen the appearance of visible seams or undesired artifacts in the final stitched output.

As an example, in some cases as described herein, each of the subsequent disparity maps is adjusted by performing a linear weighting process to smoothen a transition between an overlap and a non-overlap region. In other cases as described herein, the disparity values at a top section or a bottom section of the subsequent disparity maps are adjusted to lessen differences between top and bottom disparity values.

Once the subsequent disparity maps have been adjusted (e.g., by performing a temporal adjustment or other adjustments to improve the final stitched output), the subsequent first rectified frame and the subsequent second rectified frame are aligned based on the adjusted disparity maps (e.g., as shown in step 2850).

Finally, at 2860, method 2800 includes stitching the aligned subsequent first and second rectified frames to form a subsequent stitched rectified frame. In some cases (not shown in FIG. 28), a rectified-to-equirectangular conversion is performed to obtain a final subsequent stitched frame for 360-degree viewing. In cases where the rectified-to-equirectangular conversion is performed on a rectified frame of an overlap area, the final stitched frame is obtained using frame data from non-overlap regions of the original frame (e.g., the subsequent first frame and the subsequent second frame) together with the rectified-to-equirectangular converted stitched frame of the overlap region.

In some cases, the subsequent first rectified frame is aligned based at least in part on the subsequent first adjusted disparity map to generate a subsequent first disparity corrected frame and the subsequent second rectified frame is aligned based at least in part on the subsequent second adjusted disparity map to generate a subsequent second disparity corrected frame. In these cases, Image Stitching System 2610 stitches the subsequent first disparity corrected frame and the subsequent second disparity corrected frame to form a subsequent stitched frame.

In some embodiments, Image Stitching System 2610 performs a blending process as described herein to stitch substantially aligned middle sections of a subsequent first rectified frame and a subsequent second rectified frame. The blending process can comprise linear blending or multiband blending. The blending process is performed to lessen or remove the appearance of undesired artifacts or visible seams from the stitched image or frame.

In some embodiments, the Stitched Output 2603 comprises a sequence of stitched video frames corresponding to stitching frames from the two frame sequences received from the two video cameras/lenses (e.g., the first frame sequence at 2601 and second frame sequence at 2602). In some cases, the Stitched Output 2603 is provided in a format that is configured or can be converted for viewing and display (e.g., using a 360-degree video viewing or displaying device).

In some applications, such as in embedded formats used in cameras, it is desirable or advantageous to increase computational speed. Image stitching and video stitching pose particular challenges of implementing algorithms on embedded hardware in cameras with limited computational power. Estimations, calculations, and algorithms used for example in stereoscopic imaging, calibration, rectification, disparity estimation, alignment, and stitching processes as described herein can be computationally intensive. Accordingly, as discussed in more detail below, various schemes are disclosed for speeding up algorithms used in the embedded processor inside a camera and to modify and increase computational speed to meet timing requirements of in-camera processing.

In some embodiments, pre-calculation of certain variables is used to speed up the processing time in an embedded format. In particular, for a given camera or set of cameras, lens distortion as well as 3D camera misalignments between the cameras/lenses are fixed and thus, the variables associated with the 3D camera calibration process that are used for rectification for conversion from rectified to equirectangular image or frame formats are independent of the image or frame data. Accordingly, in some cases, these variables are pre-calculated and stored in memory (e.g., memory 104 of FIG. 1 and Storage Database 2615 of FIG. 26) so that the same redundant calculations can be avoided at each frame. This translates to a large reduction in computational load since calculating these variables requires many computations of coordinate transforms, distortion polynomial evaluations, and matrix multiplications. Pre-calculation of certain variables for increased computational speed is important in certain applications and can be used, for example, in the disclosed video stitching technique for stitching frame sequences in video applications as described herein.

In some embodiments as described above, to increase computational speed and decrease the amount of computation required, the processes of rectification, disparity map generation, disparity map filtering, alignment including disparity correction, stitching, blending and rectified-to-equirectangular conversion are performed only on the overlap region of the first image or frame and the second image or frame. In these cases, the non-overlap region data is directly obtained and used in the final stitched image or frame for viewing from the first and second images or frames (e.g., left and right fisheye images or frames). In one example, application of this approach reduces the total computation time for image or video stitching by more than a factor of two (e.g., from 55.67 seconds to 25 seconds).

In some embodiments, images or frames used in intermediate steps in the image stitching and video stitching methods described herein are scaled down in order to increase computational speed and decrease the amount of computation required for these intermediate steps. For example, operations performed on images and frames used for intermediate steps such as disparity estimation, disparity map generation, and disparity map filtering depend on the number of pixels to be processed. Since the number of pixels decreases in a squared fashion of the scale of the image or frame, scaling down the image or frame leads to a significant reduction in computational cost.

Accordingly, in some embodiments, in order to speed up the computation time for the disparity map generation and disparity map filtering processes, initial raw disparity maps are determined based on lowering the resolution (e.g., by at least 0.5, 0.3, 0.25, and 0.125) of the rectified images and then resizing the rectified images before the filtering process. As described below, reducing the resolution of the rectified images results in a tradeoff between computation speed and quality of the stitched image.

In one example, the first and second disparity maps are determined based on images scaled down by a factor of two (half resolution in both dimensions or $\frac{1}{4}^{th}$ scaled image). In particular, the first and second disparity maps are determined based on a first rectified image at half resolution and a second rectified image at half resolution. In this case, the time to complete a raw disparity calculation on a first rectified image at full resolution in the overlap region is 1.3 seconds resulting in a total time for calculating two disparity maps (one for each of a first rectified image and a second rectified image) of 2.6 seconds. In contrast, the time to complete a raw disparity calculation on the same two images at half resolution in the overlap region is 0.4 seconds (i.e., 0.2 seconds for each disparity map), yielding a total time reduction of 2.2 seconds. Although the stitched result based on rectified images at half resolution exhibits differences when compared to the stitched result based on rectified images at full resolution, the differences appear only slight at this resolution and be worth the increased computational speed depending on the application.

In another example, to test the performance trade-offs, the first and second disparity maps are determined based on images scaled down by a factor of four (a quarter resolution in both dimensions or $\frac{1}{16}^{th}$ scaled image) and a factor of eight (an eighth resolution in both dimensions or a $\frac{1}{64}^{th}$ scaled image) to obtain a stitched image based on rectified images at one-quarter resolution and one-eighth resolution respectively. While not an exact match to the stitched result using rectified images at full resolution, the stitched result in the quarter resolution case appears sufficient depending on the application. With the reduction in number of pixels ($\frac{1}{16}^{th}$ times the number of pixels) at a quarter resolution, the total time required for image stitching was brought down from 25 s to 16.3 s.

However, using rectified images at an eighth resolution, while faster computationally, produced degradation in the stitched output in the form of visible misalignments. Accordingly, considering this tradeoff, in a preferred embodiment for applications that require increased speed without sacrificing too much in image quality, disparity maps are determined based on rectified images that are at least one-quarter resolution or more. In other embodiments wherein a modest computational savings is desired with a better image quality, disparity maps are determined based on rectified images that are at least one-half resolution or more.

In some cases, repeating structures in images and video frames in the stitching region pose certain challenges for disparity estimation and disparity map generation. Because block matching looks for similar appearing regions, repeating structures result in multiple matches and cause problems in the estimation process. In particular, if the matching cost is smaller at an incorrect position in the structure, the estimated disparity values are incorrect and the repeating structures will appear to be distorted in the stitched output.

Accordingly, to address this problem with repeating structures, disparity estimation is performed at two different scales. Using an eighth resolution in both dimensions ($\frac{1}{64}^{th}$ scaled image) for all the calculations, repeating structures at this scale must be repeating after an interval of 8x (for some value of x) in the original image. But using a different scale such as using an eleventh of the resolution in both dimensions (e.g., $\frac{1}{121}$ scaled image), the same structures will not appear to be repeating at this scale. Thus, by comparing disparity maps determined at two different scales, the mismatch due to repeating structures can be detected. By detecting mismatches from repeating structures, the estimated disparity values can be chosen correctly and the resulting stitched output no longer appears distorted in the repeating structures.

In some embodiments, computational speed is increased using alternative methods or algorithms in the disparity estimation, disparity map generation, and disparity map filtering processes as described below.

In some cases, to decrease the memory requirement and increase computational speed, a disparity estimation algorithm that operates using a simple Block Matching method is used to perform a block matching operation locally without running a global optimization. The resulting disparity maps generated using a local block matching algorithm are less smooth than disparity maps generated using other algorithms that also run a global optimization (e.g., such as SGBM) but require less memory and result in faster computational speed.

In some cases, to increase computational speed, a Guided Filter is used to perform filtering of the disparity maps. The Guided Filter employs a local filtering approach and thus has a much faster implementation that, unlike a WLS filter, can also be parallelized due to its local nature. As the WLS filter and the Guided Filter are found to perform equally well in this application, the Guided Filter is preferable for use in embedded systems where computational resources are a concern.

In some embodiments, computational speed is increased in the stitching process by using linear blending (e.g., feather blending) rather than multiband blending. Although multiband blending generates sharper images as compared with linear blending for still images, in video stitching both blending methods result in a similar performance with no visibly noticeable differences in the final stitched video frames.

In some applications, as described below, additional steps are taken to improve or enhance image quality in the final stitched images or video frames.

As an example, in some cases, aligning images or frames based on disparity maps (e.g., to form disparity corrected images or frames) produces a dark shadow in the stitched output. In particular, where the rectification process is performed only in an overlap region and where disparity values in the disparity maps are high enough, a disparity corrected region gets image data from pixels from outside the overlap region. The area that is outside the overlap region is beyond the visibility of one of the cameras (e.g., the second or right camera) and by default, the image data from a pixel in this area that is outside the overlap region is given a value of zero (black). Accordingly, as a result of blending with pixels having zero (black) values from this area outside the overlap region, a dark shadow appears in the stitched output. Accordingly, in some cases, a determination is made as to whether the disparity corrected value in the one of the images comes from the overlap region or from beyond the overlap region (e.g., beyond the field of view of one of the cameras). If it is determined that the disparity corrected value comes from beyond the overlap region and the field of view of a given camera (e.g., a first camera) and is therefore invalid (e.g. having a zero value), the image data from the given camera (e.g., the first camera) for the pixel located beyond the overlap region is not used. Instead, image data from the other image corresponding to the other camera (e.g., a second camera) in that region having valid image data values is used and blending is performed only in a region where valid data is present from both cameras.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An image stitching system comprising:
  a processor; and
  a memory coupled with the processor, wherein the memory is configured to provide the processor with instructions that when executed cause the processor to:
    receive two images;
    pre-process each of the two images by rectifying each of the two images and/or calibrating each of the two images;
    estimate a depth of objects comprising corresponding pixels in a stitching region of the two images by determining a disparity map for each pixel in a stitching region based on the rectified images and/or the calibrated images;
    align the two images based at least in part on the disparity map and based at least in part on aligning the objects in the stitching region using the estimated depth of the objects; and
    stitch the aligned images to form a stitched image.

2. The system recited in claim 1, wherein estimating the depth comprises determining a disparity map for each pixel associated with an object to be aligned.

3. A non-transitory computer readable medium storing thereon a computer program for image stitching, which when executed by a computer, performs a method comprising:
  receiving two images;
  pre-processing each of the two images by rectifying each of the two images and/or calibrating each of the two images;
  estimating a depth of objects comprising corresponding pixels in a stitching region of two the images by determining a disparity map for each pixel in a stitching region based on the rectified images and/or the calibrated images;
  aligning the two images based at least in part on the disparity map and based at least in part on aligning the objects in the stitching region using the estimated depth of the objects; and
  stitching the aligned images to form a stitched image.

4. An image stitching system comprising:
a processor; and
a memory coupled with the processor, wherein the memory is configured to provide the processor with instructions that when executed cause the processor to:
rectify a first image to form a first rectified image and rectify a second image to form a second rectified image;
determine a first disparity map and a second disparity map based at least in part on the first rectified image and the second rectified image;
filter the first disparity map to obtain a first filtered disparity map and filter the second disparity map to obtain a second filtered disparity map;
adjust the first filtered disparity map to obtain a first adjusted disparity map and adjust the second disparity map to obtain a second adjusted disparity map;
align the first rectified image and the second rectified image based at least in part on the first adjusted disparity map and the second adjusted disparity map; and
stitch the aligned images to form a stitched image.

5. The system recited in claim 4, wherein the first image is captured by a first camera or lens and the second image is captured by a second camera or lens and wherein the memory is further configured to provide the processor with instructions that when executed cause the processor to calibrate the first image and calibrate the second image.

6. The system recited in claim 4, wherein the first image is captured by a first camera or lens and the second image is captured by a second camera or lens and wherein the memory is further configured to provide the processor with instructions that when executed cause the processor to calibrate the first image to form a first calibrated image and calibrate the second image to form a second calibrated image and wherein rectifying the first image and the second image comprises performing a rectification process on an overlap region of the first calibrated image and the second calibrated image.

7. The system recited in claim 4, wherein adjusting the first filtered disparity map and the second filtered disparity map comprises performing a linear weighting process to smoothen a transition between an overlap and a non-overlap region.

8. The system recited in claim 4, wherein adjusting the first filtered disparity map and the second filtered disparity map comprises adjusting the disparity values at a top section (top disparity values) or a bottom section (bottom disparity values) of the filtered disparity maps to lessen differences between the top and bottom disparity values.

9. The system recited in claim 4, wherein adjusting the first filtered disparity map and the second filtered disparity map comprises performing a linear weighting process configured to adjust the first filtered disparity map and the second filtered disparity map such that, when applied to align the first rectified image and the second rectified image, a middle section of the first rectified image and a middle section of the second rectified image are substantially aligned for image blending and a transition between an overlap region and a non-overlap region is smoothened.

10. The system recited in claim 9, wherein the memory is further configured to provide the processor with instructions that when executed cause the processor to:
perform a blending process to stitch the substantially aligned middle sections of the first rectified image and the second rectified image.

11. The system recited in claim 4, wherein aligning the first rectified image and the second rectified image comprises aligning the first rectified image based at least in part on the first disparity map to generate a first disparity corrected image and aligning the second rectified image based at least in part on the second disparity map to generate a second disparity corrected image and wherein stitching the aligned images comprises stitching the first disparity corrected image and the second disparity corrected image to form a stitched image.

12. A non-transitory computer readable medium storing thereon a computer program for image stitching, which when executed by a computer, performs a method comprising:
rectifying a first image to form a first rectified image and rectifying a second image to form a second rectified image;
determining a first disparity map and a second disparity map based at least in part on the first rectified image and the second rectified image;
filtering the first disparity map to obtain a first filtered disparity map and filtering the second disparity map to obtain a second filtered disparity map;
adjusting the first filtered disparity map to obtain a first adjusted disparity map and adjusting the second disparity map to obtain a second adjusted disparity map;
aligning the first rectified image and the second rectified image based at least in part on the first adjusted disparity map and the second adjusted disparity map; and
stitching the aligned images to form a stitched image.

13. The non-transitory computer readable medium recited in claim 3, wherein estimating the depth comprises determining a disparity map for each pixel associated with an object to be aligned.

14. The non-transitory computer readable medium recited in claim 12, wherein the first image is captured by a first camera or lens and the second image is captured by a second camera or lens and wherein the method further comprises calibrating the first image and calibrating the second image.

15. The non-transitory computer readable medium recited in claim 12, wherein the first image is captured by a first camera or lens and the second image is captured by a second camera or lens and wherein the method further comprises calibrating the first image to form a first calibrated image and calibrating the second image to form a second calibrated image and wherein rectifying the first image and the second image comprises performing a rectification process on an overlap region of the first calibrated image and the second calibrated image.

16. The non-transitory computer readable medium recited in claim 12, wherein adjusting the first filtered disparity map and the second filtered disparity map comprises performing a linear weighting process to smoothen a transition between an overlap and a non-overlap region.

17. The non-transitory computer readable medium recited in claim 12, wherein adjusting the first filtered disparity map and the second filtered disparity map comprises adjusting the disparity values at a top section (top disparity values) or a bottom section (bottom disparity values) of the filtered disparity maps to lessen differences between the top and bottom disparity values.

18. The non-transitory computer readable medium recited in claim 12, wherein adjusting the first filtered disparity map and the second filtered disparity map comprises performing a linear weighting process configured to adjust the first filtered disparity map and the second filtered disparity map such that, when applied to align the first rectified image and the second rectified image, a middle section of the first rectified image and a middle section of the second rectified image are substantially aligned for image blending and a transition between an overlap region and a non-overlap region is smoothened.

19. The non-transitory computer readable medium recited in claim 18, wherein the method further comprises: performing a blending process to stitch the substantially aligned middle sections of the first rectified image and the second rectified image.

\* \* \* \* \*